(12) United States Patent
Uematsu et al.

(10) Patent No.: US 11,084,957 B2
(45) Date of Patent: Aug. 10, 2021

(54) POLAR-GROUP-CONTAINING OLEFIN COPOLYMER, POLAR-GROUP-CONTAINING MULTINARY OLEFIN COPOLYMER, OLEFIN-BASED RESIN COMPOSITION, AND ADHESIVE AND LAYERED PRODUCT EACH USING THE SAME

(71) Applicants: JAPAN POLYETHYLENE CORPORATION, Tokyo (JP); JAPAN POLYPROPYLENE CORPORATION, Tokyo (JP)

(72) Inventors: Masahiro Uematsu, Kanagawa (JP); Kazunari Abe, Kanagawa (JP); Hiroyuki Shimizu, Kanagawa (JP); Tetsuya Morioka, Mie (JP)

(73) Assignees: JAPAN POLYETHYLENE CORPORATION, Tokyo (JP); JAPAN POLYPROPYLENE CORPORATION, Tokyo (JP)

( * ) Notice: Subject to any disclaimer, the term of this patent is extended or adjusted under 35 U.S.C. 154(b) by 235 days.

(21) Appl. No.: 16/200,090

(22) Filed: Nov. 26, 2018

(65) Prior Publication Data

US 2019/0092985 A1 Mar. 28, 2019

Related U.S. Application Data

(63) Continuation of application No. 14/780,021, filed as application No. PCT/JP2014/059031 on Mar. 27, 2014, now abandoned.

(30) Foreign Application Priority Data

| Mar. 27, 2013 | (JP) | 2013-067402 |
| Mar. 27, 2013 | (JP) | 2013-067409 |
| Jun. 26, 2013 | (JP) | 2013-133857 |
| Feb. 28, 2014 | (JP) | 2014-039324 |
| Feb. 28, 2014 | (JP) | 2014-039335 |

(51) Int. Cl.

| *C08F 220/32* | (2006.01) |
| *C08F 224/00* | (2006.01) |
| *C08F 4/80* | (2006.01) |
| *C09J 123/06* | (2006.01) |
| *B32B 5/02* | (2006.01) |
| *B32B 15/08* | (2006.01) |
| *B32B 23/08* | (2006.01) |
| *B32B 27/10* | (2006.01) |
| *B32B 27/32* | (2006.01) |
| *C08F 4/70* | (2006.01) |
| *C09J 123/00* | (2006.01) |
| *C09J 7/20* | (2018.01) |
| *B32B 15/085* | (2006.01) |

(Continued)

(52) U.S. Cl.
CPC ............ *C09J 123/06* (2013.01); *B32B 5/022* (2013.01); *B32B 5/024* (2013.01); *B32B 15/08* (2013.01); *B32B 15/085* (2013.01); *B32B 23/08* (2013.01); *B32B 27/10* (2013.01); *B32B 27/32* (2013.01); *B32B 27/322* (2013.01); *B32B 27/34* (2013.01); *B32B 27/36* (2013.01); *C08F 4/70* (2013.01); *C08F 4/7014* (2013.01); *C08F 4/7031* (2013.01); *C08F 4/80* (2013.01); *C08F 210/02* (2013.01); *C08F 220/32* (2013.01); *C08F 220/325* (2020.02); *C09J 7/20* (2018.01); *C09J 123/00* (2013.01); *B32B 2457/20* (2013.01); *B32B 2457/202* (2013.01); *C09J 2203/302* (2013.01); *C09J 2423/00* (2013.01)

(58) Field of Classification Search
CPC .... C08F 224/00; C08F 210/02; C08F 210/06; C08F 220/325; C08F 220/35; C08F 4/7014; C08F 4/7031; C08F 4/7098; C08F 4/80; C08L 37/00; C08L 23/0884
See application file for complete search history.

(56) References Cited

U.S. PATENT DOCUMENTS

| 4,985,507 A * | 1/1991 | Yoshida | C08F 210/02 |
| | | | 525/328.9 |
| 5,059,662 A * | 10/1991 | Wikelski | C08F 210/02 |
| | | | 526/208 |

(Continued)

FOREIGN PATENT DOCUMENTS

| CN | 1342715 A | 4/2002 |
| CN | 1350554 A | 5/2002 |

(Continued)

OTHER PUBLICATIONS

JP-2013213121-A (Oct. 17, 2013); machine translation. (Year: 2013).*

(Continued)

*Primary Examiner* — Rip A Lee
(74) *Attorney, Agent, or Firm* — Greenblum & Bernstein, P.L.C.

(57) ABSTRACT

A method of producing a polar-group-containing olefin copolymer which comprises 99.999 to 80 mol % of structural units derived from at least one of ethylene and α-olefin having 3 to 20 carbon atoms and 20 to 0.001 mol % of structural units derived from at least one polar-group-containing monomer which contains an epoxy group and is represented by structural formula (I) or (II), the method comprising random copolymerization in the presence of a transition metal catalyst to obtain a copolymer having a linear molecular structure.

19 Claims, 8 Drawing Sheets

(51) Int. Cl.
  *B32B 27/34* (2006.01)
  *B32B 27/36* (2006.01)
  *C08F 210/02* (2006.01)

(56) References Cited

U.S. PATENT DOCUMENTS

| | | | | |
|---|---|---|---|---|
| 5,128,086 | A * | 7/1992 | Tomko | C08F 255/00 |
| | | | | 156/48 |
| 6,121,402 | A * | 9/2000 | Machida | C08F 10/02 |
| | | | | 525/240 |
| 6,909,028 | B1 | 6/2005 | Shawver et al. | |
| 7,393,907 | B2 * | 7/2008 | Imuta | C08F 210/00 |
| | | | | 526/281 |
| 8,137,773 | B2 * | 3/2012 | Hiruma | C08L 51/006 |
| | | | | 428/34.9 |
| 10,703,890 | B2 * | 7/2020 | Ren | H01B 3/441 |
| 2002/0156207 | A1 | 10/2002 | Imuta et al. | |
| 2003/0130452 | A1 | 7/2003 | Lin | |
| 2004/0122192 | A1 | 6/2004 | Imuta et al. | |
| 2004/0213973 | A1 * | 10/2004 | Hara | C08F 210/02 |
| | | | | 428/212 |
| 2005/0043494 | A1 | 2/2005 | Goodall et al. | |
| 2006/0063898 | A1 | 3/2006 | Inoue et al. | |
| 2008/0132650 | A1 | 6/2008 | Patil | |
| 2008/0221275 | A1 | 9/2008 | Baugh et al. | |
| 2009/0137757 | A1 | 5/2009 | Imuta et al. | |
| 2011/0097559 | A1 | 4/2011 | Hawker et al. | |
| 2011/0152476 | A1 | 6/2011 | Gessner et al. | |
| 2011/0257351 | A1 | 10/2011 | Kobayashi et al. | |
| 2015/0004344 | A1 * | 1/2015 | Abe | B32B 9/045 |
| | | | | 428/36.91 |
| 2016/0125975 | A1 * | 5/2016 | Briceno Garcia | H01R 4/10 |
| | | | | 174/84 R |

FOREIGN PATENT DOCUMENTS

| | | | | |
|---|---|---|---|---|
| CN | 1694908 | A | 11/2005 | |
| EP | 1186619 | A2 | 3/2002 | |
| JP | S47-23490 | A | 10/1972 | |
| JP | S48-11388 | A | 2/1973 | |
| JP | S50-4144 | A | 1/1975 | |
| JP | 4-23813 | A * | 1/1992 | ............ C08F 210/00 |
| JP | H04-23813 | A | 1/1992 | |
| JP | 4-55403 | A * | 2/1992 | ............... C08F 8/08 |
| JP | H04-55403 | A | 2/1992 | |
| JP | 2516003 | B2 | 4/1996 | |
| JP | H11-292917 | A | 10/1999 | |
| JP | 2001-247629 | A | 9/2001 | |
| JP | 2002-145944 | A | 5/2002 | |
| JP | 2002-145947 | A | 5/2002 | |
| JP | 2002-145949 | A | 5/2002 | |
| JP | 2002-155109 | A | 5/2002 | |
| JP | 2002-521534 | A | 7/2002 | |
| JP | 2009-280728 | A | 12/2009 | |
| JP | 2010-511746 | A | 4/2010 | |
| JP | 2010-150246 | A | 7/2010 | |
| JP | 2010-150532 | A | 7/2010 | |
| JP | 2010-202647 | A | 9/2010 | |
| JP | 2010-260913 | A | 11/2010 | |
| JP | 1672214 | B2 | 4/2011 | |
| JP | 2011-127101 | A * | 6/2011 | ............ C08F 220/32 |
| JP | 2013-213121 | A | 10/2013 | |
| JP | 2013213121 | A * | 10/2013 | ............ C08F 210/00 |

OTHER PUBLICATIONS

JP 2011-127101 (Jun. 30, 2011); machine translation. (Year: 2011).*
JP 4-23813 (Jan. 28, 1992); machine translation. (Year: 1992).*
Search Report issued for PCT/JP2014/059031, dated Jun. 17, 2014.
Chinese Office Action dated Jul. 4, 2016 in Chinese Application No. 201480018275.6.
Notification of Reasons for Refusal for Japanese Office action issued with respect to Application No. 2014-039324, dated Aug. 23, 2016.
Notification of Reasons for Refusal for Japanese Office action issued with respect to Application No. 2014-039335, dated Aug. 23, 2016.
Partial European Search Report issued with respect to Application No. 14775895.7, dated Dec. 9, 2017.
Chinese Office Action issued with respect to Application No. 201480018275.6, dated Feb. 23, 2017.
European Search Report issued with respect to Application No. 14775895.7, dated Mar. 20, 2017.
Japanese Office Action issued with respect to Patent Application No. 2014-065148, dated Jul. 18, 2017.
Japanese Office Action issued with respect to Patent Application No. 2014-065155, dated Jul. 18, 2017.
Notification of Reasons for Refusal from Japanese Application No. 2014-131288 dated Aug. 14, 2017.
Chinese Office Action from Application No. 201480018275.6 dated Sep. 18, 2017.
Japanese Patent Office Notification of Reasons for Refusal from Appl. No. 2014-065155, dated Dec. 18, 2017.
Decision of Refusal issued with respect to Japanese Application No. 2014-131288, dated Feb. 27, 2018, along with an English translation thereof.
European Office Action issued in the corresponding European Application No. 14775895.7, dated Mar. 12, 2018.
PubChem database entry on methylaluminoxane (https://publchem.ncbi.nih.gov/compound/23511181#section=top) (Pubchem)(Year:2018).
Office Action, Indian Patent Office, Application No. 8839/DELNP/2015, dated May 29, 2019.

* cited by examiner

[Fig. 1]
[Fig. 2]
[Fig. 3]

[Fig. 4]
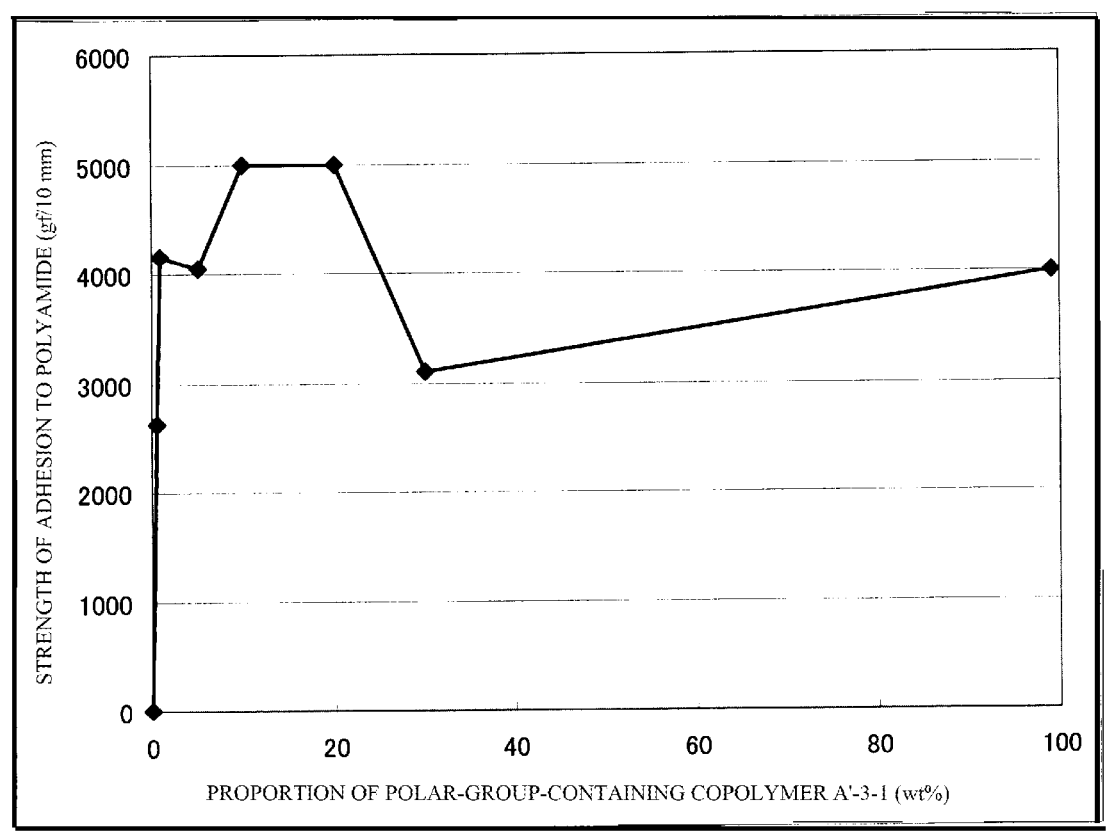

[Fig. 5]
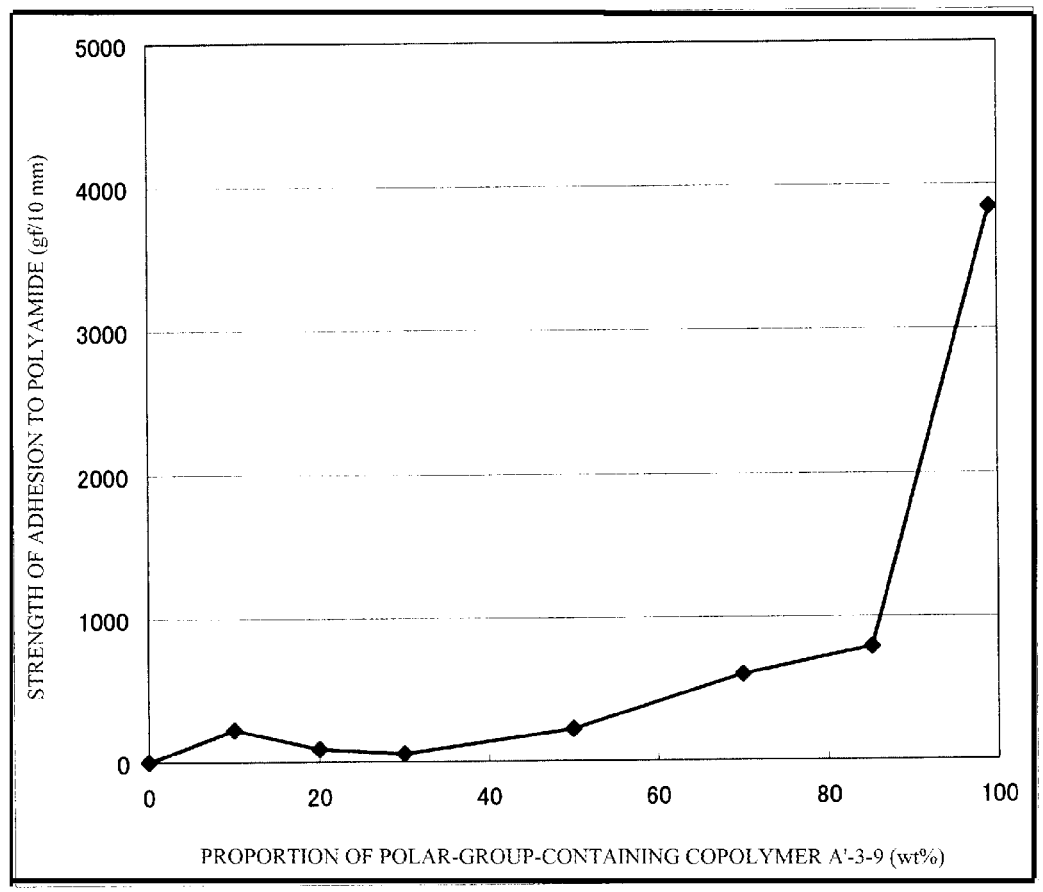

[Fig. 6]
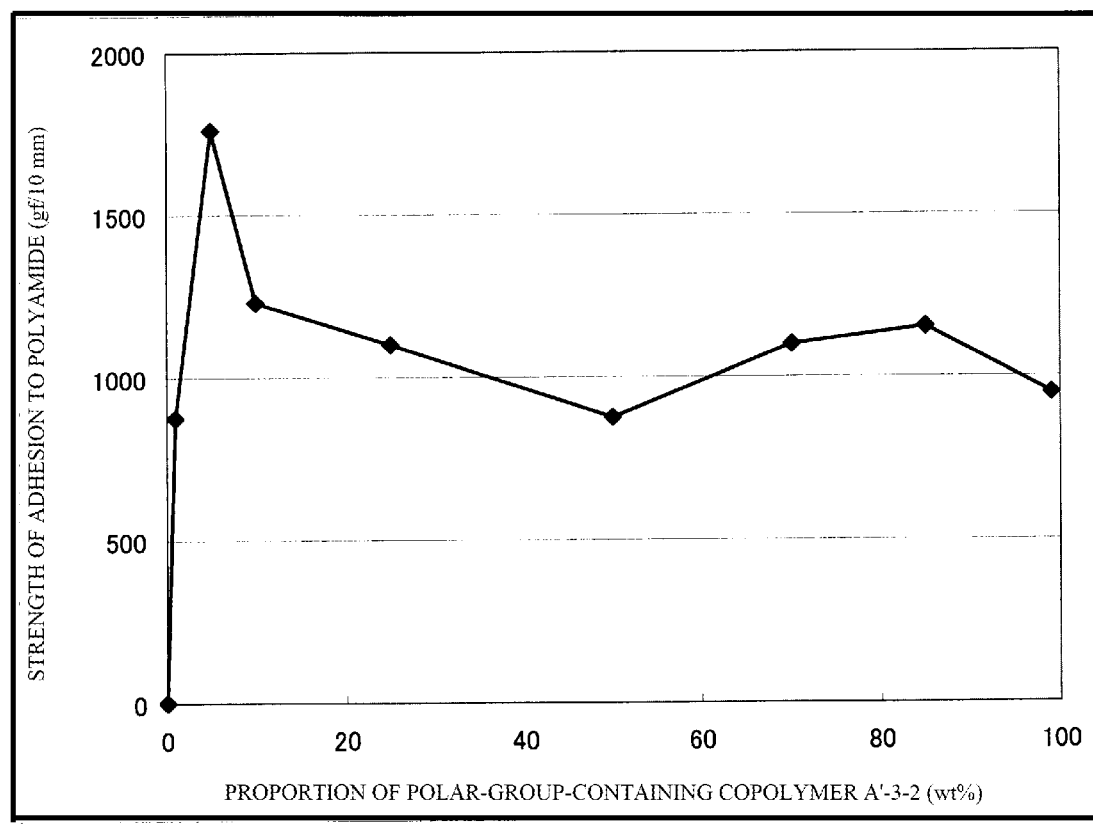

[Fig. 7]
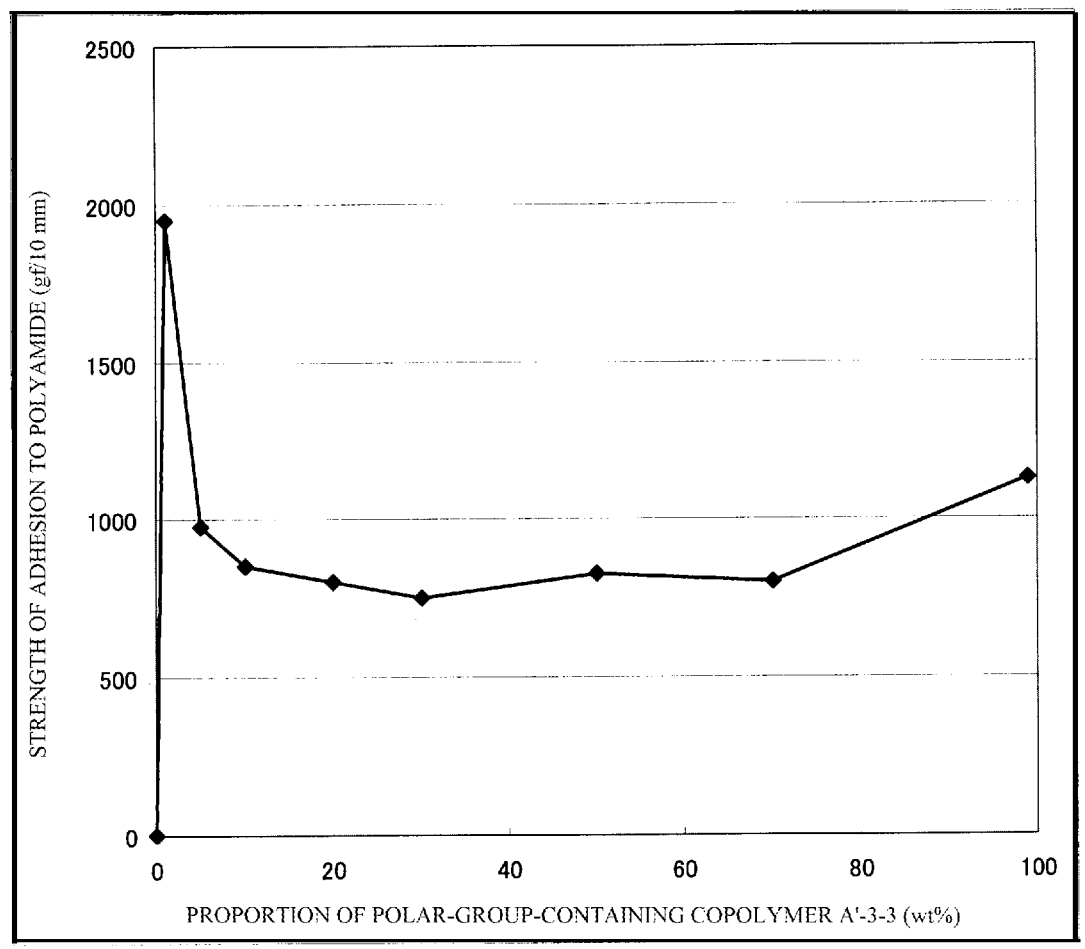

[Fig. 8]
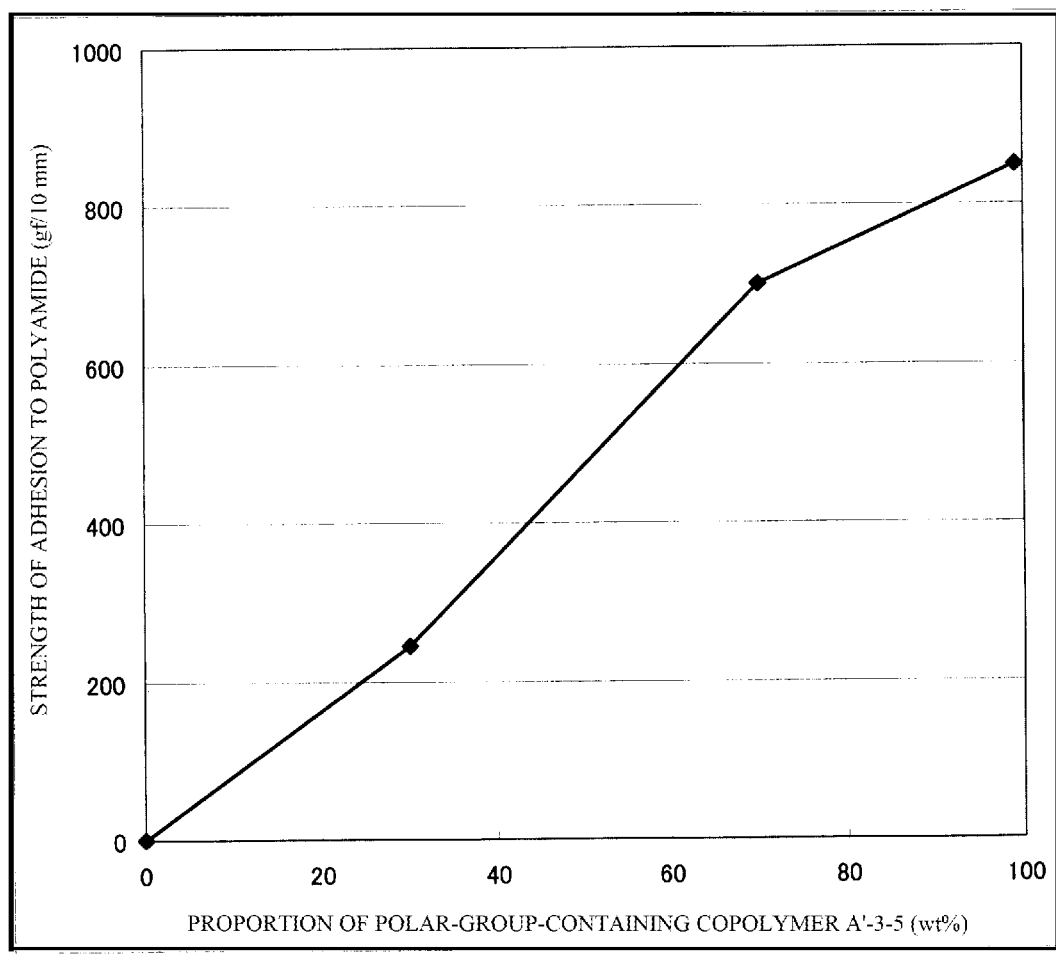

[Fig. 9]
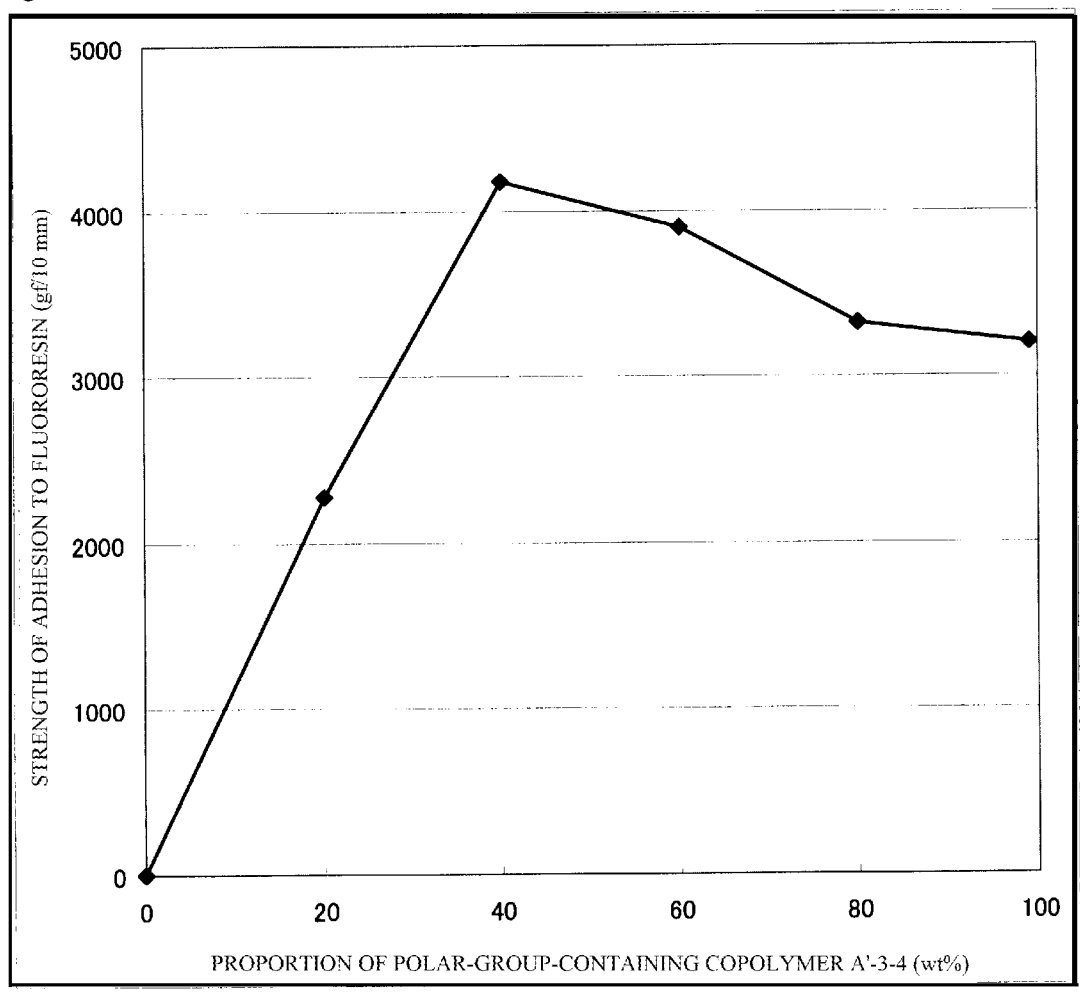

[Fig. 10]
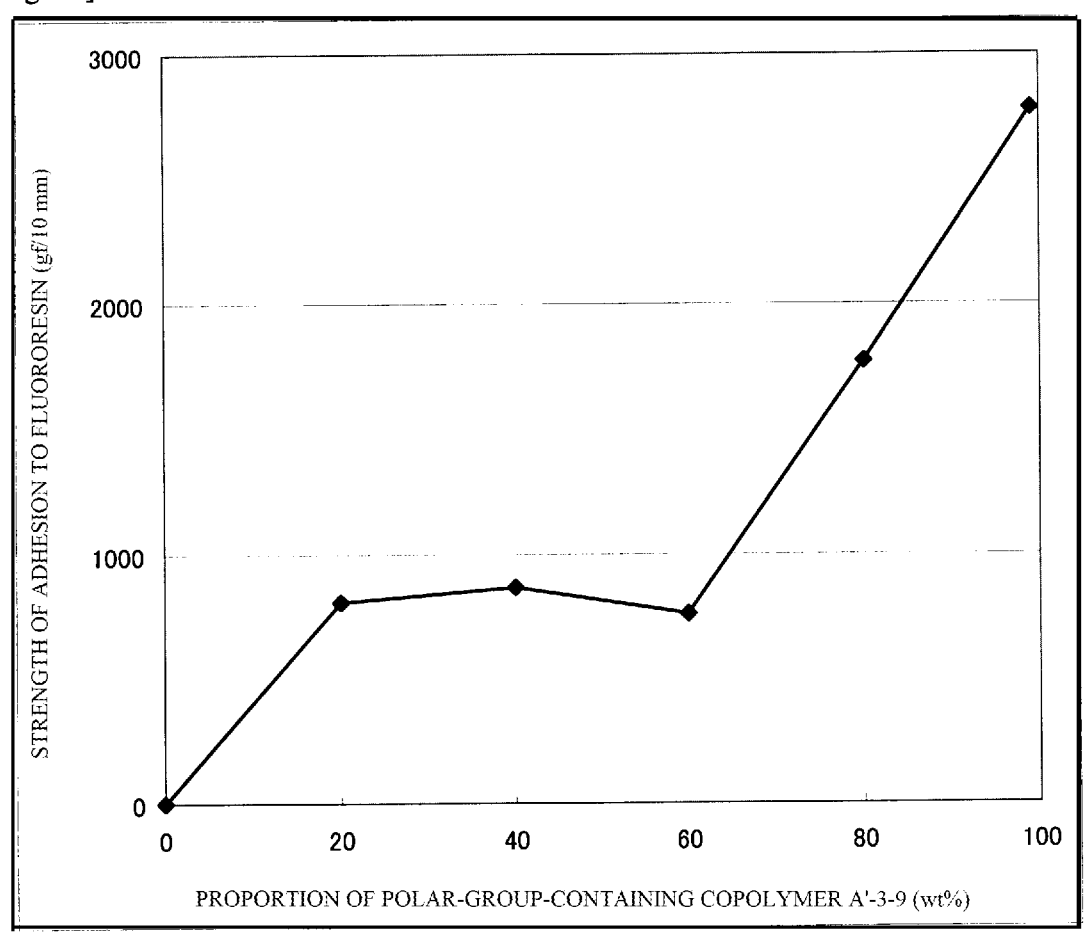

POLAR-GROUP-CONTAINING OLEFIN COPOLYMER, POLAR-GROUP-CONTAINING MULTINARY OLEFIN COPOLYMER, OLEFIN-BASED RESIN COMPOSITION, AND ADHESIVE AND LAYERED PRODUCT EACH USING THE SAME

The present application is a Continuation of U.S. application Ser. No. 14/780,021, abandoned, which is a National stage of International Patent Application No. PCT/JP2014/059031 filed Mar. 27, 2014, which claims priority to Japanese Application No. 2014-039335 filed Feb. 28, 2014, Japanese Application No. 2014-039324 filed Feb. 28, 2014, Japanese Application No. 2013-133857 filed Jun. 26, 2013, Japanese Application No. 2013-067409 filed Mar. 27, 2013, and Japanese Application No. 2013-067402 filed Mar. 27, 2013. The disclosures of U.S. application Ser. No. 14/780,021 and International Patent Application No. PCT/JP2014/059031 are incorporated by reference herein in their entireties.

TECHNICAL FIELD

The present invention relates to a polar-group-containing olefin copolymer having excellent properties, a multinary polar olefin copolymer, an olefin-based resin composition including the polar-group-containing olefin copolymer and an olefin-based resin, a layered product using any of these, and various composited products using the same. More particularly, the invention relates to a polar-group-containing olefin copolymer which has a specific polar group and shows excellent adhesiveness to various base materials, a multinary polar olefin copolymer, an olefin-based resin composition including the polar-group-containing olefin copolymer and an olefin-based resin, and an adhesive and a layered product which both take advantage of the adhesiveness.

BACKGROUND ART

In general, olefin-based resins have high mechanical strength and are excellent in terms of impact resistance, long-term durability, chemical resistance, corrosion resistance, etc., are inexpensive, and have excellent moldability. In addition, the resins are capable of accommodating environmental issues and recycling of resources. Olefin-based resins are hence used as important industrial materials. For example, the resins are molded into films, layered products, vessels, blow-molded bottles, etc. by injection molding, extrusion molding, blow molding, etc., and are in use in a wide range of applications. Furthermore, properties such as, for example, gas barrier properties can be imparted, besides those properties, by laminating the resins with a base such as a gas-barrier material, e.g., an ethylene/vinyl alcohol copolymer (EVOH) or an aluminum foil. Thus, packaging materials or vessels having high functions can be obtained.

However, olefin polymers are generally nonpolar and have a drawback that when used as laminating materials, the olefin polymers show exceedingly low strength of adhesion to highly polar materials of different kinds, such as other synthetic resins, metals, and wood, or do not adhere to such materials.

Consequently, for improving the adhesiveness to highly polar materials of different kinds, a technique in which a polar-group-containing monomer is grafted using an organic peroxide is being practiced extensively (see, for example, patent document 1).

This technique, however, arouses a problem in that the olefin-based resin undergoes intermolecular crosslinking, molecular-chain cleavage, etc. simultaneously with the grafting reaction and, hence, the graft modification product does not retain the excellent properties of the olefin-based resin. For example, the intermolecular crosslinking introduces unnecessary long-chain branches to result in an increase in melt viscosity and a widened molecular-weight distribution and in adverse influences on adhesiveness and moldability. In addition, the molecular-chain cleavage results in an increase in the content of low-molecular-weight components in the olefin-based resin, thereby posing a problem in that gumming and fuming occur during molding.

Furthermore, the adhesiveness to highly polar materials of different kinds can be increased by heightening the content of polar groups in the polar-group-containing olefin copolymer. However, it is not easy to graft a polar-group-containing monomer in a large amount onto an olefin-based resin by graft modification. As a method for increasing the content of a polar-group-containing monomer, use may be made of, for example, a method in which the amounts of a polar-group-containing monomer and an organic peroxide which are to be subjected to a graft modification are increased. Use of this method leads to the occurrence of enhanced intermolecular crosslinking and molecular-chain cleavage in the olefin-based resin to impair various properties, e.g., mechanical properties, impact resistance, long-term durability, and moldability. In addition, the polar-group-containing monomer remains unreacted in an increased amount in the olefin-based resin and products of decomposition of the organic peroxide also remain in an increased amount in the resin, thereby arousing a trouble that deterioration of the olefin-based resin is accelerated or an unpleasant odor is emitted. Because of this, the attempt to heighten the content of a polar-group-containing monomer in an olefin-based resin, by itself, has had limitations.

Meanwhile, a method in which ethylene is copolymerized with a polar-group-containing monomer to obtain a polar-group-containing olefin copolymer using a high-pressure radical polymerization process has been disclosed as a means for obtaining an olefin-based resin having a polar-group-containing monomer introduced thereinto, without causing intermolecular crosslinking, gelation, or molecular-chain cleavage to the olefin-based resin (see patent documents 2 to 4). An example of the molecular structure of a polar-group-containing olefin copolymer into which polar groups have been introduced using a high-pressure radical polymerization process is shown in FIG. 1. According to this method, the problems which arise due to graft modification are overcome and it is possible to heighten the content of the polar-group-containing monomer in a polar-group-containing olefin copolymer as compared with graft modification. However, since the polymerization process is a high-pressure radical process, the polar-group-containing olefin copolymer obtained has a molecular structure which randomly has a large number of long-chain branches and short-chain branches. Because of this, the polar-group-containing olefin copolymers obtained by this method have been limited to ones which have a low modulus of elasticity and low mechanical properties as compared with the polar-group-containing olefin copolymers obtained by polymerization using a transition metal catalyst, and have been usable in limited applications where high strength is required.

On the other hand, in cases when a metallocene catalyst which has hitherto been in general use is used to copolymerize ethylene with a polar-group-containing monomer, this polymerization has been regarded as difficult due to a decrease in catalytic activity in the polymerization. In recent years, however, methods have been proposed in which a polar-group-containing olefin copolymer is produced by polymerization in the presence of a catalyst constituted of a transition metal and a specific ligand coordinated thereto (see patent documents 5 to 8). According to these methods, a copolymer having an increased polar-group content and having a high modulus of elasticity and high mechanical strength as compared with the polar-group-containing olefin copolymer obtained by a high-pressure radical process can be obtained. (FIG. 2 and FIG. 3 show images of the molecular structures of polar-group-containing olefin copolymers obtained by polymerization using a transition metal catalyst.) The methods described in these documents are mainly intended for the production of copolymers of an acrylate-group-containing monomer, such as methyl acrylate or ethyl acrylate, or a monomer containing a specific polar group, such as vinyl acetate, with ethylene or an α-olefin, and polar-group-containing olefin copolymers having these functional groups show insufficient adhesiveness to highly polar materials of different kinds. Those patent documents include no statement concerning specific adhesiveness to highly polar materials of different kinds, and a feature wherein an olefin copolymer containing a specific polar group is used for the purpose of adhesiveness is disclosed in none of those documents.

Meanwhile, epoxy group is generally known as a polar group capable of producing excellent adhesiveness to highly polar materials of different kinds. However, it is difficult to copolymerize an epoxy-group-containing comonomer by ordinary catalytic polymerization processes, and the epoxy-group-containing polar olefin copolymers which are presently on the market are mainly ones produced by high-pressure radical polymerization processes.

Disclosed as an example of polar-group-containing olefin copolymers produced by polymerization without using a high-pressure radical polymerization process is a polar-group-containing olefin copolymer obtained by copolymerizing 1,2-epoxy-9-decene, ethylene, and 1-butene in an invention concerning a production process, which is a so-called masking process, wherein polymerization is conducted in the presence of a specific metallocene-based catalyst and a sufficient amount of an organoaluminum (the amount being at least equimolar with the polar-group-containing monomer) (see patent document 9).

According to that invention, however, an organoaluminum is necessary in a large amount for copolymerizing the polar-group-containing olefin and this necessarily results in an increase in production cost. In addition, the organoaluminum used in a large amount comes to be present as an impurity in the polar-group-containing olefin copolymer to cause a decrease in mechanical property, discoloration, and accelerated deterioration, and removing these troubles leads to a further cost increase. Moreover, the main effect of that invention is to produce a polar-group-containing olefin copolymer while attaining high activity in polymerization, and the patent document includes no statement concerning specific adhesiveness to highly polar materials of different kinds. In addition, that patent document includes no statement at all concerning resin properties which are necessary for a polar-group-containing olefin copolymer to have for obtaining sufficient adhesiveness to highly polar materials of different kinds, and a feature wherein a polar-group-containing olefin copolymer is used for the purpose of high adhesiveness is not disclosed therein.

It can be seen from the prior-art techniques described above that there has been a desire for a proposal on a polar-group-containing olefin copolymer that contains epoxy groups and is produced by a process which is none of the processes each having one or more problems, such as graft modification, which is a process for introducing polar groups into an olefin copolymer, the high-pressure radical polymerization process, and the process in which an organoaluminum is used in a large amount, and that shows excellent adhesiveness to highly polar materials of different kinds, and on a layered product which includes the polar-group-containing olefin copolymer.

PRIOR ART DOCUMENTS

Patent Documents

Patent Document 1: JP-A-50-004144
Patent Document 2: Japanese Patent No. 2516003
Patent Document 3: JP-A-47-23490
Patent Document 4: JP-A-48-11388
Patent Document 5: JP-A-2010-202647
Patent Document 6: JP-A-2010-150532
Patent Document 7: JP-A-2010-150246
Patent Document 8: JP-A-2010-260913
Patent Document 9: Japanese Patent No. 4672214

SUMMARY OF THE INVENTION

Problems that the Invention is to Solve

An object of the invention, in view of the conventional problems described above under Background Art, is to develop: a polar-group-containing olefin copolymer which shows excellent adhesiveness to highly polar materials of different kinds and which is produced by a process that is none of the conventional processes each having one or more problems; a multinary polar olefin copolymer; and an olefin-based resin composition including the polar-group-containing olefin copolymer and an olefin-based resin. Another subject for the invention is to provide an adhesive, a layered product, various molded articles, and various composited products, which each using the same.

Means for Solving the Problems

The present inventors variously took consideration and made close investigations for demonstration with regard to methods for introducing a polar group, selection of a polar group and a polymerization catalyst, molecular structures of polar-group-containing olefin copolymers, correlation between the structure of a copolymer and the adhesiveness thereof, etc. in order to produce a polar-group-containing olefin copolymer by a simple and efficient process and improve the adhesiveness of the copolymer to materials of different kinds and in order to thereby overcome the problems described above. As a result, the inventors were able to discover a polar-group-containing olefin copolymer having excellent adhesiveness to various materials of different kinds, a multinary polar olefin copolymer, and an olefin-based resin composition including the polar-group-containing olefin copolymer and an olefin-based resin. The present invention has been thus accomplished.

A first aspect of the present invention is a polymer which is an olefin copolymer (A) having a specific polar group and obtained by polymerization using a transition metal catalyst, and which is characterized by showing remarkably excellent adhesiveness and being excellent in terms of various properties, so long as the content of a polar-group-containing monomer is in a specific range.

A second aspect of the invention is a polymer which is a multinary polar olefin copolymer (B) having an exceedingly narrow molecular-weight distribution within a specific range and having a melting point within a specific range, and which is characterized by showing a marked improvement in balance between adhesiveness and mechanical properties.

Furthermore, a third aspect of the invention is an olefin-based resin composition (D) which has been obtained by adding an olefin-based resin (C) in a specific proportion to a polar-group-containing olefin copolymer (A') and which has been thus made to have the excellent properties possessed by the olefin-based resin and to retain the sufficient adhesiveness to highly polar materials of different kinds which is possessed by the polar-group-containing olefin copolymer.

<<First Aspect>>

(1) A polar-group-containing olefin copolymer (A) which comprises 99.999 to 80 mol % of structural units derived from at least one of ethylene and α-olefin having 3 to 20 carbon atoms and 20 to 0.001 mol % of structural units derived from at least one polar-group-containing monomer which contains an epoxy group and is represented by the following structural formula (I) or following structural formula (II), the polar-group-containing olefin copolymer being a random copolymer obtained by copolymerization in the presence of a transition metal catalyst and having a linear molecular structure:

[Chem. 1]

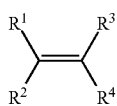
(I)

(In structural formula (I), $R^1$ represents a hydrogen atom or an alkyl group having 1 to 10 carbon atoms, and $R^2$, $R^3$, and $R^4$ each independently represent a hydrogen atom, a hydrocarbon group, or the following epoxy-group-containing specific functional group, any one of $R^2$ to $R^4$ being the following epoxy-group-containing specific functional group:

Specific functional group: a group which essentially contains an epoxy group and has a molecular structure comprising a carbon atom, an oxygen atom, and a hydrogen atom),

[Chem. 2]

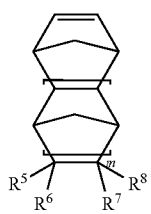
(II)

(In structural formula (II), $R^5$ to $R^8$ each independently represent a hydrogen atom, a hydrocarbon group, or the following epoxy-group-containing specific functional group, any one of $R^5$ to $R^8$ being the following epoxy-group-containing specific functional group, and m is 0 to 2:

Specific functional group: a group which essentially contains an epoxy group and has a molecular structure comprising a carbon atom, an oxygen atom, and a hydrogen atom)

(2) The polar-group-containing olefin copolymer (A) according to the (1), which has a melting point of 50 to 140° C., the melting point being the temperature corresponding to a maximum peak in an endothermic curve determined by differential scanning calorimetry (DSC).

(3) The polar-group-containing olefin copolymer (A) according to the (1) or (2), wherein the amount of aluminum (Al) in the polar-group-containing olefin copolymer is 0 to 100,000 μg per g of the copolymer.

(4) The polar-group-containing olefin copolymer (A) according to any one of the (1) to (3), which has a weight-average molecular weight (Mw), as determined by gel permeation chromatography (GPC), of 1,000 to 2,000,000.

(5) The polar-group-containing olefin copolymer (A) according to any one of the (1) to (4), which has a weight-average molecular weight (Mw), as determined by gel permeation chromatography (GPC), of 33,000 to 2,000,000.

(6) The polar-group-containing olefin copolymer (A) according to any one of the (1) to (5), wherein the transition metal catalyst is a transition metal catalyst which comprises a chelatable ligand and a Group-5 to Group-11 metal.

(7) The polar-group-containing olefin copolymer (A) according to any one of the (1) to (6), wherein the transition metal catalyst is a transition metal catalyst comprising: palladium or nickel metal; and a triarylphosphine or triarylarsine compound coordinated thereto.

<<Second Aspect>>

(8) A polar-group-containing multinary olefin copolymer (B) comprising: units of one or more nonpolar monomers (X1) selected from ethylene and α-olefins having 3 to 10 carbon atoms; units of one or more polar monomers (Z1) selected from monomers having an epoxy group; and units of any one or more non-cyclic or cyclic monomers (Z2) (with the proviso that at least one kind of units of X1, at least one kind of units of Z1, and at least one kind of units of Z2 are essentially contained), the polar-group-containing multinary olefin copolymer being a random copolymer obtained by copolymerization in the presence of a transition metal catalyst and having a linear molecular structure.

(9) The polar-group-containing multinary olefin copolymer (B) according to the (8), which has a ratio of weight-average molecular weight (Mw) to number-average molecular weight (Mn), as determined by gel permeation chromatography (GPC), in the range of 1.5 to 3.5.

(10) The polar-group-containing multinary olefin copolymer (B) according to (8) or (9), which has a melting point Tm (° C.) satisfying $50<Tm<128-6.0[Z1]$ (wherein [Z1] (mol %) is the content of monomer units derived from Z1), the melting point being the temperature corresponding to a maximum peak in an endothermic curve determined by differential scanning calorimetry (DSC).

(11) The polar-group-containing multinary olefin copolymer (B) according to any one of the (8) to (10), wherein the content of the units of one or more polar monomers (Z1) selected from monomers having an epoxy group is 0.001 to 20.000 mol %.

(12) The polar-group-containing multinary olefin copolymer (B) according to any one of the (8) to (11), wherein the units of one or more nonpolar monomers (X1) are ethylene units.
(13) The polar-group-containing multinary olefin copolymer (B) according to any one of the (8) to (12), wherein the transition metal catalyst is a transition metal catalyst which comprises a chelatable ligand and a Group-5 to Group-11 metal.
(14) The polar-group-containing multinary olefin copolymer (B) according to any one of the (8) to (13), wherein the transition metal catalyst is a transition metal catalyst comprising: palladium or nickel metal; and a triarylphosphine or triarylarsine compound coordinated thereto.

<<Third Aspect>>

(15) An olefin-based resin composition (D) comprising: a polar-group-containing olefin copolymer (A') and an olefin-based resin (C), the polar-group-containing olefin copolymer (A') being a random copolymer having a linear molecular structure and obtained by copolymerizing at least one of ethylene and α-olefin having 3 to 20 carbon atoms with a polar-group-containing monomer containing an epoxy group in the presence of a transition metal catalyst, wherein the amount of the olefin-based resin (C) incorporated is 1 to 99,900 parts by weight per 100 parts by weight of the polar-group-containing olefin copolymer (A').
(16) The olefin-based resin composition (D) according to the (15), wherein the polar-group-containing monomer containing an epoxy group is a polar-group-containing monomer containing an epoxy group, represented by the following structural formula (I) or following structural formula (II):

[Chem. 3]

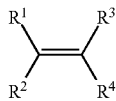

(I)

(In structural formula (I), $R^1$ represents a hydrogen atom or an alkyl group having 1 to 10 carbon atoms, and $R^2$, $R^3$, and $R^4$ each independently represent a hydrogen atom, a hydrocarbon group, or the following epoxy-group-containing specific functional group, any one of $R^2$ to $R^4$ being the following epoxy-group-containing specific functional group, Specific functional group: a group which essentially contains an epoxy group and has a molecular structure comprising a carbon atom, an oxygen atom, and a hydrogen atom),

[Chem. 4]

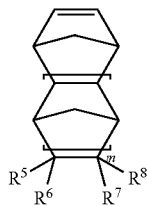

(II)

(In structural formula (II), $R^5$ to $R^8$ each independently represent a hydrogen atom, a hydrocarbon group, or the following epoxy-group-containing specific functional group, any one of $R^5$ to $R^8$ being the following epoxy-group-containing specific functional group, and m is 0 to 2:

Specific functional group: a group which essentially contains an epoxy group and has a molecular structure comprising a carbon atom, an oxygen atom, and a hydrogen atom)
(17) The olefin-based resin composition (D) according to the (15) or (16), wherein in the polar-group-containing olefin copolymer (A'), the amount of structural units derived from at least one of ethylene and α-olefin having 3 to 20 carbon atoms is 99.999 to 80 mol % and the amount of structural units derived from the polar-group-containing monomer containing an epoxy group is 20 to 0.001 mol %.
(18) The olefin-based resin composition (D) according to any one of the (15) to (17), wherein the olefin-based resin (C) is at least one of a homopolymer and a copolymer, the homopolymer and the copolymer being obtained by polymerizing a monomer selected from at least one of ethylene and α-olefin having 3 to 20 carbon atoms.
(19) The olefin-based resin composition (D) according to the (15) to (18), wherein the olefin-based resin (C) is either an ethylene homopolymer or a copolymer of ethylene with α-olefin having 3 to 20 carbon atoms.
(20) The olefin-based resin composition (D) according to any one of (15) to (19), wherein the polar-group-containing olefin copolymer (A') has a melting point in the range of 50 to 140° C., the melting point being the temperature corresponding to a maximum peak in an endothermic curve determined by differential scanning calorimetry (DSC).
(21) The olefin-based resin composition (D) according to any one of the (15) to (20), wherein the polar-group-containing olefin copolymer (A') is a copolymer obtained by polymerization in the presence of a transition metal catalyst of a Group-5 to Group-11 metal having a chelatable ligand.
(22) The olefin-based resin composition (D) according to any one of (15) to (21), wherein the polar-group-containing olefin copolymer (A') is a copolymer obtained by polymerization in the presence of a transition metal catalyst which comprises palladium or nickel metal and a triarylphosphine or triarylarsine compound coordinated thereto.
(23) The olefin-based resin composition (D') according to any one of the (15) to (22), wherein the olefin-based resin (C) has a density, as measured in accordance with JIS K7112, in the range of 0.890 to 1.20 g/cm³.
(24) The olefin-based resin composition (D') according to any one of the (15) to (23), wherein the olefin-based resin (C) has a melting point in the range of 90 to 170° C., the melting point being the temperature corresponding to a maximum peak in an endothermic curve determined by differential scanning calorimetry (DSC).
(25) The olefin-based resin composition (D') according to any one of the (15) to (24), wherein the melting point of olefin-based resin (C), which is the temperature corresponding to a maximum peak in an endothermic curve determined by differential scanning calorimetry (DSC), is in the range of 119 to 170° C. (26) The olefin-based resin composition (D') according to any one of the (15) to (25), which has a heat of fusion ΔH, as determined by differential scanning calorimetry (DSC), in the range of 80 to 300 J/g.
(27) The olefin-based resin composition (D") according to any one of the (15) to (22), wherein the olefin-based resin (C) has a melting point in the range of 30 to 124° C., the melting point being the temperature corresponding to a maximum peak in an endothermic curve determined by differential scanning calorimetry (DSC).

Further, the present invention relates to an adhesive, a layered product, and product of the other uses, which comprise at least one of the polar-group-containing olefin copolymer (A) (the First Aspect), the polar-group-containing multinary olefin copolymer (B) (the Second Aspect), and the olefin-based resin composition (D), the olefin-based resin composition (D'), and the olefin-based resin composition (D") (the Third Aspect). The details are set forth below.

(28) An adhesive which comprises the polar-group-containing olefin copolymer (A) according to any one of the (1) to (7), the polar-group-containing multinary olefin copolymer (B) according to any one of the (8) to (14), or, the olefin-based resin composition (D), the olefin-based resin composition (D') or the olefin-based resin composition (D") according to any one of (15) to (27).

(29) A layered product which comprises: the polar-group-containing olefin copolymer (A) according to any one of the (1) to (7), the polar-group-containing multinary olefin copolymer (B) according to any one of the (8) to (14), or, the olefin-based resin composition (D), the olefin-based resin composition (D') or the olefin-based resin composition (D") according to any one of (15) to (27); and a base layer.

(30) The layered product according to the (29), wherein the base layer comprises at least one member selected from olefin-based resins, highly polar thermoplastic resins, metals, vapor-deposited films of inorganic oxide, paper, cellophane, woven fabric, and nonwoven fabric.

(31) The layered product according to the (29) or (30), wherein the base layer comprises at least one member selected from polyamide-based resins, fluororesins, polyester-based resins, and ethylene/vinyl alcohol copolymers (EVOH).

Effects of the Invention

The polar-group-containing olefin copolymer (A) as the first aspect of the invention shows high adhesiveness to other bases since this copolymer has a specific molecular structure and resin properties; the multinary polar olefin copolymer (B) as the second aspect of the invention shows high adhesiveness to other bases since this copolymer has an exceedingly narrow molecular-weight distribution within a specific range and has a melting point within a specific range; and the third aspect of the invention has been accomplished by adding each of olefin-based resins (C), in a specific proportion, to the polar-group-containing olefin copolymer (A') to thereby give an olefin-based resin composition (D), an olefin-based resin composition (D'), and an olefin-based resin composition (D") which each show high adhesiveness to other bases. Thus, the present invention has made it possible to produce industrially useful layered products and composited materials. This noticeable effect has been demonstrated by the data obtained in the Examples of the invention which will be given later and by comparisons between the Examples and the Comparative Examples.

The polar-group-containing olefin copolymer (A) according to the invention, the multinary polar olefin copolymer (B) according to the invention, and the olefin-based resin composition (D), olefin-based resin composition (D'), and olefin-based resin composition (D") according to the invention, which each include the polar-group-containing olefin copolymer and an olefin-based resin, are excellent in terms of not only adhesiveness but also mechanical and thermal property and further have chemical resistance. These copolymers and compositions are hence applicable as useful multilayered molded objects, and are usable in a wide range of various applications after being molded into multilayered films, blow-molded multilayered bottles, etc. by, for example, extrusion molding, blow molding, etc.

BRIEF DESCRIPTION OF THE DRAWINGS

FIG. 1 is a drawing which shows an image of the molecular structure of an olefin copolymer produced through polymerization by a high-pressure radical polymerization process.

FIG. 2 is a drawing which shows an image of the molecular structure of an olefin copolymer produced by polymerization using a metallic catalyst, the copolymer having no long-chain branch.

FIG. 3 is a drawing which shows an image of the molecular structure of an olefin copolymer produced by polymerization using a metallic catalyst, the copolymer having a small amount of long-chain branches.

FIG. 4 is a graph which shows a relationship between the proportion of a polar-group-containing olefin copolymer (A'-3-1) and the strength of adhesion to a polyamide.

FIG. 5 is a graph which shows a relationship between the proportion of a polar-group-containing olefin copolymer (A'-3-9) and the strength of adhesion to a polyamide.

FIG. 6 is a graph which shows a relationship between the proportion of a polar-group-containing olefin copolymer (A'-3-2) and the strength of adhesion to a polyamide.

FIG. 7 is a graph which shows a relationship between the proportion of a polar-group-containing olefin copolymer (A'-3-3) and the strength of adhesion to a polyamide.

FIG. 8 is a graph which shows a relationship between the proportion of a polar-group-containing olefin copolymer (A'-3-5) and the strength of adhesion to a polyamide.

FIG. 9 is a graph which shows a relationship between the proportion of a polar-group-containing olefin copolymer (A'-3-4) and the strength of adhesion to a fluororesin.

FIG. 10 is a graph which shows a relationship between the proportion of a polar-group-containing olefin copolymer (A'-3-9) and the strength of adhesion to a fluororesin.

MODES FOR CARRYING OUT THE INVENTION

Detailed explanations are given below on each of the polar-group-containing olefin copolymer (A) of the invention, the multinary polar olefin copolymer (B) of the invention, the olefin-based resin composition (D), olefin-based resin composition (D'), and olefin-based resin composition (D") of the invention, which each include the polar-group-containing olefin copolymer and an olefin-based resin, and the adhesive and layered product of the invention, which each include any of these copolymers and compositions.

[I] with Respect to Polar-Group-Containing Olefin Copolymer (A)

(1) Polar-Group-Containing Olefin Copolymer (A)

The polar-group-containing olefin copolymer according to the invention is a copolymer of ethylene or at least one α-olefin having 3 to 20 carbon atoms with at least one epoxy-group-containing monomer, the copolymer being a random copolymer in which units of the monomers have been randomly copolymerized and which has a substantially linear molecular structure.

The polar-group-containing olefin copolymer (A) according to the invention is characterized by being obtained by polymerizing ethylene and/or α-olefin having 3 to 20 carbon atoms with at least one epoxy-group-containing monomer in the presence of a transition metal catalyst. The ethylene or α-olefin having 3 to 20 carbon atoms which is to be subjected to the polymerization is not particularly limited. Preferably, however, ethylene is essentially included, and one or more α-olefins having 3 to 20 carbon atoms may be further included according to need. Although ethylene or one of α-olefins having 3 to 20 carbon atoms may be subjected alone to the polymerization, two or more thereof may be used. Furthermore, other monomers having no polar group may be further subjected to the polymerization so long as the use thereof does not depart from the spirit of the invention. It is desirable that the proportion of structural units derived from ethylene and/or at least one of the α-olefins should be selected from the range of usually 80 to 99.999 mol %, preferably 85 to 99.99 mol %, more preferably 90 to 99.98 mol %, even more preferably 95 to 99.97 mol %.

(2) α-Olefins

The α-olefins according to the invention are α-olefins having 3 to 20 carbon atoms and represented by the structural formula $CH_2=CHR^{18}$ ($R^{18}$ is a hydrocarbon group which has 1 to 18 carbon atoms and may have a linear structure or have a branch). More preferred are α-olefins having 3 to 12 carbon atoms. Even more preferred are one or more α-olefins selected from propylene, 1-butene, 1-pentene, 1-hexene, 1-octene, 1-decene, 3-methyl-1-butene, and 4-methyl-1-pentene. More suitable are one or more α-olefins selected from propylene, 1-butene, 1-hexene, and 1-octene. One α-olefin may be subjected alone to the polymerization, or two or more α-olefins may be subjected to the polymerization.

(3) Monomers Having No Polar Group

The monomers having no polar group, in the invention, are not particularly limited so long as the monomers are ones which each have one or more carbon-carbon double bonds in the molecular structure and in which the molecule is configured of carbon and hydrogen as the only elements. Examples thereof include dienes, trienes, aromatic vinyl monomers, and cycloolefins. Preferred are butadiene, isoprene, styrene, vinylcyclohexane, cyclohexene, vinylnorbornene, and norbornene.

(4) Polar-Group-Containing Monomers

The polar-group-containing monomers according to the invention need to contain an epoxy group. So long as an olefin-based resin composition includes a polar-group-containing olefin copolymer which has epoxy groups, this composition can be laminated and bonded to bases made of highly polar thermoplastic resins, such as polyamide resins, polyester resins, ethylene/vinyl alcohol copolymers (EVOH), or fluororesins having bondability imparted thereto, and to bases made of metallic materials such as aluminum and steel.

The polar-group-containing monomers according to the invention preferably are monomers which contain an epoxy group and are represented by the following structural formula (I) or structural formula (II).

[Chem. 5]

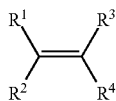

(I)

(In structural formula (I), $R^1$ represents a hydrogen atom or an alkyl group having 1 to 10 carbon atoms, and $R^2$, $R^3$, and $R^4$ each independently represent a hydrogen atom, a hydrocarbon group, or the following epoxy-group-containing specific functional group, any one of $R^2$ to $R^4$ being the following epoxy-group-containing specific functional group. Specific functional group: a group which essentially contains an epoxy group and has a molecular structure including a carbon atom, an oxygen atom, and a hydrogen atom)

[Chem. 6]

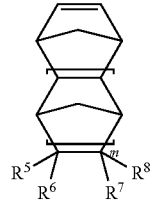

(II)

(In structural formula (II), $R^5$ to $R^8$ each independently represent a hydrogen atom, a hydrocarbon group, or the following epoxy-group-containing specific functional group, any one of $R^5$ to $R^8$ being the following epoxy-group-containing specific functional group, and m is 0 to 2.
Specific functional group: a group which essentially contains an epoxy group and has a molecular structure including a carbon atom, an oxygen atom, and a hydrogen atom)

The molecular structures of such polar-group-containing monomers are not particularly limited. However, the polar-group-containing monomers represented by structural formula (I) are more preferred when copolymerizability in the presence of a transition metal catalyst, the handleability of the polar-group-containing monomers, etc. are taken into account. More preferred are polar-group-containing monomers represented by structural formula (I) wherein $R^1$ is a hydrogen atom or an alkyl group having 1 to 10 carbon atoms, $R^2$, $R^3$, and $R^4$ are each independently any of a hydrogen atom, a hydrocarbon group, and the following epoxy-group-containing specific functional group, any one of $R^2$ to $R^4$ being the epoxy-group-containing specific functional group.

(Specific functional group: a group which essentially contains an epoxy group and further essentially contains any of a hydrocarbon group, a carbonyl group, and an ether group and which has a molecular structure including a carbon atom, an oxygen atom, and a hydrogen atom)

Examples of the polar-group-containing monomers represented by structural formula (I) or structural formula (II) include ω-alkenyl epoxides such as 5-hexene epoxide, 6-heptene epoxide, 7-octene epoxide, 8-nonene epoxide, 9-decene epoxide, 10-undecene epoxide, and 11-dodecene epoxide, ω-alkenyl epoxides having a branch in the molecular structure, such as 2-methyl-6-heptene epoxide, 2-methyl-7-octene epoxide, 2-methyl-8-nonene epoxide, 2-methyl-9-decene epoxide, and 2-methyl-10-undecene epoxide, unsaturated glycidyl ethers such as ally glycidyl ether, 2-methylallyl glycidyl ether, o-allylphenol glycidyl ether, m-allylphenol glycidyl ether, and p-allylphenol glycidyl ether, glycidyl esters of unsaturated carboxylic acids such as 4-hydroxybutyl (meth)acrylate, acrylic acid, methacrylic acid, glycidyl p-styrylcarboxylate, endo-cis-bicyclo [2,2,1] hept-5-ene-2,3-dicarboxylic acid, endo-cis-bicyclo [2,2,1] hept-5-ene-2-methyl-2,3-dicarboxylic acid, itaconic acid, citraconic acid, and butenetricarboxylic acid, cycloolefins containing an epoxy group, such as epoxyhexylnorbornene, epoxycyclohexanenorbornene, and methyl glycidyl ether norbornene, and other epoxy-group-containing monomers such as 2-(o-vinylphenyl)ethylene oxide, 2-(p-vinylphenyl)ethylene oxide, 2-(o-allylphenyl)ethylene oxide, 2-(p-allylphenyl)ethylene oxide, 2-(o-vinylphenyl)propylene oxide, 2-(p-vinylphenyl)propylene oxide, 2-(o-allylphenyl)propylene oxide, 2-(p-allylphenyl)propylene oxide, p-glycidylstyrene, 3,4-epoxy-1-butene, 3,4-epoxy-3-methyl-1-butene, 3,4-epoxy-1-pentene, 3,4-epoxy-3-methyl-1-pentene, 5,6-epoxy-1-hexene, vinylcyclohexene monoxide, allyl 2,3-epoxycyclopentyl ether, 2,3-epoxy-5-vinylnorbornane, and 1,2-epoxy-4-vinylcyclohexane. Especially preferred of these are 1,2-epoxy-9-decene, 4-hydroxybutyl acrylate glycidyl ether, glycidyl methacrylate, 1,2-epoxy-4-vinylcyclohexane, which are represented by the following structural formulae, and the like.

One epoxy-group-containing monomer may be subjected alone to the polymerization, or two or more epoxy-group-containing monomers may be used in combination.

[Chem. 7]

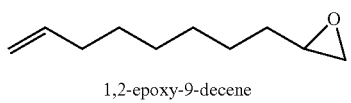

1,2-epoxy-9-decene

[Chem. 8]

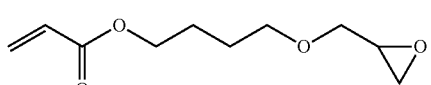

4-hydroxybutyl acrylate glycidylether

[Chem. 9]

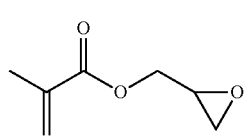

glycidyl methacrylate

[Chem. 10]

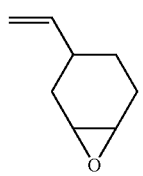

1,2-epoxy-4-vinylcyclohexane

There are cases where the polar-group-containing olefin copolymer (A), for which a monomer containing an epoxy group was used, undergoes intermolecular crosslinking due to the reaction between epoxy groups contained therein. The intermolecular crosslinking may be allowed to proceed so long as this crosslinking does not depart from the spirit of the invention.

(5) Structural Units of Polar-Group-Containing Olefin Copolymer (A)

The structural units of the polar-group-containing olefin copolymer according to the invention and the amounts of the structural units are explained.

The structure derived from one molecule of either ethylene or an α-olefin having 3 to 20 carbon atoms and the structure derived from one molecule of an epoxy-group-containing monomer are each defined as one structural unit within the polar-group-containing olefin copolymer. The proportion, in terms of mol %, of each structural unit in the polar-group-containing olefin copolymer is the amount of the structural unit.

(6) Amount of Structural Unit of Polar-Group-Containing Monomer

The amount of structural units derived from an epoxy-group-containing monomer in the polar-group-containing olefin copolymer (A) according to the invention is selected from the range of usually 20 to 0.001 mol %, preferably 15 to 0.01 mol %, more preferably 10 to 0.02 mol %, especially preferably 5 to 0.03 mol %. It is preferable that such structural units should be always present in the polar-group-containing olefin copolymer of the invention. In case where the amount of structural units derived from an epoxy-group-containing monomer is less than that range, the adhesiveness to highly polar materials of different kinds is insufficient. In case where the amount thereof is larger than that range, sufficient mechanical properties are not obtained.

(7) Method for Determining the Amount of Structural Unit of Polar-Group-Containing Monomer The amount of polar-group structural units in the polar-group-containing olefin copolymer (A) according to the invention is determined using a $^1$H-NMR spectrum. The $^1$H-NMR spectrum was obtained by the following method. A specimen was introduced, in an amount of 200 to 250 mg, into an NMR sample tube having an inner diameter of 10 mm together with 2.4 mL of o-dichlorobenzene/deuterated bromobenzene ($C_6D_5Br$)=4/1 (by volume) and with hexamethyldisiloxane as a chemical-shift reference substance. This sample tube was subjected to nitrogen displacement and then closed. The specimen was dissolved by heating to obtain an even solution, which was subjected to NMR spectroscopy. The NMR spectroscopy was performed at 120° C. using NMR apparatus Type AV400M, manufactured by Bruker Biospin K.K., to which a cryoprobe having a diameter of 10 mm had been attached. The $^1$H-NMR examination was made under the conditions of a pulse angle of 1° and a pulse interval of 1.8 seconds, the number of integrations being 1,024 or more. Chemical shifts were set so that the peak for the methyl protons of hexamethyldisiloxane was at 0.088 ppm, and the chemical shifts for other kinds of protons were determined using that chemical shift as a reference. A $^{13}$C-NMR examination was made by the complete proton decoupling method under the conditions of a pulse angle of 90° and a pulse interval of 20 seconds, the number of integrations being 512 or more. Chemical shifts were set so that the peak for the methyl carbon of hexamethyldisiloxane was at 1.98 ppm, and the chemical shifts for other kinds of carbon atoms were determined using that chemical shift as a reference.

Amounts of the Structural Units of Polar-Group-Containing Monomers

[Amount of Structural Unit of 4-Hydroxybutyl Acrylate Glycidyl Ether (4-HBAGE)]

The sum of the integrated intensities of peaks assigned to the polar-group-containing olefin copolymer and appearing in the range of 0.3 to 3.1 ppm was expressed by IA1, and the sum of the integrated intensities of peaks which were assigned to the protons of the 4-HBAGE contained in the copolymer and which appeared at 2.4, 2.6, 3.0, 3.3, 3.4, 3.5, and 4.1 ppm was expressed by IX1. The amount of the structural unit was determined in accordance with the following equation.

Content of 4-HBAGE(mol %)=40×$IX1$/($IA1$−0.6×$IX1$)

[Amount of Structural Unit of 1,2-Epoxy-9-Decene (C8-EPO)]

The sum of the integrated intensities of peaks assigned to the polar-group-containing olefin copolymer (A) and appearing in the range of 0.3 to 3.1 ppm was expressed by IA2, and the sum of the integrated intensities of peaks which were assigned to the protons of the C8-EPO contained in the copolymer and which appeared at 2.4, 2.6, and 2.8 ppm was expressed by IX2. The amount of the structural unit was determined in accordance with the following equation.

Content of C8-EPO(mol %)=(400/3)×IX2/(IA2−11/3×IX2)

[Amount of Structural Unit of 1,2-Epoxy-4-Vinylcyclohexane (EP-VCH)]

The sum of the integrated intensities of peaks assigned to the polar-group-containing olefin copolymer and appearing in the range of 0.3 to 3.2 ppm was expressed by IA2, and the sum of the integrated intensities of peaks which were assigned to the protons of the EP-VCH contained in the copolymer and which appeared at around 3.0 ppm was expressed by IX2. The amount of the structural unit was determined in accordance with the following equation.

Content of EP-VCH(mol %)=100×IX2/(0.5×IA2−2×IX2)

[Amount of Structural Unit of Glycidyl Methacrylate (GMA)]

The sum of the integrated intensities of peaks assigned to the polar-group-containing olefin copolymer (A) and appearing in the range of 0.3 to 3.2 ppm was expressed by IA3, and the sum of the integrated intensities of peaks which were assigned to the protons of the GMA contained in the copolymer and which appeared at 2.5, 2.6, 3.1, 3.9, and 4.3 ppm was expressed by IX3. The amount of the structural unit was determined in accordance with the following equation.

Content of GMA(mol %)=80×IX3/(IA3−0.8×IX3)

(8) Molecular Structure of Polar-Group-Containing Olefin Copolymer (A)

The polar-group-containing olefin copolymer (A) according to the invention is a random copolymer of ethylene and/or α-olefin having 3 to 20 carbon atoms with at least one epoxy-group-containing monomer.

An example of the molecular structure of the polar-group-containing olefin copolymer (A) in the invention is shown in the following paragraph. The term random copolymer means a copolymer in which, as in the molecular-structure example shown in the following paragraph, the probability that structural unit A or structural unit B is found at any position within the molecular chain is independent of the kind of the structural unit which adjoins that structural unit. The molecular-chain terminals of the polar-group-containing olefin copolymer may be ethylene and/or an α-olefin having 3 to 20 carbon atoms, or may be an epoxy-group-containing monomer. As shown below, the molecular structure (example) of the polar-group-containing olefin copolymer in the invention is a random copolymer configured from ethylene or an α-olefin having 3 to 20 carbon atoms and from an epoxy-containing monomer.

-ABAAAABBAABAAA- [Chem. 11]

A: ethylene or α-olefin having 3 to 20 carbon atoms
B: epoxy-group-containing monomer Incidentally, the molecular structure (example) of an olefin copolymer into which polar groups have been introduced by graft modification is shown below for reference. In this molecular structure, some of the olefin copolymer formed by copolymerizing ethylene or an α-olefin having 3 to 20 carbon atoms has been graft-modified with an epoxy-group-containing monomer.

[Chem. 12]

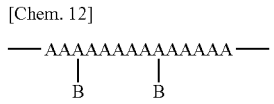

A: ethylene or α-olefin having 3 to 20 carbon atoms
B: epoxy-group-containing monomer The polar-group-containing olefin copolymer (A) according to the invention is characterized by being produced in the presence of a transition metal catalyst, and the molecular structure thereof is linear. An image of an olefin copolymer produced through polymerization by a high-pressure radical polymerization process is shown as an example in FIG. 1, while images of olefin copolymers produced by polymerization using a metallic catalyst are shown as examples in FIG. 2 and FIG. 3. As apparent from the drawings, the molecular structures differ depending on the production processes. Such differences in molecular structure can be controlled by selecting a production process. However, as described in, for example, JP-A-2010-150532, the molecular structure of a copolymer can be presumed also from the complex modulus of elasticity measured with a rotary rheometer. More specifically, in the case where a copolymer, when examined with a rotary rheometer, has a complex modulus of elasticity wherein the phase angle δ(G*=0.1 MPa) at absolute value G*=0.1 MPa is 40 degrees or larger, the molecular structure thereof is a linear structure such as that shown in FIG. 2 or FIG. 3. That is, this copolymer shows a structure which contains no long-chain branch at all (FIG. 2) or a structure which contains a small amount of long-chain branches to such a degree as not to affect the mechanical strength (FIG. 3). Meanwhile, in the case where a copolymer, when examined with a rotary rheometer, has a complex modulus of elasticity wherein the phase angle δ(G*=0.1 MPa) at absolute value G*=0.1 MPa is less than 40 degrees, this copolymer shows a molecular structure which contains long-chain branches in too large an amount, such as that shown in FIG. 1, and has poor mechanical strength. The phase angle δ at absolute value G*=0.1 MPa in the complex modulus of elasticity determined with a rotary rheometer is affected by both the molecular-weight distribution and the long-chain branches. However, with respect only to copolymers in which Mw/Mn≤4, more preferably Mw/Mn≤3, the phase angle δ(G*=0.1 MPa) can be an index to the amount of long-chain branches; the larger the amount of long-chain branches, the smaller the value of δ(G*=0.1 MPa). Incidentally, so long as Mw/Mn is 1.5 or larger, the value of δ(G*=0.1 MPa) does not exceed 75 degrees even when the copolymer has no long-chain branch.

(9) Weight-Average Molecular Weight (Mw) of Polar-Group-Containing Olefin Copolymer (A)

It is desirable that the weight-average molecular weight (Mw) of the polar-group-containing olefin copolymer (A) according to the invention should be in the range of usually 1,000 to 2,000,000, preferably 10,000 to 1,500,000, more preferably 20,000 to 1,000,000, even more preferably 31,000 to 800,000, especially preferably 33,000 to 800,000. In case where the Mw thereof is less than 1,000, this copolymer is insufficient in properties such as mechanical strength and impact resistance and shows poor adhesiveness to highly polar materials of different kinds. In case where the Mw thereof exceeds 2,000,000, this copolymer has exceedingly high melt viscosity and is difficult to mold.

The weight-average molecular weight (Mw) of the polar-group-containing olefin copolymer (A) according to the invention is determined by gel permeation chromatography (GPC). The molecular-weight distribution parameter (Mw/Mn) is obtained by further determining the number-average molecular weight (Mn) by gel permeation chromatography (GPC) and calculating the ratio between the Mw and the Mn, i.e., Mw/Mn.

A method of measurement by GPC according to the invention is as follows. (Measurement Conditions) Kind of apparatus used, 150C, manufactured by Waters Inc.; detector, IR detector MIRAN 1A (measuring wavelength, 3.42 µm), manufactured by FOXBORO Company; measuring temperature, 140° C.; solvent, o-dichlorobenzene (ODCB); columns, AD806M/S (three columns), manufactured by Showa Denko K.K.; flow rate, 1.0 mL/min; injection amount, 0.2 mL
(Preparation of Specimen) A specimen is prepared as a 1-mg/mL solution using ODCB (containing 0.5 mg/mL BHT (2,6-di-t-butyl-4-methylphenol)), the copolymer being dissolved by heating at 140° C. for about 1 hour.
(Calculation of Molecular Weights) Conversion from retention volume to a molecular weight is made by the standard polystyrene method using a calibration curve which has been drawn beforehand with standard polystyrenes. The standard polystyrenes to be used are ones which have the following trade names: F380, F288, F128, F80, F40, F20, F10, F4, F1, A5000, A2500, and A1000, all manufactured by Tosoh Corp. Solutions obtained by dissolving these standard polystyrenes in ODCB (containing 0.5 mg/mL BHT) each in a concentration of 0.5 mg/mL are injected each in an amount of 0.2 mL to draw a calibration curve. The calibration curve is approximated by the least square method, and the resultant cubic equation is used. For the viscosity equation $[\eta]=K \times M^\alpha$ for use in conversion into the molecular weight, the following numerals are used.

PS: $K=1.38 \times 10-4$, $\alpha=0.7$
PE: $K=3.92 \times 10-4$, $\alpha=0.733$
PP: $K=1.03 \times 10-4$, $\alpha=0.78$

(10) Melting Point of Polar-Group-Containing Olefin Copolymer (A)

The melting point of the olefin-based resin (A) according to the invention is expressed in terms of the maximum-peak temperature in an endothermic curve determined with a differential scanning calorimeter (DSC). In the case where the endothermic curve, which is obtained by plotting heat flow (mW) as ordinate and temperature (° C.) as abscissa in a DSC examination, shows a plurality of peaks, the term maximum-peak temperature means the temperature corresponding to the peak which is the highest among these in terms of height from the base line. In the case where the endothermic curve shows only one peak, that term means the temperature corresponding to this peak.

On the supposition of polyethylene, the melting point is preferably 50 to 140° C., more preferably 60 to 138° C., most preferably 70 to 135° C. In case where the melting point is lower than that range, the resin has insufficient heat resistance. In case where the melting point is higher than that range, the resin shows poor adhesiveness.

[II] with Respect to Polar-Group-Containing Multinary Olefin Copolymer (B)

(1) Polar-Group-Containing Multinary Olefin Copolymer (B)

The polar-group-containing multinary olefin copolymer (B) according to the invention is a multinary polar olefin copolymer (B) which essentially includes three kinds of components derived from: one or more nonpolar monomers (X1) selected from ethylene and α-olefins having 3 to 10 carbon atoms; one or more polar-group-containing monomers (Z1) selected from monomers having an epoxy group; and one or more other monomers (Z2). Incidentally, polar-group-containing multinary olefin copolymers (B) obtained by copolymerizing monomers (X1), (Z1), and (Z2) by graft polymerization, high-pressure radical polymerization, or any of the other polymerization methods described above are already known. However, the copolymer (B) according to the invention is a random copolymer which, in contrast to such known polar-group-containing multinary olefin copolymers, has been obtained by polymerization in the presence of a transition metal and has the feature of having a substantially linear molecular structure. In addition, this copolymer (B) satisfies the requirement of having a remarkable adhesion effect. This copolymer (B) hence differs considerably from the known copolymers.

(2) Nonpolar Monomers (X1)

Examples of the nonpolar monomers (X1) according to the invention include ethylene and/or α-olefins having 3 to 10 carbon atoms.

Preferred examples thereof include ethylene, propylene, 1-butene, 1-pentene, 1-hexene, 1-octene, 1-decene, 3-methyl-1-butene, and 4-methyl-1-pentene. Especially preferred examples thereof include ethylene. One α-olefin may be used, or two or more α-olefins may be used in combination.

Examples of combinations of two include ethylene/propylene, ethylene/1-butene, ethylene/1-hexene, ethylene/1-octene, propylene/1-butene, propylene/1-hexene, and propylene/1-octene.

Examples of combinations of three include ethylene/propylene/1-butene, ethylene/propylene/1-hexene, ethylene/propylene/1-octene, propylene/1-butene/hexene, and propylene/1-butene/1-octene.

(3) Polar-Group-Containing Monomers (Z1) Containing Epoxy Group

The polar-group-containing monomers (Z1) according to the invention need to contain an epoxy group. So long as the olefin copolymer has epoxy groups, this copolymer can be laminated and bonded to bases made of highly polar thermoplastic resins, such as polyamide resins, polyester resins, ethylene/vinyl alcohol copolymers (EVOH), and bondable fluororesins, and of metallic materials such as aluminum and steel.

As the polar-group-containing monomers containing an epoxy group, use can be suitably made of those shown above as examples with regard to the polar-group-containing olefin copolymer (A) described above.

(4) Other Monomers (Z2)

As the other monomers (Z2), which are a third component, any desired monomers which are identical with neither (X1) nor (Z1) can be used. For example, in the case where ethylene was selected as (X1), ethylene cannot be used as (Z2), but other α-olefins such as, for example, 1-butene and 1-hexene are usable. Similarly, in the case where 4-hydroxybutyl acrylate glycidylether was selected as (Z1), any monomer which is not 4-hydroxybutyl acrylate glycidylether can be used, such as, for example, an epoxy-group-containing monomer other than 4-hydroxybutyl acrylate glycidylether or an acid-anhydride-containing monomer.

The other monomers (Z2) are compounds which each essentially contain a carbon-carbon double bond in the molecule and which may have a substituent (polar group)

containing an atom having an electronegativity different from that of the carbon atom but need to have the substituent.

Examples of the polar group include halogens, hydroxy group (—OH), carboxyl group (—COOH), formyl group (—CHO), alkoxy groups (—OR), ester groups (—COOR), nitrile group (—CN), ether group (—O—), carbonyl group (=CO), epoxy group, and acid anhydride groups.

The other monomers (Z2) according to the invention are classified into non-cyclic monomers or cyclic monomers by the position of the carbon-carbon double bond in the molecule. Incidentally, the non-cyclic monomers each may have a cyclic structure in the molecule so long as the carbon-carbon double bond is located in the non-cyclic portion of the molecule.

(4-1) Non-Cyclic Monomers

Examples of the non-cyclic monomers include α-olefins, unsaturated carboxylic acids, unsaturated carboxylic acid anhydrides (in the case where the carbon-carbon double bond is not in a circle), and (meth)acrylic acid esters.

The α-olefins according to the invention are α-olefins having 3 to 20 carbon atoms and are represented by the structural formula $CH_2=CHR^{18}$. In the formula, $R^{18}$ is a hydrogen atom or a hydrocarbon group having 1-18 carbon atoms. $R^{18}$ may be linear, branched, or cyclic and may have an unsaturated bond. $R^{18}$ may contain a heteroatom at any position therein. Preferred examples among such α-olefins include α-olefins in which $R^{18}$ is a hydrogen atom or has 1-10 carbon atoms.

Specific compounds as examples of the α-olefins include ethylene, propylene, 1-butene, 1-pentene, 1-hexene, 1-octene, 1-decene, 3-methyl-1-butene, 4-methyl-1-pentene, vinylcyclohexene, 1,2-epoxy-4-vinylcyclohexene, styrene, 6-hydroxy-1-hexene, 8-hydroxy-1-octene, 9,10-oxy-1-decene, 7-(N,N-dimethylamino)-1-heptene, 3-triethoxysilyl-1-propene, ally alcohol, 2-allyloxyethanol, and ally acetate.

Examples of the unsaturated carboxylic acids include methacrylic acid, maleic acid, fumaric acid, tetrahydrophthalic acid, itaconic acid, citraconic acid, crotonic acid, isocrotonic acid, norbornenedicarboxylic acid, and bicyclo[2,2,1]hept-2-ene-5,6-dicarboxylic acid.

Examples of the unsaturated carboxylic acid anhydrides (in the case where the carbon-carbon double bond is not in a circle) include itaconic anhydride and 2,7-octadien-1-ylsuccinic anhydride.

The (meth)acrylic acid esters according to the invention are compounds represented by the structural formula $CH_2=C(R^{21})CO_2(R^{22})$. In the formula, $R^{21}$ is a hydrogen atom or a hydrocarbon group having 1-10 carbon atoms, may be linear, branched, or cyclic, and may have an unsaturated bond. $R^{22}$ is a hydrocarbon group having 1 to 30 carbon atoms, may be linear, branched, or cyclic, and may have an unsaturated bond. Furthermore, $R^{22}$ may contain a heteroatom at any position therein.

Preferred examples of the (meth)acrylic acid esters include (meth)acrylic acid esters in which $R^{21}$ is a hydrogen atom or a hydrocarbon group having 1 to 5 carbon atoms. More preferred examples thereof include acrylic acid esters in which $R^{21}$ is a hydrogen atom or methacrylic acid esters in which $R^{21}$ is methyl.

Specific examples of the (meth)acrylic esters include methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, pentyl (meth)acrylate, hexyl (meth)acrylate, cyclohexyl (meth)acrylate, octyl (meth)acrylate, 2-ethylhexyl (meth)acrylate, nonyl (meth)acrylate, decyl (meth)acrylate, dodecyl (meth)acrylate, phenyl (meth)acrylate, toluyl (meth)acrylate, benzyl (meth)acrylate, hydroxyethyl (meth)acrylate, hydroxybutyl (meth)acrylate, 1,4-cyclohexanedimethanol mono(meth)acrylate, 4-hydroxybutyl (meth)acrylate glycidyl ether (4-HBAGE), 2-methoxyethyl (meth)acrylate, 3-methoxypropyl (meth)acrylate, glycidyl (meth)acrylate, (meth)acrylic acid ethylene oxide, trifluoromethyl (meth)acrylate, 2-trifluoromethylethyl (meth)acrylate, and perfluoroethyl (meth)acrylate.

One (meth)acrylic acid ester may be used, or a plurality of (meth)acrylic acid esters may be used in combination.

Preferred compounds include methyl acrylate, ethyl acrylate, n-butyl acrylate, t-butyl acrylate, and 4-hydroxybutyl acrylate glycidyl ether.

(4-2) Cyclic Monomers

Examples of the cyclic monomers include norbornene-based olefins and unsaturated carboxylic acid anhydrides (in the case where the carbon-carbon double bond is in a circle). Examples thereof further include compounds having the framework of a cycloolefin, such as cyclopentene, cyclohexene, norbornene, and ethylidenenorbornene, and derivative thereof which are compounds having a hydroxy group, alkoxide group, carboxylic acid group, ester group, aldehyde group, acid anhydride group, or epoxy group.

Examples of the unsaturated carboxylic acid anhydrides (in the case where the carbon-carbon double bond is in a circle) include maleic anhydride, citraconic anhydride, tetrahydrophthalic anhydride, 5-norbornene-2,3-dicarboxylic acid anhydride, 3,6-epoxy-1,2,3,6-tetrahydrophthalic anhydride, and tetracyclo [6.2.1.13,6.02,7]dodeca-9-ene-4,5-dicarboxylic acid anhydride.

Examples of the norbornene-based olefins include the compound represented by the following structural formula (E) or structural formula (F). Structural formula (E) is norbornene having an acid anhydride group (a product of the Diels-Alder reaction of cyclopentadiene with maleic anhydride, i.e., 5-norbornene-2,3-dicarboxylic acid anhydride), and structural formula (F) is norbornene having a hydroxy group.

[Chem. 13]

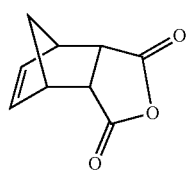

Structural formula (E)

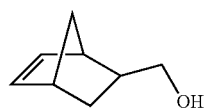

Structural formula (F)

(5) Amounts of Structural Units of Monomers (X1), (Z1), and (Z2)

The polar-group-containing multinary olefin copolymer (B) according to the invention needs to include the units of monomers of three kinds in total, which include one or more monomers (X1), one or more monomers (Z1), and one or more monomers (Z2).

The amount of the structural unit of (X1) is 80.000 to 99.998 mol %, preferably 80.000 to 99.98 mol %, more preferably 80.000 to 99.94 mol %. The amount of the structural unit of (Z1) is 0.001 to 19.999 mol %, preferably 0.01 to 15.000 mol %, more preferably 0.02 to 10.000 mol %, even more preferably 0.02 to 5.000 mol %. The amount of the structural unit of (Z2) is 0.001 to 19.999 mol %, preferably 0.01 to 15.000 mol %, more preferably 0.02 to 10.000 μmol %, even more preferably 0.02 to 5.000 mol %. (X1)+(Z1)+(Z2) must be 100 μmol %.

In the multinary olefin copolymer (B) according to the invention, the crystallinity of the copolymer is determined by the contents of the monomers other than ethylene in cases when the polymerization was conducted in the presence of a transition metal catalyst and when ethylene was selected as (X1). For example, in the case of a copolymer of ethylene with (Z1), the content of (Z1) is a factor which strongly affects the crystallinity of the copolymer.

Meanwhile, in the course of investigations which led to the present invention, the inventors discovered a factor that affects adhesiveness, besides the content of (Z1) in the copolymer. Namely, the inventors discovered that a copolymer having a lower melting point shows higher adhesiveness. Specifically, the inventors showed that for further heightening adhesiveness, it is important that the copolymer should contain (Z1) in an amount of 0.001 mol % or larger and that another monomer (Z2) should be introduced to thereby lower the melting point of the copolymer. The main purpose of copolymerizing monomer (Z2) in producing the copolymer is to control the melting point of the copolymer, and monomer (Z2) is not limited because of this. In addition, monomer (Z1) is frequently expensive as compared with monomer (X1) and monomer (Z2). According to the invention, a minimum amount of monomer (Z1) which is necessary for heightening adhesiveness may be determined first and the adhesiveness of the copolymer to be produced can be further heightened by further copolymerizing monomer (Z2) in an appropriate amount.

The reason why copolymers having a lower melting point and higher flexibility have higher adhesiveness is not clear. However, it is probably presumed that when a peel test such as those shown in JIS K6854, 1-4 (1999) "Adhesives—Peel Adhesion Strength Test Methods" is conducted, flexible adhesives themselves show a larger deformation and the magnitude of this deformation is measured as stress, resulting in high adhesiveness.

Furthermore, since the melting point of the copolymer according to the invention can be regulated at will without changing the content of polar groups derived from monomer (Z1), the invention can attain both the adhesiveness and mechanical properties, in particular, impact resistance, of the copolymer.

(6) Structural Units of Polar-Group-Containing Olefin Copolymer (B)

The structural units of the polar-group-containing multinary olefin copolymer (B) according to the invention and the amounts of the structural units are explained.

The structure derived from one molecule of ethylene and/or an α-olefin having 3 to 10 carbon atoms (X1), the structure derived from one molecule of an epoxy-group-containing monomer (Z1), and the structure derived from one molecule of another monomer (Z2) are each defined as one structural unit within the polar-group-containing olefin copolymer (B). The proportion, in terms of mol %, of each structural unit in the polar-group-containing olefin copolymer (B) is the amount of the structural unit.

(7) Amount of Structural Unit of Epoxy-Group-Containing Monomer (Z1)

The amount of the structural unit of (Z1) according to the invention is selected from the range of usually 0.001 to 19.999 mol %, preferably 0.01 to 15.000 mol %, more preferably 0.02 to 10.000 mol %, especially preferably 0.02 to 5.000 mol %. It is preferable that such structural units should be always present in the copolymer according to the invention. In case where the amount of structural units derived from the polar-group-containing monomer is less than that range, the adhesiveness to highly polar materials of different kinds is insufficient. In case where the amount thereof is larger than that range, sufficient mechanical properties are not obtained. One polar-group-containing monomer may be used alone, or two or more polar-group-containing monomers may be used in combination. The amount of the structural unit of each monomer can be determined by the method employing $^1$H-NMR described above.

(8) Weight-Average Molecular Weight (Mw) and Molecular-Weight Distribution Parameter (Mw/Mn) of Polar-Group-Containing Multinary Olefin Copolymer (B)

It is desirable that the weight-average molecular weight (Mw) of the polar-group-containing multinary olefin copolymer (B) according to the invention should be in the range of usually 1,000 to 2,000,000, preferably 10,000 to 1,500,000, more preferably 20,000 to 1,000,000, even more preferably 31,000 to 8,000,000, especially preferably 33,000 to 800,000. In case where the Mw thereof is less than 1,000, this copolymer is insufficient in properties such as mechanical strength and impact resistance. In case where the Mw thereof exceeds 2,000,000, this copolymer has exceedingly high melt viscosity and is difficult to mold.

It is desirable that the ratio of weight-average molecular weight (Mw) to number-average molecular weight (Mn), Mw/Mn, of the polar-group-containing multinary olefin copolymer (B) according to the invention should be in the range of usually 1.5 to 3.5, preferably 1.6 to 3.3, more preferably 1.7 to 3.0. In case where the Mw/Mn thereof is less than 1.5, this copolymer is insufficient in suitability for various kinds of processing, including laminating. In case where the Mw/Mn thereof exceeds 3.5, this copolymer shows poor adhesion strength. There are cases where Mw/Mn is referred to as molecular-weight distribution parameter.

(9) Melting Point

The multinary olefin copolymer (B) according to the invention needs to satisfy the following relationship between the melting point Tm (° C.) thereof and the content of the polar-group-containing monomer [Z1] therein.

$$50 < Tm < 128 - 6.0[Z1]$$

It was discovered that factors which affect the adhesiveness of a copolymer include not only the (Z1) content of the copolymer but also the melting point of the copolymer, which considerably affects the adhesiveness, and that copolymers having a lower melting point show higher adhesiveness. However, as a result of investigations made by the present inventors, it was discovered that in the case of, for example, an ethylene/(Z1) binary copolymer, for which ethylene was selected as (X1), the melting point of this copolymer depends on the content of (Z1) and it is extremely difficult to lower the melting point thereof to below 128–6.0[Z1] (° C.). There have hence been limitations in improving the adhesiveness.

Because of this, in case where the melting point of the copolymer according to the invention exceeds 128–6.0[Z1], an improvement in adhesiveness cannot be expected and sufficient adhesiveness is not imparted thereto. Meanwhile, in case where the melting point thereof is lower than 50° C., this ethylene-based copolymer cannot retain the minimum heat resistance required.

(10) Molecular Structure of Polar-Group-Containing Multinary Olefin Copolymer (B)

The polar-group-containing olefin copolymer (B) according to the invention is a random copolymer of (X1), (Z1), and (Z2).

The polar-group-containing multinary olefin copolymer (B) according to the invention is characterized by being produced in the presence of a transition metal catalyst, and the molecular structure thereof is linear.

[III] with Respect to Production of Polar-Group-Containing Olefin Copolymer (A), Polar-Group-Containing Olefin Copolymer (A'), and Polar-Group-Containing Multinary Olefin Copolymer (B)

The polar-group-containing olefin copolymer (A), polar-group-containing olefin copolymer (A'), and polar-group-containing multinary olefin copolymer (B) according to the invention are obtained by suitably copolymerizing the monomers using a transition metal catalyst.

(1) Polymerization Catalyst for Polar-Group-Containing Olefin Copolymer (A), Polar-Group-Containing Olefin Copolymer (A'), and Polar-Group-Containing Multinary Olefin Copolymer (B)

The kind of the polymerization catalyst to be used for producing the polar-group-containing olefin copolymer (A), polar-group-containing olefin copolymer (A'), and polar-group-containing multinary olefin copolymer (B) according to the invention is not particularly limited so long as ethylene and/or one or more α-olefins having 3 to 20 carbon atoms can be copolymerized with one or more epoxy-group-containing monomers using the catalyst. Examples thereof include compounds of a Group-5 to Group-11 transition metal which has a chelatable ligand.

Preferred examples of the transition metal include a vanadium atom, niobium atom, tantalum atom, chromium atom, molybdenum atom, tungsten atom, manganese atom, iron atom, platinum atom, ruthenium atom, cobalt atom, rhodium atom, nickel atom, palladium atom, and copper atom.

Preferred of these are a vanadium atom, iron atom, platinum atom, cobalt atom, nickel atom, palladium atom, and rhodium atom. Especially preferred are a platinum atom, cobalt atom, nickel atom, and palladium atom. One of these metals may be used alone, or two or more thereof may be used in combination.

From the standpoint of activity in polymerization, it is preferable that the transition metal M of the transition metal catalyst according to the invention should be an element selected from the group consisting of nickel(II), palladium (II), platinum(II), cobalt(II), and rhodium(III), in particular, any of the Group-10 elements. Especially from the standpoints of cost, etc., nickel(II) is preferred. The chelatable ligand includes a ligand which has at least two atoms selected from the group consisting of P, N, O, and S and which is bidentate or multidentate. The chelatable ligand is electronically neutral or anionic. Examples of the structure thereof are shown in a survey made by Brookhart, et al. (*Chem. Rev.*, 2000, 100, 1169).

Preferred examples of bidentate anionic P,O ligands include phosphorus sulfonic acids, phosphorus carboxylic acids, phosphorus phenols, and phosphorus enolates. Furthermore, examples of bidentate anionic N,O ligands include salicylaldiminates and pyridinecarboxylic acid. Other examples include diimine ligands, diphenoxide ligands, and diamide ligands.

The structures of metal complexes obtained from chelatable ligands are represented by the following structural formula (A) and/or (B), to which an arylphosphine compound, arylarsine compound, or arylantimony compound that may have one or more substituents has coordinated.

[Chem. 14]

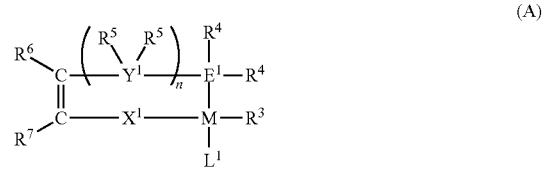

(A)

[Chem. 15]

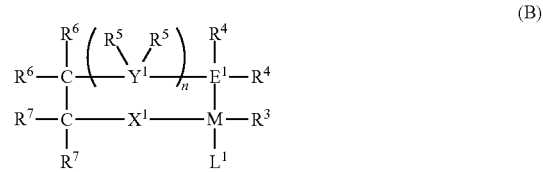

(B)

(In structural formulae (A) and (B), M represents a transition metal belonging to any of Group 5 to Group 11 of the periodic table of elements, i.e., the transition metal described above. $X^1$ represents oxygen, sulfur, $-SO_3-$, or $-CO_2-$. $Y^1$ represents carbon or silicon. Symbol n represents an integer of 0 or 1. $E^1$ represents phosphorus, arsenic, or antimony. $R^3$ and $R^4$ each independently represent hydrogen or a hydrocarbon group which has 1 to 30 carbon atoms and may contain a heteroatom. The $R^5$ moieties each independently represent hydrogen, a halogen, or a hydrocarbon group which has 1 to 30 carbon atoms and may contain a heteroatom. $R^6$ and $R^7$ each independently represent a hydrogen atom, a halogen atom, a hydrocarbon group which has 1 to 30 carbon atoms and may contain a heteroatom, $OR^2$, $CO_2R^2$, $CO_2M'$, $C(O)N(R^1)_2$, $C(O)R^2$, $SR^2$, $SO_2R^2$, $SOR^2$, $OSO_2R^2$, $P(O)(OR^2)_{2-y}(R^1)_y$, $CN$, $NHR^2$, $N(R^2)_2$, $Si(OR^1)_{3-x}(R^1)_x$, $OSi(OR^1)_{3-x}(R^1)_x$, $NO_2$, $SO_3M'$, $PO_3M'_2$, $P(O)(OR_2)_2M'$, or an epoxy-containing group. M' represents an alkali metal, an alkaline earth metal, ammonium, quaternary ammonium, or phosphonium; x represents an integer of 0 to 3; and y represents an integer of 0 to 2. Incidentally, $R^6$ and $R^7$ may be linked to each other to form an alicyclic ring, an aromatic ring, or a heterocycle containing a heteroatom selected from oxygen, nitrogen, and sulfur. These rings each are a 5- to 8-membered ring, which may have one or more substituents thereon but need not have a substituent. $R^1$ represents hydrogen or a hydrocarbon group having 1 to 20 carbon atoms. $R^2$ represents a hydrocarbon group having 1 to 20 carbon atoms. $L^1$ represents a ligand coordinated to the M. $R^3$ and $L^1$ may be bonded to each other to form a ring.) More preferred is a transition metal complex represented by the following structural formula (C).

[Chem. 16]

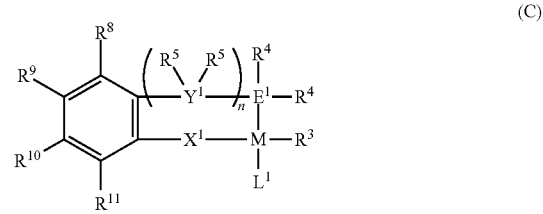

(C)

(In structural formula (C), M represents a transition metal belonging to any of Group 5 to Group 11 of the periodic table of elements, i.e., the transition metal described above. $X^1$ represents oxygen, sulfur, —$SO_3$—, or —$CO_2$—. $Y^1$ represents carbon or silicon. Symbol n represents an integer of 0 or 1. $E^1$ represents phosphorus, arsenic, or antimony. $R^3$ and $R^4$ each independently represent hydrogen or a hydrocarbon group which has 1 to 30 carbon atoms and may contain a heteroatom. The $R^5$ moieties each independently represent hydrogen, a halogen, or a hydrocarbon group which has 1 to 30 carbon atoms and may contain a heteroatom. $R^8$, $R^9$, $R^{10}$, and $R^{11}$ each independently represent a hydrogen atom, a halogen atom, a hydrocarbon group which has 1 to 30 carbon atoms and may contain a heteroatom, $OR^2$, $CO_2R^2$, $CO_2M'$, $C(O)N(R^1)_2$, $C(O)R^2$, $SR^2$, $SO_2R^2$, $SOR^2$, $OSO_2R^2$, $P(O)(OR^2)_{2-y}(R^1)_y$, CN, $NHR^2$, $N(R^2)_2$, $Si(OR^1)_{3-x}(R^1)_x$, $OSi(OR^1)_{3-x}(R^1)_x$, $NO_2$, $SO_3M'$, $PO_3M'_2$, $P(O)(OR^2)_2M'$, or an epoxy-containing group. M' represents an alkali metal, an alkaline earth metal, ammonium, quaternary ammonium, or phosphonium; x represents an integer of 0 to 3; and y represents an integer of 0 to 2. Incidentally, two or more groups suitably selected from $R^8$ to $R^{11}$ may be linked to each other to form an alicyclic ring, an aromatic ring, or a heterocycle containing a heteroatom selected from oxygen, nitrogen, and sulfur. These rings each are a 5- to 8-membered ring, which may have one or more substituents thereon but need not have a substituent. $R^1$ represents hydrogen or a hydrocarbon group having 1 to 20 carbon atoms. $R^2$ represents a hydrocarbon group having 1 to 20 carbon atoms. $L^1$ represents a ligand coordinated to the M. $R^3$ and $L^1$ may be bonded to each other to form a ring.)

Representative known examples of the catalyst including a Group-5 to Group-11 transition metal compound having a chelatable ligand are catalysts of the so-called SHOP type and Drent type. The SHOP type catalyst is a catalyst including nickel metal and, coordinated thereto, a phosphorus-based ligand having an aryl group which may have a substituent (see, for example, International Publication WO 2010/050256). The Drent type catalyst is a catalyst including palladium metal and, coordinated thereto, a phosphorus-based ligand having an aryl group which may have a substituent (see, for example, JP-A-2010-202647).

(2) Organometallic Compound

When the polar-group-containing olefin copolymer (A), polar-group-containing olefin copolymer (A'), or polar-group-containing multinary olefin copolymer (B) according to the invention is produced, the activity in polymerization can be further heightened by a method in which an epoxy-group-containing monomer is brought into contact with a small amount of an organometallic compound and, thereafter, ethylene and/or an α-olefin having 3 to 20 carbon atoms is copolymerized with the epoxy-group-containing monomer in the presence of the transition metal catalyst.

The organometallic compound is an organometallic compound including one or more hydrocarbon groups which may have a substituent, and can be represented by the following structural formula (H).

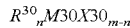  structural formula (H)

(In the formula, $R^{30}$ represents a hydrocarbon group which has 1 to 12 carbon atoms and may have a substituent; M30 is a metal selected from the group consisting of Group-1, Group-2, Group-12, and Group-13 elements of the periodic table; X30 represents a halogen atom or a hydrogen atom; m indicates the valence of the M30; and n is 1 to m.)

Examples of the organometallic compound represented by structural formula (H) include alkylaluminums such as tri-n-butylaluminum, tri-n-hexylaluminum, tri-n-octylaluminum, and tri-n-decylaluminum and alkylaluminum halides such as methylaluminum dichloride, ethylaluminum dichloride, dimethylaluminum chloride, diethylaluminum chloride, and diethylaluminum ethoxide. It is preferred to select a trialkylaluminum. It is more preferred to select a trialkylaluminum having hydrocarbon groups having 4 or more carbon atoms. It is even more preferred to select a trialkylaluminum having hydrocarbon groups having 6 or more carbon atoms. It is especially preferred to select tri-n-hexylaluminum, tri-n-octylaluminum, or tri-n-decylaluminum. Most suitable is tri-n-octylaluminum.

From the standpoints of activity in polymerization and cost, it is preferable that the organometallic compound should be contacted in such an amount that the molar ratio thereof to the polar-group-containing comonomer is from $10^{-5}$ to 0.9, preferably from $10^{-4}$ to 0.2, more preferably from $10^{-4}$ to 0.1.

(2-1) Amount of Residual Aluminum (Al)

The amount of the aluminum (Al) remaining in 1 g of each of the polar-group-containing olefin copolymer (A), polar-group-containing olefin copolymer (A'), and polar-group-containing multinary olefin copolymer (B) according to the invention is desirably 100,000 $\mu g_{Al}/g$ or less, more desirably 70,000 $\mu g_{Al}/g$ or less, even more desirably 20,000 $\mu g_{Al}/g$ or less, especially desirably 10,000 $\mu g_{Al}/g$ or less, preferably 5,000 $\mu g_{Al}/g$ or less, more preferably 1,000 $\mu g_{Al}/g$ or less, most preferably 500 $\mu g_{Al}/g$ or less. In case where the amount thereof is larger than that, the results are a decrease in mechanical property, accelerated discoloration or deterioration of the polymerization product, etc. The amount of residual aluminum (Al) is preferably as small as possible. For example, the amount thereof may be as extremely small as about 1 $\mu g_{Al}/g$, or may be 0 $\mu g_{Al}/g$. Incidentally, the unit $\mu g_{Al}/g$ means the amount, in μg, of aluminum (Al) contained in 1 g of the polar-group-containing olefin copolymer.

(2-2) Amount of Aluminum (Al)

The amount of the aluminum (Al) contained in the polar-group-containing olefin copolymer (A), polar-group-containing olefin copolymer (A'), or polar-group-containing multinary olefin copolymer (B) according to the invention can be calculated as the value obtained by dividing the amount of the aluminum contained in the alkylaluminum which was subjected to the polymerization by the amount of the polar-group-containing olefin copolymer obtained.

The amount of the aluminum (Al) contained in the polar-group-containing olefin copolymer (A), polar-group-containing olefin copolymer (A'), or polar-group-containing multinary olefin copolymer (B) is calculated above from the amount of the alkylaluminum which was supplied for the polymerization. However, the amount thereof may be determined by fluorescent X-ray analysis or inductively coupled plasma (ICP) analysis. In the case of using fluorescent X-ray analysis or ICP analysis, a measurement can be made, for example, by the following method.

<1> Fluorescent X-Ray Analysis

A 3 to 10 g portion of a test specimen is weighed and molded with heating and pressing by means of a hot press to produce a platy sample having a diameter of 45 mm. An examination is made on a central area having a diameter of 30 mm of the platy sample, using a scanning fluorescent X-ray analyzer "ZSX100e" (Rh tube, 4.0 kW), manufactured by Rigaku Industrial Corp., under the following conditions.

X-ray output: 50 kV-50 mA
Analyzing crystal: PET
Detector: PC (proportional counter)
Detection line: Al-Kα line The content of aluminum can be determined from a calibration curve produced beforehand and from the results of the examination made under those conditions. The calibration curve can be produced by examining a plurality of polyethylene resins for aluminum content by ICP analysis and further examining these polyethylene resins by fluorescent X-ray analysis under those conditions.

<2> Inductively Coupled Plasma (ICP) Analysis

A test specimen, 3 mL of special-grade nitric acid, and 1 mL of an aqueous hydrogen peroxide solution (hydrogen peroxide content, 30% by weight) are introduced into a vessel made of Teflon (registered trademark), and a thermal decomposing operation is conducted using a microwave decomposer (MLS-1200MEGA, manufactured by Milestone General K.K.) at a maximum output of 500 W to obtain a solution of the test specimen. The test specimen solution is examined with an ICP spectrometer (IRIS-AP, manufactured by Thermo Jarrell Ash Corp.). The aluminum content can be thus determined. For determining the aluminum content, use is made of a calibration curve produced using standard solutions having known aluminum element concentrations.

(3) Polymerization Methods for Producing Polar-Group-Containing Olefin Copolymer (A), Polar-Group-Containing Olefin Copolymer (A'), and Polar-Group-Containing Multinary Olefin Copolymer (B)

Polymerization methods for producing the polar-group-containing olefin copolymer (A), polar-group-containing olefin copolymer (A'), and polar-group-containing multinary olefin copolymer (B) according to the invention are not limited. It is preferred to use slurry polymerization in which at least some of the yielded polymer forms a slurry in the medium, bulk polymerization in which the monomers themselves which have been liquefied are used as a medium, gas-phase polymerization in which the polymerization is conducted in vaporized monomers, high-pressure ionic polymerization in which at least some of the yielded polymer dissolves in the monomers which have been liquefied at a high temperature and a high pressure, or the like. With respect to the mode of polymerization, any of batch polymerization, semi-batch polymerization, and continuous polymerization may be used. Furthermore, the polymerization may be living polymerization or may be one in which the monomers are polymerized while causing chain transfers. Moreover, chain shuttling reaction or coordinative chain transfer polymerization (CCTP) may be conducted using a so-called chain shuttling agent (CSA). Specific production processes and conditions are disclosed, for example, in JP-A-2010-260913 and JP-A-2010-202647.

[IV] Olefin-Based Resin Composition (D)

(1) With Respect to Olefin-Based Resin Composition (D)

The olefin-based resin composition (D) according to the invention is a composition obtained by incorporating 1 to 99,900 parts by weight of an olefin-based resin (C) into 100 parts by weight of a polar-group-containing olefin copolymer (A'). The amount of the olefin-based resin (C) to be incorporated is preferably 1 to 99,000 parts by weight, more preferably 1 to 90,000 parts by weight, even more preferably 1 to 50,000 parts by weight, especially preferably 1 to 19,900 parts by weight. In case where the amount of the olefin-based resin (C) incorporated is less than 1 part by weight or is larger than 99,900 parts by weight, the olefin-based resin composition (D) shows poor adhesiveness.

In case where the polar-group-containing olefin copolymer (A') in the olefin-based resin composition (D) is a polar-group-containing olefin copolymer produced by a high-pressure radical process, the adhesiveness decreases drastically when an olefin-based resin (C) is incorporated thereinto even in a small amount. In contrast, so long as the polar-group-containing olefin copolymer in the olefin-based resin composition is a polar-group-containing olefin copolymer (A') according to the invention, the composition retains sufficient adhesiveness even when the proportion of the olefin-based resin (C) incorporated thereinto is high.

One polar-group-containing olefin copolymer (A') or two or more polar-group-containing olefin copolymers (A') may be contained in the olefin-based resin composition (D) according to the invention. Meanwhile, one olefin-based resin (C) or two or more olefin-based resins (C) may be used therein.

(2) Methods for Producing Olefin-Based Resin Composition (D)

The olefin-based resin composition (D) according to the invention can be produced using known methods. For example, the composition can be produced by: a method in which a polar-group-containing olefin copolymer (A'), an olefin-based resin (C), and other ingredients, which are added if desired, are melt-kneaded using a single-screw extruder, twin-screw extruder, kneader, Banbury mixer, reciprocating kneading machine (BUSS KNEADER), roll kneader, or the like; or a method in which a polar-group-containing olefin copolymer (A'), an olefin-based resin (C), and other ingredients, which are added if desired, are dissolved in an appropriate good solvent (e.g., a hydrocarbon solvent such as hexane, heptane, decane, cyclohexane, or xylene) and the solvent is then removed.

(3) Other Ingredients

Various modifiers for resins and other ingredients may be incorporated into the olefin-based resin composition (D) according to the invention so long as the incorporation thereof does not depart from the spirit of the functions of the composition of the invention. Examples of such ingredients include butadiene-based rubbers, isobutylene rubbers, isoprene-based rubbers, natural rubber, nitrile rubbers, and petroleum resins. One of these ingredients may be added alone, or a mixture thereof may be added.

(4) Polar-Group-Containing Olefin Copolymer (A')

The polar-group-containing olefin copolymer (A') according to the invention is a copolymer of ethylene and/or α-olefin having 3 to 20 carbon atoms with at least one epoxy-group-containing monomer. The molecular structure of the polar-group-containing olefin copolymer (A') and processes for producing the copolymer are basically the same as those for the polar-group-containing olefin copolymer (A) and polar-group-containing multinary olefin copolymer (B) according to the first aspect and second aspect of the invention.

(5) Amount of Structural Unit of Polar-Group-Containing Monomer

The amount of structural units derived from a polar-group-containing monomer in the polar-group-containing olefin copolymer (A') according to the invention is selected from the range of usually 20 to 0.001 mol %, preferably 15 to 0.01 mol %, more preferably 10 to 0.02 mol %, especially preferably 5 to 0.02 mol %. It is preferable that such structural units should be always present in the polar-group-containing olefin copolymer according to the invention. In case where the amount of structural units derived from a polar-group-containing monomer is less than that range, the adhesiveness to highly polar materials of different kinds is insufficient. In case where the amount thereof is larger than that range, sufficient mechanical properties are not obtained.

One polar-group-containing monomer may be used alone, or two or more polar-group-containing monomers may be used in combination.

(6) Weight-Average Molecular Weight (Mw) of Polar-Group-Containing Olefin Copolymer (A')

It is desirable that the weight-average molecular weight (Mw) of the polar-group-containing olefin copolymer (A') according to the invention should be in the range of usually 1,000 to 2,000,000, preferably 10,000 to 1,500,000, more preferably 20,000 to 1,000,000, even more preferably 31,000 to 800,000, especially preferably 33,000 to 800,000. In case where the Mw thereof is less than 1,000, the composition is insufficient in properties such as mechanical strength and impact resistance and has poor adhesiveness to highly polar materials of different kinds. In case where the Mw thereof exceeds 2,000,000, the composition has exceedingly high melt viscosity and is difficult to mold.

(7) Olefin-Based Resin (C)

The olefin-based resin (C) according to the invention is not particularly limited. The olefin-based resin (C) can be selected from ethylene homopolymers, homopolymers obtained by polymerizing a monomer selected from α-olefins having 3 to 20 carbon atoms, copolymers obtained by copolymerizing two or more monomers selected from ethylene and/or α-olefins having 3 to 20 carbon atoms, and copolymers of ethylene and/or one or more monomers selected from α-olefins having 3 to 20 carbon atoms with one or more vinyl monomers containing a polar group, these homopolymers and copolymers being obtained by high-pressure radical polymerization, high-, medium-, and low-pressure processes in which a Ziegler type, Phillips type, or single-site catalyst is used, and other known processes. Preferred of these are ethylene homopolymers, copolymers of ethylene with one or more α-olefins having 3 to 20 carbon atoms, and copolymers of ethylene with one or more vinyl monomers containing a polar group.

The homopolymers according to the invention are obtained by polymerizing ethylene only or polymerizing only one monomer selected from α-olefins having 3 to 20 carbon atoms. More preferred homopolymers are ethylene homopolymers, propylene homopolymers, 1-butene homopolymers, 1-hexene homopolymers, 1-octene homopolymers, 1-dodecene homopolymers, and the like. Even more preferred are ethylene homopolymers and propylene homopolymers.

The olefin-based copolymers according to the invention are olefin-based copolymers which each are obtained by copolymerizing two or more monomers selected from ethylene, α-olefins having 3 to 20 carbon atoms, cycloolefins, other vinyl monomers containing no polar group, and vinyl monomers containing a polar group and which include at least one monomer selected from ethylene or α-olefins having 3 to 20 carbon atoms. Two monomers may be subjected to polymerization, or three or more monomers may be subjected to polymerization. Preferred olefin-based copolymers are copolymers of ethylene with one or more α-olefins selected from α-olefins having 3 to 20 carbon atoms and copolymers of ethylene with one or more cycloolefins selected from cycloolefins. More preferred are copolymers of ethylene with one or more α-olefins selected from propylene, 1-butene, 1-hexene, and 1-octene and copolymers of ethylene with norbornene.

Examples of the cycloolefins according to the invention include monocyclic olefins such as cyclohexene and cyclooctene, polycyclic olefins such as norbornene, norbornadiene, dicyclopentadiene, dihydrodicyclopentadiene, tetracyclododecene, tricyclopentadiene, dihydrotricyclopentadiene, tetracyclopentadiene, and dihydrotetracyclopentadiene, and substituted olefins formed by bonding functional groups to these olefins. Preferred cycloolefins among these include norbornene. Olefin-based copolymers in which norbornene has been copolymerized generally have a main-chain framework having an alicyclic structure and hence have low hygroscopicity. Furthermore, addition polymers thereof are excellent also in terms of heat resistance.

The monomers containing no polar group according to the invention are monomers which each have one or more carbon-carbon double bonds in the molecular structure and in which the molecule is configured of elements that are carbon and hydrogen. Examples thereof, which exclude ethylene and the α-olefins shown above, include dienes, trienes, and aromatic vinyl monomers. Preferred are butadiene, isoprene, styrene, vinylcyclohexane, and vinylnorbornene.

The monomers containing a polar group according to the invention are not limited. For example, the monomers can be selected from (a) monomers containing a carboxylic acid group or acid anhydride group, (b) monomers containing an ester group, (c) monomers containing a hydroxyl group, (d) monomers containing an amino group, and (e) monomers containing a silane group.

Examples of the monomers (a) containing a carboxylic acid group or acid anhydride group include α,β-unsaturated dicarboxylic acids such as maleic acid, fumaric acid, citraconic acid, and itaconic acid, the anhydrides of these acids, and unsaturated monocarboxylic acids such as acrylic acid, methacrylic acid, furoic acid, crotonic acid, vinyl acetate, and pentenoic acid. Examples of the monomers (b) containing an ester group include methyl (meth)acrylate, ethyl (meth)acrylate, (n- or iso-)propyl (meth)acrylate, and (n-, iso-, or tert-)butyl (meth)acrylate, and especially preferred examples thereof include methyl acrylate. Examples of the monomers (c) containing a hydroxyl group include hydroxyethyl (meth)acrylate and 2-hydroxypropyl (meth)acrylate. Examples of the monomers (d) containing an amino group include aminoethyl (meth)acrylate, dimethylaminoethyl (meth)acrylate, diethylaminoethyl (meth)acrylate, and cyclohexylaminoethyl (meth)acrylate. Examples of the monomers (e) containing a silane group include unsaturated silane compounds such as vinyltrimethoxysilane, vinyltriethoxysilane, vinyltriacetylsilane, and vinyltrichlorosilane.

(8) Processes for Producing Olefin-Based Resin (C)

Processes for producing the olefin-based resin (C) according to the invention are not limited. Examples thereof include a high-pressure radical polymerization process, high-, medium-, and low-pressure processes in which a Ziegler type, Phillips type, or single-site catalyst is used, and other known processes.

(9) Melt Flow Rate (MFR) of Olefin-Based Resin (C)

It is desirable that the MFR of the olefin-based resin (C), which is measured in accordance with JIS K7120 (1999), conditions D under the conditions of a temperature of 190° C. and a load of 2.16 kg, should be in the range of usually 0.01 to 100 g/10 min, preferably 0.1 to 80 g/10 min, more preferably 0.3 to 50 g/10 min. In case where the MFR thereof exceeds 100 g/10 min, the composition is insufficient in properties such as mechanical strength and impact resistance. In case where the MFR thereof is less than 0.01 g/10 min, the composition has exceedingly high melt viscosity and is difficult to mold.

(10) Density of Olefin-Based Resin (C)

It is desirable that the density of the olefin-based resin (C), which is determined in accordance with JIS K7112, Method A (1999), should be in the range of usually 0.840 to 1.20 g/cm$^3$, preferably 0.850 to 0.990 g/cm$^3$, more preferably 0.860 to 0.980 g/cm$^3$, especially preferably 0.870 to 0.970 g/cm$^3$. In case where the density thereof exceeds 1.20 g/cm$^3$, the composition is insufficient in properties such as impact resistance. In case where the density thereof is less than 0.840 g/cm$^3$, the composition has poor heat resistance.

[V] Olefin-Based Resin Composition (D')

(1) With Respect to Olefin-Based Resin Composition (D')

The olefin-based resin composition (D') is the olefin-based resin composition (D) wherein the olefin-based resin (C) contained therein has been further limited in the range of density and the range of melting point. It has hence become possible to produce an olefin-based resin composition having a satisfactory balance between sufficient adhesiveness to materials of different kinds and heat resistance. Namely, the olefin-based resin composition (D') is basically identical with the olefin-based resin composition (D), except that the composition (D') differs from the composition (D) in the ranges of the density and melting point of the olefin-based resin (C) contained as a component.

(2) Density of Olefin-Based Resin (C) Contained in Olefin-Based Resin Composition (D')

The density of the olefin-based resin (C) contained in the olefin-based resin composition (D'), which is determined in accordance with JIS K7112, Method A (1999), is preferably 0.890 to 1.20 g/cm$^3$, more preferably 0.895 to 0.990 g/cm$^3$, even more preferably 0.900 to 0.980 g/cm$^3$. In case where the density thereof is less than that range, the composition has insufficient heat resistance. In case where the density thereof is higher than that range, the composition has poor impact resistance.

(3) Melting Point of Olefin-Based Resin (C) Contained in Olefin-Based Resin Composition (D')

The melting point of the olefin-based resin (C) contained in the olefin-based resin composition (D') is expressed in terms of the maximum-peak temperature in an endothermic curve determined with a differential scanning calorimeter (DSC).

The olefin-based resin (C) contained in the olefin-based resin composition (D') can be a crystalline resin or an amorphous resin. Although the melting point of the crystalline resin can be measured by the method of melting point measurement described above, there are cases where the amorphous resin shows no melting point. Since the polar-group-containing olefin copolymer (A') according to the invention is a crystalline resin, it is preferable that the olefin-based resin (C) should also have a melting point. However, so long as the olefin-based resin composition (D') has a melting point within a preferred range and shows adhesiveness, the olefin-based resin (C) may be an amorphous olefin-based resin. The melting point of the olefin-based resin (C) contained in the olefin-based resin composition (D'), the melting point being measured by the method of melting point measurement described above, is preferably in the range of 90 to 170° C., more preferably in the range of 100 to 155° C., especially preferably in the range of 110 to 140° C. In case where the melting point thereof is lower than that range, the composition has insufficient heat resistance. In case where the melting point thereof is higher than that range, the composition shows poor adhesiveness.

(4) Melting Point of Olefin-Based Resin Composition (D')

The melting point of the olefin-based resin composition (D') according to the invention is expressed in terms of the maximum-peak temperature in an endothermic curve determined with a differential scanning calorimeter (DSC).

The melting point of the olefin-based resin composition (D') is preferably 119 to 170° C., more preferably 119.5 to 155° C., most preferably 120 to 140° C. In case where the melting point thereof is lower than that range, the composition has insufficient heat resistance. In case where the melting point thereof is higher than that range, the composition shows poor adhesiveness.

(5) Heat of Fusion ΔH of Olefin-Based Resin Composition (D')

The heat of fusion ΔH of the olefin-based resin composition (D') according to the invention is determined in accordance with JIS K7122 (1987). Namely, the heat of fusion thereof is determined from the area of the peak(s) appearing on an endothermic curve determined with a differential scanning calorimeter (DSC). The heat of fusion ΔH thereof is preferably in the range of 80 to 300 J/g, more preferably in the range of 85 to 290 J/g, especially preferably in the range of 100 to 280 J/g. In case where the heat of fusion thereof is less than that range, this composition has insufficient heat resistance. In case where the heat of fusion thereof is larger than that range, this composition shows poor adhesiveness.

[VI] Olefin-Based Resin Composition (D")

(1) With Respect to Olefin-Based Resin Composition (D")

The olefin-based resin composition (D") is the olefin-based resin composition (D) wherein the olefin-based resin (C) contained therein has been further limited in the range of density and the range of melting point. As a result, the adhesiveness to materials of other kinds can be markedly improved and the epoxy group content in the olefin-based resin composition can be reduced to a low value, thereby making it possible to avoid the crosslinking of molecular chains and gelation which are caused by the reaction between epoxy groups and to eliminate the fear that the mechanical properties, impact resistance, moldability, etc. may be impaired by the crosslinking or gelation. Namely, the olefin-based resin composition (D") is basically identical with the olefin-based resin composition (D), except that the composition (D") differs from the composition (D) in the ranges of the density and melting point of the olefin-based resin (C) contained as a component.

(2) Density of Olefin-Based Resin (C) Contained in Olefin-Based Resin Composition (D")

The density of the olefin-based resin (C) according to the invention, which is determined in accordance with JIS K7112, Method A (1999), is desirably 0.840 to 0.932 g/cm$^3$, more desirably 0.840 to 0.928 g/cm$^3$, even more desirably 0.840 to 0.922 g/cm$^3$, preferably 0.840 to 0.915 g/cm$^3$, especially preferably 0.840 to 0.910 g/cm$^3$. In case where the density thereof is higher than that range, the composition has poor adhesiveness. The more the olefin-based resin (C) contained in the olefin-based resin composition (D") is flexible, that is, the lower the density of the resin (C), the more the adhesiveness is improved. For this reason, there is no particular lower limit. However, on the supposition of polyethylene, it is difficult to produce an olefin-based resin having a density lower than 0.840 g/cm$^3$.

(3) Melting Point of Olefin-Based Resin (C) Contained in Olefin-Based Resin Composition (D")

The melting point of the olefin-based resin (C) contained in the olefin-based resin composition (D") is expressed in terms of the maximum-peak temperature in an endothermic curve determined with a differential scanning calorimeter (DSC).

The melting point thereof is desirably 30 to 124° C., more desirably 30 to 120° C., even more desirably 30 to 115° C., preferably 30 to 110° C., especially preferably 30 to 100° C.

In case where the melting point thereof is higher than that range, the composition has poor adhesiveness. The more the olefin-based resin (C) contained in the olefin-based resin composition (D″) is flexible, that is, the lower the melting point of the resin (C), the more the adhesiveness is improved. For this reason, there is no particular lower limit. However, on the supposition of polyethylene, it is difficult to produce an olefin-based resin having a melting point lower than 30° C.

Meanwhile, the heat of fusion ΔH (J/g), which is calculated from the area of the peak(s) appearing on an endothermic curve obtained by a DSC measurement, depends on the crystallinity of the olefin-based resin. Consequently, as the crystallinity of the olefin-based resin becomes lower, the ΔH decreases and it becomes difficult to observe a peak on the endothermic curve. Namely, there are cases where olefin-based resins having a low crystallinity show no melting point defined by the maximum-peak temperature in an endothermic curve. Since to blend a flexible olefin-based resin is in the spirit of the invention, a resin which shows no melting point according to the definition may be used so long as the resin has a low crystallinity and is flexible. The heat of fusion ΔH (J/g) is a value calculated from the area of the peak(s) appearing on an endothermic curve obtained in a DSC measurement when heat flow (mW) and temperature (° C.) are plotted as ordinate and abscissa, respectively, and means the total amount of energy, in terms of J unit, which is absorbed when the crystals contained in 1 g of a specimen melt.

[VII] Additives

Additives such as an antioxidant, ultraviolet absorber, lubricant, antistatic agent, colorant, pigment, crosslinking agent, blowing agent, nucleating agent, flame retardant, conductive material, and filler may be incorporated into the polar-group-containing olefin copolymer (A), polar-group-containing multinary olefin copolymer (B), olefin-based resin composition (D), olefin-based resin composition (D′), and olefin-based resin composition (D″) according to the invention so long as the incorporation thereof does not depart from the spirit of the invention.

[VIII] Adhesive

The polar-group-containing olefin copolymer (A), polar-group-containing multinary olefin copolymer (B), olefin-based resin composition (D), olefin-based resin composition (D′), and olefin-based resin composition (D″) according to the invention show high adhesiveness to other bases and have made it possible to produce industrially useful layered products. The superiority of the use thereof as adhesives has been demonstrated by the data obtained in the Examples which will be given later and by comparisons between the Examples and the Comparative Examples.

[IX] Layered Product and Composited Products (1) Materials for the Layered Product The layered product according to the invention is a layered product which includes: a layer constituted of any of the polar-group-containing olefin copolymer (A), polar-group-containing multinary olefin copolymer (B), olefin-based resin composition (D), olefin-based resin composition (D′), and olefin-based resin composition (D″); and a base layer. Examples of the base include: films or sheets (including stretched or printed films or sheets) of thermoplastic resins having film-forming ability, such as polyethylene-based resins, e.g., high-density polyethylene, medium-density polyethylene, low-density polyethylene, ethylene/vinyl acetate copolymers, and ethylene/acrylic ester copolymers, polypropylene-based resins, e.g., ionomers, propylene homopolymer resins, and copolymers of propylene with other α-olefin(s), olefin-based resins, e.g., poly(1-butene) and poly(4-methyl-1-pentene), vinyl-based polymers, e.g., poly(vinyl chloride), poly(vinylidene chloride), polystyrene, polyacrylates, and polyacrylonitrile, polyamide-based resins, e.g., nylon-6, nylon-66, nylon-10, nylon-11, nylon-12, nylon-610, and poly(m-xylylene-adipamide), polyester-based resins, e.g., poly(ethylene terephthalate), poly(ethylene terephthalate/isophthalate), poly(butylene terephthalate), poly(lactic acid), poly(butylene succinate), and aromatic polyesters, poly(vinyl alcohol), ethylene/vinyl alcohol copolymers, polycarbonate resins, bondable fluororesins, thermosetting resins, e.g., phenolic resins, epoxy resins, urea resins, melamine resins, urea resins, alkyd resins, unsaturated polyesters, polyurethanes, and thermosetting polyimides, and cellulosic polymers, e.g., cellophane; foils or sheets of metals such as aluminum, iron, copper, or alloys including any of these metals as the main component; vapor-deposited films of inorganic oxide, such as plastic films with vapor-deposited silica and plastic films with vapor-deposited alumina; vapor-deposited films of, for example, a metal such as gold, silver, or aluminum or a compound, excluding the oxide, of any of such metals; various kinds of paper such as wood-free paper, kraft paper, paper boards, glassine paper, and synthetic paper; and cellophane, woven fabric, and nonwoven fabric.

The base layer according to the invention can be suitably selected in accordance with the intended use thereof or the kind of the object to be wrapped. For example, in the case where the object to be wrapped is a perishable food, use can be made of a resin which is excellent in terms of transparency, rigidity, and gas permeation resistance, such as a polyamide, poly(vinylidene chloride), ethylene/vinyl alcohol copolymer (EVOH), poly(vinyl alcohol), or polyester. In the case where the object to be wrapped is a confection, fibers, or the like, it is preferred to use polypropylene or the like, which is satisfactory in terms of transparency, rigidity, and water permeation resistance. In the case of application to fuel tanks for motor vehicles or to tubes, hoses, pipes, or the like through which fuel passes, use can be made of a resin having excellent fuel impermeability, such as an EVOH, a polyamide, or a fluororesin. Examples of barrier resins include polyamide-based resins, polyester-based resins, EVOH, poly(vinylidene chloride)-based resins, polycarbonate-based resins, oriented polypropylene (OPP), oriented polyesters (OPET), oriented polyamides, films coated by vapor deposition of an inorganic metal oxide, such as films coated with vapor-deposited alumina and films coated with vapor-deposited silica, films coated by vapor deposition of a metal, such as films coated with vapor-deposited aluminum, and metal foils.

(2) Applications of the Layered Product

The layered product according to the invention is suitable for use as, for example, packaging materials for foods. Examples of the foods include snack confections such as potato chips, confectionery including biscuits, rice crackers, and chocolates, powdery seasonings such as powdered soup, and foods such as flakes of dried bonito and smoked foods. A pouch container can be formed by disposing the layered product so that the surface of the layer of an ethylene-based copolymer faces to itself and heat-sealing at least some of the superposed edges. Specifically, such pouch containers are suitable for use, for example, for packaging aqueous matter and as general-purpose bags, liquid-soup packages, paper vessels for liquids, raw sheets for laminating, special-shape packaging bags for liquids (e.g., standing pouches), standardized bags, heavy-duty bags, semi-heavy-duty bags, wrapping films, sugar bags, packaging bags for oily matter, various packaging containers such as containers for food packaging, and transfusion bags.

(3) Production of the Layered Product

Examples of processing techniques for producing the layered product according to the invention include conventionally known techniques such as ordinary press molding, extrusion molding techniques such as air-cooled inflation molding, inflation molding with two-stage air cooling, high-speed inflation molding, flat-die molding (T-die molding), and water-cooled inflation molding, laminating techniques such as extrusion laminating, sandwich laminating, and dry laminating, blow molding, air-pressure forming, injection molding, and rotational molding.

(4) Laminate

The laminate according to the invention is a layered product which can be produced by a known laminating technique such as, for example, extrusion laminating, sandwich laminating, or dry laminating. This laminate is a layered product which can be produced by laminating a laminating material with at least one base layer, the laminating material including any of the polar-group-containing olefin copolymer (A), polar-group-containing multinary olefin copolymer (B), olefin-based resin composition (D), olefin-based resin composition (D'), and olefin-based resin composition (D") of the invention.

(5) Extrusion-Molded Article

The extrusion-molded article according to the invention is an extrusion-molded article obtained by molding any of the polar-group-containing olefin copolymer (A), polar-group-containing multinary olefin copolymer (B), olefin-based resin composition (D), olefin-based resin composition (D'), and olefin-based resin composition (D") according to the invention by extrusion molding.

(6) Multilayered Coextrusion-Molded Article

The multilayered coextrusion-molded article according to the invention is a multilayered coextrusion-molded article which can be molded by known multilayer coextrusion molding, and which at least includes a layer including any of the polar-group-containing olefin copolymer (A), polar-group-containing multinary olefin copolymer (B), olefin-based resin composition (D), olefin-based resin composition (D'), and olefin-based resin composition (D") of the invention.

(7) Multilayered Film

The multilayered film according to the invention is a multilayered film which can be produced by a known technique for multilayered-film molding, and which at least includes a base layer and a layer that includes any of the polar-group-containing olefin copolymer (A), polar-group-containing multinary olefin copolymer (B), olefin-based resin composition (D), olefin-based resin composition (D'), and olefin-based resin composition (D") of the invention.

(8) Multilayered Blow-Molded Article

The multilayered blow-molded article according to the invention is a multilayered blow-molded article which can be produced by known multilayer blow-molding, and which at least includes a base layer and a layer that includes any of the polar-group-containing olefin copolymer (A), polar-group-containing multinary olefin copolymer (B), olefin-based resin composition (D), olefin-based resin composition (D'), and olefin-based resin composition (D") of the invention.

(9) Multilayered Tubular Molded Article

The multilayered tubular molded article according to the invention is a multilayered tubular molded article which can be produced by a known technique for molding multilayered tubular objects, and which at least includes a base layer and a layer that includes any of the polar-group-containing olefin copolymer (A), polar-group-containing multinary olefin copolymer (B), olefin-based resin composition (D), olefin-based resin composition (D'), and olefin-based resin composition (D") of the invention.

(10) Multilayered Sheet

The multilayered sheet according to the invention is a multilayered sheet which can be produced by known multilayered-sheet molding, and which at least includes a base layer and a layer that includes any of the polar-group-containing olefin copolymer (A), polar-group-containing multinary olefin copolymer (B), olefin-based resin composition (D), olefin-based resin composition (D'), and olefin-based resin composition (D") of the invention.

(11) Injection-Molded Article

The injection-molded article according to the invention is an injection-molded article obtained by molding any of the polar-group-containing olefin copolymer (A), polar-group-containing multinary olefin copolymer (B), olefin-based resin composition (D), olefin-based resin composition (D'), and olefin-based resin composition (D") according to the invention by injection molding. For producing the injection-molded article according to the invention, known techniques can be used.

(12) Multilayered Injection-Molded Article

The multilayered injection-molded article according to the invention is a multilayered injection-molded article which at least includes a layer including any of the polar-group-containing olefin copolymer (A), polar-group-containing multinary olefin copolymer (B), olefin-based resin composition (D), olefin-based resin composition (D'), and olefin-based resin composition (D") of the invention and which can be produced by superposing a plurality of layers using injection molding. The multilayered injection-molded article may have any configuration so long as two or more materials have been disposed in a multilayer arrangement. The multilayered injection-molded article according to the invention can be molded by a known injection molding technique capable of multilayer injection molding.

(13) Coated Metallic Member

The coated metallic member according to the invention is a coated metallic member which can be produced by coating a metal with any of the polar-group-containing olefin copolymer (A), polar-group-containing multinary olefin copolymer (B), olefin-based resin composition (D), olefin-based resin composition (D'), and olefin-based resin composition (D") as a metal-covering material.

EXAMPLES

The present invention will be explained below in detail by reference to Examples and Comparative Examples to demonstrate the rationality and predominance of the configurations of the invention and the superiority thereof to prior-art techniques by means of preferred data obtained in the Examples and comparisons between the Examples and the Comparative Examples. The test methods used for examining properties of polar-group-containing olefin copolymers produced in the invention and the test methods used for examining the layered products obtained are as follows.

Experiment Example 1 Evaluation of Polar-Group-Containing Olefin Copolymers (1) Amount of Polar-Group-Containing Structural Units in Polar-Group-Containing Olefin Copolymer The amount of polar-group-containing structural units in each polar-group-containing olefin copolymer was determined using a $^1$H-NMR spectrum. A detailed explanation was given hereinabove.

(2) Weight-Average Molecular Weight (Mw) and Molecular-Weight Distribution Parameter (Mw/Mn)

Weight-average molecular weight (Mw) was determined by gel permeation chromatography (GPC). Molecular-weight distribution parameter (Mw/Mn) was determined by further determining the number-average molecular weight (Mn) by gel permeation chromatography (GPC) and calculating the ratio between Mw and Mn, i.e., Mw/Mn. A detailed explanation was given hereinabove.

(3) Melting Point

Melting point is expressed by the peak temperature in an endothermic curve determined with a differential scanning calorimeter (DSC). A DSC (DSC 7020) manufactured by SII Nano Technology Inc. was used for the measurement, which was conducted under the following conditions.

About 5.0 mg of a specimen was packed into an aluminum pan, and the contents were heated to 200° C. at 10° C./min, held at 200° C. for 5 minutes, and then cooled to 30° C. at 10° C./min. This specimen was held at 30° C. for 5 minutes and then heated again at 10° C./min to obtain an endothermic curve for this heating. The maximum-peak temperature in the curve was taken as the melting point.

(4) Adhesion Strength

Adhesion strength was measured by preparing both a test sample in a pressed-plate form and various base films, stacking and hot-pressing the test sample and each of the base films to thereby produce a layered product, and subjecting the layered product to a peel test. The steps of the preparation methods and measuring method are explained in order.

[1] Method for Preparing Pressed Plate of Test Sample

A test sample was placed in a mold for hot pressing which had dimensions of 50 mm×60 mm and a thickness of 0.5 mm. In a hot press having a surface temperature of 180° C., preheating was conducted for 5 minutes and pressurization and depressurization were repeated to thereby remove the gas remaining in the molten resin. Furthermore, the resin was pressed at 4.9 MPa and held for 5 minutes. Thereafter, the mold was transferred to a press having a surface temperature of 25° C., and the resin was held for 3 minutes at a pressure of 4.9 MPa to thereby cool the resin. Thus, a pressed plate having a thickness of about 0.5 mm was produced.

[2] Method for Preparing EVOH Film

A multilayer T-die molding machine was used to mold a two-kind three-layer film composed of an EVOH as the central layer and LLDPE as both outer layers. Thereafter, the LLDPE as the outer layers was peeled off to thereby prepare an EVOH single-layer film having a thickness of 100 μm. The film molding conditions are as follows.

Molding machine: two-kind three-layer T-die
Molding temperature: 200° C.
Layer configuration: LLDPE/EVOH/LLDPE
Film thickness: 300 m (100 μm/100 μm/100 μm)
Outer layers: LLDPE (trade name: Novatec UF943, manufactured by Japan Polyethylene Corp.), MFR=2.0 g/10 min, density=0.937 g/cm$^3$
Interlayer: EVOH (trade name: EVAL F101B, manufactured by Kuraray Co. Ltd.)

[3] Method for Preparing Polyamide Film

A multilayer T-die molding machine was used to mold a two-kind three-layer film composed of a polyamide as the central layer and LLDPE as both outer layers. Thereafter, the LLDPE as the outer layers was peeled off to thereby prepare a polyamide single-layer film having a thickness of 100 μm. The film molding conditions are as follows.

Molding machine: two-kind three-layer T-die
Molding temperature: 250° C.
Layer configuration: LLDPE/Polyamide/LLDPE
Film thickness: 300 m (100 μm/100 μm/100 μm)
Outer layers: LLDPE (trade name: Novatec UF943, manufactured by Japan Polyethylene Corp.), MFR=2.0 g/10 min, density=0.937 g/cm$^3$
Interlayer: polyamide (trade name: Amilan CM1021FS, manufactured by Toray Industries, Inc.)

[4] Method for Producing Polyester Film

A multilayer T-die molding machine was used to mold a two-kind three-layer film composed of a polyester as the central layer and LLDPE as both outer layers. Thereafter, the LLDPE as the outer layers was peeled off to thereby prepare a polyester single-layer film having a thickness of 100 μm. The film molding conditions are as follows.

Molding machine: two-kind three-layer T-die
Molding temperature: 250° C.
Layer configuration: LLDPE/Polyester/LLDPE
Film thickness: 300 m (100 μm/100 μm/100 μm)
Outer layers: LLDPE (trade name: Novatec UF943, manufactured by Japan Polyethylene Corp.), MFR=2.0 g/10 min, density=0.937 g/cm$^3$
Interlayer: poly(ethylene terephthalate) (trade name: Novapex IG229Z, manufactured by Mitsubishi Chemical Corp.)

[5] Method for Producing Fluororesin Film

A multilayer T-die molding machine was used to mold a two-kind three-layer film composed of a fluororesin as the central layer and LLDPE as both outer layers. Thereafter, the LLDPE as the outer layers was peeled off to thereby prepare a fluororesin single-layer film having a thickness of 100 μm. The film molding conditions are as follows.

Molding machine: two-kind three-layer T-die
Molding temperature: 230° C.
Layer configuration: LLDPE/Fluororesin/LLDPE
Film thickness: 300 m (100 μm/100 μm/100 μm)
Outer layers: LLDPE (trade name: Novatec UF943, manufactured by Japan Polyethylene Corp.), MFR=2.0 g/10 min, density=0.937 g/cm$^3$
Interlayer: fluororesin (trade name: Neoflon EFEP RP-5000, manufactured by Daikin Industries, Ltd.)

[6] Method for Preparing Layered Product of EVOH Film with Test Sample

The pressed plate of a test sample obtained by the Method for Preparing Pressed Plate given above and the EVOH film which had been obtained by the Method for Preparing EVOH Film given above and cut into dimensions of 50 mm×60 mm were stacked and placed in a mold for hot pressing which had dimensions of 50 mm×60 mm and a thickness of 0.5 mm. Using a hot press having a surface temperature of 200° C., the stack was pressed at 4.9 MPa for 3 minutes. Thereafter, the mold was transferred to a press having a surface temperature of 25° C., and the work was held for 3 minutes at a pressure of 4.9 MPa to thereby cool the work. Thus, a layered product of the pressed test-sample plate with the EVOH was prepared.

[7] Method for Preparing Layered Product of Polyamide Film with Test Sample

The pressed plate of a test sample obtained by the Method for Preparing Pressed Plate given above and the polyamide film which had been obtained by the Method for Preparing Polyamide Film given above and cut into dimensions of 50 mm×60 mm were stacked and placed in a mold for hot pressing which had dimensions of 50 mm×60 mm and a thickness of 0.5 mm. Using a hot press having a surface temperature of 250° C., the stack was pressed at 4.9 MPa for 5 minutes. Thereafter, the mold was transferred to a press having a surface temperature of 25° C., and the work was held for 3 minutes at a pressure of 4.9 MPa to thereby cool the work. Thus, a layered product of the pressed test-sample plate with the polyamide was prepared.

[8] Method for Preparing Layered Product of Polyester Film with Test Sample

The pressed plate of a test sample obtained by the Method for Preparing Pressed Plate given above and the polyester film which had been obtained by the Method for Preparing Polyester Film given above and cut into dimensions of 50 mm×60 mm were stacked and placed in a mold for hot pressing which had dimensions of 50 mm×60 mm and a thickness of 0.5 mm. Using a hot press having a surface temperature of 200° C., the stack was pressed at 4.9 MPa for 3 minutes. Thereafter, the mold was transferred to a press having a surface temperature of 25° C., and the work was held for 3 minutes at a pressure of 4.9 MPa to thereby cool the work. Thus, a layered product of the pressed test-sample plate with the polyester was prepared.

[9] Method for Preparing Layered Product of Fluororesin Film with Test Sample

The pressed plate of a test sample obtained by the Method for Preparing Pressed Plate given above and the fluororesin film which had been obtained by the Method for Preparing Fluororesin Film given above and cut into dimensions of 50 mm×60 mm were stacked and placed in a mold for hot pressing which had dimensions of 50 mm×60 mm and a thickness of 0.5 mm. Using a hot press having a surface temperature of 200° C., the stack was pressed at 4.9 MPa for 3 minutes. Thereafter, the mold was transferred to a press having a surface temperature of 25° C., and the work was held for 3 minutes at a pressure of 4.9 MPa to thereby cool the work. Thus, a layered product of the pressed test-sample plate with the fluororesin was prepared.

[10] Method for Measuring Adhesion Strength of Layered Product

Each layered product obtained by the Method for Preparing Layered Product was cut into a width of 10 mm and subjected to T-peeling at a speed of 50 mm/min using Tensilon (manufactured by Toyo Seiki Ltd.), thereby measuring the adhesion strength. The unit of the adhesion strength is gf/10 mm. In cases when the adhesion strength is exceedingly high, the test sample layer or the base layer yields and ruptures during the peel test. This is a phenomenon which occurs since the adhesion strength of the layered product is higher than the lower of the tensile strengths at rupture of the test sample layer and base layer; it can be deemed that the adhesiveness thereof is exceedingly high. In the case where the adhesion strength was unable to be measured due to the phenomenon, this result is indicated by "peeling impossible" in the column "Adhesion strength" for the Example; it is deemed that the test sample had been more highly bonded than those in layered products in which values of adhesion strength were measured.

(5) Chemical Resistance

[1] Method for Preparing Pressed Plate of Test Sample

A test sample was placed in a mold for hot pressing which had dimensions of 50 mm×60 mm and a thickness of 1 mm. In a hot press having a surface temperature of 180° C., preheating was conducted for 5 minutes and pressurization and depressurization were repeated to thereby remove the gas remaining in the molten resin. Furthermore, the resin was pressed at 4.9 MPa and held for 5 minutes. Thereafter, the mold was transferred to a press having a surface temperature of 25° C., and the resin was held for 3 minutes at a pressure of 4.9 MPa to thereby cool the resin. Thus, a pressed test-sample plate having a thickness of about 0.9 mm was produced.

[2] Method for Evaluating Chemical Resistance

The pressed test-sample plate prepared by the Method for Preparing Pressed Plate of Test Sample was cut into a width of 10 mm to produce a test piece for chemical-resistance evaluation. This test piece for evaluation was placed in a pressure vessel, and a three-chemical mixture solution obtained by mixing 455 mL of isooctane, 455 mL of toluene, and 90 mL of ethanol was added thereto. This pressure vessel was placed in an oven regulated so as to have a temperature of 60° C. After 24 hours, the test piece for evaluation was taken out. The test piece was then air-dried in a draft for further 24 hours.

In the case where the test piece for evaluation did not retain the original shape after the air drying, the chemical resistance thereof was rated as "poor". In the case where the test piece for evaluation retained the original shape after the air drying, the chemical resistance thereof was rated as "good".

(6) Determination of Phase Angle $\delta(G^*=0.1$ MPa) at Absolute Value of Complex Modulus of Elasticity $G^*=0.1$ MPa A specimen was placed in a mold for hot pressing which had a thickness of 1.0 mm. In a hot press having a surface temperature of 180° C., preheating were conducted for 5 minutes and pressurization and depressurization were repeated to thereby remove the gas remaining in the molten resin. Furthermore, the resin was pressed at 4.9 MPa and held for 5 minutes. Thereafter, the mold was transferred to a press having a surface temperature of 25° C., and the resin was held for 3 minutes at a pressure of 4.9 MPa to thereby cool the resin. Thus, a pressed specimen plate having a thickness of about 1.0 mm was produced. A disk having a diameter of 25 mm was cut out of the pressed specimen plate, and this disk as a sample was examined for dynamic viscoelasticity using rotational rheometer Type ARES, manufactured by Rheometrics Inc., as a device for dynamic viscoelasticity measurement in a nitrogen atmosphere under the following conditions.

Plate: parallel plate having a diameter of 25 mm
Temperature: 160° C.
Strain: 10%
Range of measuring angular frequencies: $1.0 \times 10^{-2}$ to $1.0 \times 10^2$ rad/s
Measuring interval: 5 points/decade The phase angle $\delta$ was plotted against log $G^*$, which is the common logarithm of the absolute value $G^*$ (Pa) of the complex modulus of elasticity, and the value of $\delta$ (degrees) of any point corresponding to log $G^*=5.0$ was taken as $\delta(G^*=0.1$ MPa). In the case where the measuring points included no point which corresponded to log $G^*=5.0$, the two points which were located respectively before and after log $G^*=5.0$ were used to determine a value of $\delta$ for log $G^*=5.0$ by linear interpolation. In the case where all the measuring points were log $G^*<5$, the values for the three points which were the largest three in log $G^*$ were used to determine a value of $\delta$ for log $G^*=5.0$ by extrapolation with a quadratic curve.

(7) Amount of Aluminum (Al)

The amount of aluminum (Al) contained in each polar-group-containing olefin copolymer can be determined by: a method in which the amount thereof is calculated by dividing the amount of the aluminum (Al) contained in the alkylaluminum that was supplied for the polymerization by the amount of the polar-group-containing olefin copolymer obtained; and a method in which the amount thereof is determined by fluorescent X-ray analysis.

[1] Method for Calculation from Amount of Alkylaluminum Added for Polymerization Specifically, the aluminum content was calculated using the following calculation formula.

Unit of aluminum (Al) content: $g_A/g$ (The unit $\mu g_{Al}/g$ means the amount, in $\mu g$, of aluminum (Al) contained in 1 g of the polar-group-containing olefin copolymer.)

$$\mu g_{Al} = n \times Mw(Al) \times 10^3 (\mu g)$$

n: Addition amount of alkylaluminum supplied for polymerization (mmol)

Mw(Al): Molecular weight of aluminum (Al) element (26.9 g/mol)

[2] Method for Determination by Fluorescent X-Ray Analysis

The amount of the aluminum (Al) contained in each polar-group-containing olefin copolymer was determined using fluorescent X-ray analysis. A detailed explanation was given hereinabove.

Example 1-1

Synthesis of Drent Type Ligand (2-Isopropylphenyl)(2'-Methoxyphenyl)(2"-Sulfonylphenyl)Phosphine (I)

A hexane solution of n-butyllithium (2.5 M; 10 mL; 25.3 mmol) was gradually added dropwise at 0° C. to a tetrahydrofuran (20 mL) solution of benzenesulfonic acid anhydride (2 g; 12.6 mmol), and this mixture was stirred for 1 hour while elevating the temperature thereof to room temperature. This liquid reaction mixture was cooled to −78° C., and phosphorus trichloride (1.0 mL; 12.6 mmol) was added thereto. This mixture was stirred for 2 hours (liquid reaction mixture A).

Magnesium was dispersed in tetrahydrofuran (20 mL), and 1-bromo-2-methoxybenzene (2.3 g; 12.6 mmol) was added thereto. The resultant mixture was stirred at room temperature for 3 hours. This solution was added dropwise at −78° C. to the liquid reaction mixture A prepared above, and the resultant mixture was stirred for 1 hour (liquid reaction mixture B).

A hexane solution of n-butyllithium (2.5 M; 5.0 mL; 12.6 mmol) was gradually added dropwise at −30° C. to a diethyl ether (20 mL) solution of 1-bromo-2-isopropylbenzene (2.5 g; 12.6 mmol), and the mixture was stirred at room temperature for 2 hours. This solution was added dropwise at −78° C. to the liquid reaction mixture B prepared above, and the resultant mixture was stirred at room temperature overnight. LC-MS purity, 60%.

Water (50 mL) was added thereto, and hydrochloric acid was added thereto to render the mixture acidic (pH<3). Thereafter, the mixture was extracted with methylene chloride (100 μmL), and the extract was dried with sodium sulfate. The solvent was distilled off. The reaction product was recrystallized with methanol to thereby obtain 1.1 g of the desired substance (I) as a white solid. Yield, 22%.

$^1$H NMR (CDCl$_3$, ppm): 8.34 (t, J=6.0 Hz, 1H), 7.7-7.6 (m, 3H), 7.50 (t, J=6.4 Hz, 1H), 7.39 (m, 1H), 7.23 (m 1H), 7.1-6.9 (m, 5H), 3.75 (s, 3H), 3.05 (m, 1H), 1.15 (d, J=6.8 Hz, 3H), 1.04 (d, J=6.4 Hz, 3H). $^{31}$P NMR (CDCl$_3$, ppm): −10.5.

[Chem. 17]

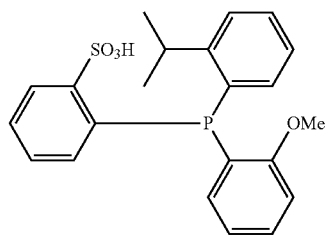

(I)

Formation of Complex

Into a 30-mL flask which had undergone sufficient nitrogen displacement were introduced 100 μmol of palladium bisdibenzylideneacetone and 100 μmol of the phosphorus-sulfonic acid ligand (I). Thereto was added dehydrated toluene (10 mL). Thereafter, this mixture was treated with an ultrasonic vibrator for 10 minutes to thereby prepare a catalyst slurry.

Copolymerization of Ethylene with 1,2-Epoxy-9-Decene

The atmosphere within an autoclave having a capacity of 2.4 L and equipped with stirring blades was replaced with purified nitrogen. Thereafter, dry toluene (1.0 L) and 36 mL (0.2 mol) of 1,2-epoxy-9-decene were introduced thereinto. While stirring the contents, the autoclave was heated to 100° C. and nitrogen was supplied to 0.3 MPa. Thereafter, ethylene was fed to a pressure of 1.3 MPa so as to result in a partial ethylene pressure of 1 MPa. After completion of the pressure regulation, 150 μmol of the transition metal complex (I—Pd complex) was forced into the autoclave with nitrogen to initiate copolymerization. During the reaction, the temperature was kept at 100° C. and ethylene was continuously fed so as to maintain the pressure. The monomers were thus polymerized for 120 minutes. Thereafter, the autoclave was cooled and depressurized to terminate the reaction. The reaction solution was poured into 1 L of acetone to precipitate a polymer. The resultant polymer was recovered through filtration and washing and then dried at 60° C. under vacuum until a constant weight was reached.

The conditions and results of the polymerization are shown in Table 1, and the results of the property examinations are shown in Table 2. In Table 2, "ND" means "not determined" (the same applies thereinafter). In Table 1, the polymerization activity indicates the amount (g) of the copolymer yielded per mol of the complex used for the polymerization. Incidentally, the polymerization activity was calculated on the assumption that the ligand and the palladium bisdibenzylideneacetone had reacted in a ratio of 1:1 to form the palladium complex.

Example 1-2

Copolymerization of Ethylene with 4-Vinyl-1,2-Epoxycyclohexane

The same procedure as in Example 1-1 was conducted, except that 20.9 mL (0.2 mol) of 4-vinyl-1,2-epoxycyclohexane was used as a polar-group-containing comonomer and the amount of the transition metal complex was changed to 50 μmol, and that the polymerization pressure, polymerization temperature, and polymerization period were 2.3 MPa, 100° C., and 240 minutes, respectively. The conditions and results of the polymerization are shown in Table 1, and the results of the property examinations are shown in Table 2.

Example 1-3

Copolymerization of Ethylene with 4-Hydroxybutyl Acrylate Glycidyl Ether (4-HBAGE)

The same procedure as in Example 1-1 was conducted, except that 54 mL (0.3 mol) of 4-HBAGE was used as a polar-group-containing comonomer, the amount of the transition metal complex was changed to 50 μmol, and the polymerization temperature and the polymerization period were changed to 90° C. and 70 minutes, respectively. The conditions and results of the polymerization are shown in Table 1, and the results of the property examinations are shown in Table 2.

Example 1-4

Synthesis of SHOP Type Ligand B-27DM

Ligand B-27DM, which is shown below, was obtained in accordance with the method described in International Publication WO 2010/050256 (Synthesis Example 4).

[Chem. 18]

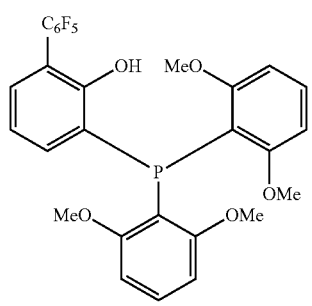

B-27DM

Formation of Complex

Into a 50-mL eggplant type flask which had undergone sufficient nitrogen displacement was introduced 112 mg (200 μmol) of the B-27DM shown below. Next, 56 mg (200 μmol) of bis-1,5-cyclooctadienenickel(0) (hereinafter referred to as Ni(COD)2) was introduced into a 50-mL eggplant type flask and dissolved in 20 mL of dry toluene to prepare a 10-mmol/L toluene solution of Ni(COD)2. The whole Ni(COD)2 toluene solution (20 mL) obtained here was introduced into the eggplant type flask containing the B-27DM, and the mixture was stirred for 30 minutes on a 40° C. water bath, thereby obtaining 20 mL of a 10-mmol/L solution of a product of reaction between the B-27DM and the Ni(COD)2.

Copolymerization of Ethylene with 4-Hydroxybutyl Acrylate Glycidyl Ether (4-HBAGE)

Into an autoclave having a capacity of 2.4 L and equipped with stirring blades were introduced 1,000 mL of dry toluene, 36.6 mg (0.1 mmol) of tri-n-octylaluminum (TNOA), and 2.7 mL (15 mmol) of 4-HBAGE. While stirring the contents, the autoclave was heated to 100° C. and nitrogen was supplied to 0.3 MPa. Thereafter, ethylene was fed to a pressure of 2.8 MPa so as to result in a partial ethylene pressure of 2.5 MPa. After the temperature and the pressure had become stable, 2.4 mL (24 μmol) of the B-27DM/Ni complex solution prepared above was forced into the autoclave with nitrogen to initiate copolymerization. During the reaction, the temperature was kept at 100° C. and ethylene was continuously fed so as to maintain the pressure. The monomers were polymerized for 80 minutes. Thereafter, the autoclave was cooled and depressurized to terminate the reaction. The reaction solution was poured into 1 L of acetone to precipitate a polymer. The resultant polymer was recovered through filtration and washing and then dried at 60° C. under vacuum until a constant weight was reached. Thus, the polar-group-containing monomer which had remained in the polar-group-containing copolymer was removed, and the polar-group-containing olefin copolymer was finally recovered in an amount of 28 g. The conditions and results of the polymerization are shown in Table 1, and the results of the property examinations are shown in Table 2. In Table 1, the polymerization activity indicates the amount (g) of the copolymer yielded per mol of the complex used for the polymerization. Incidentally, the polymerization activity was calculated on the assumption that the B-27DM and the Ni(COD)2 had reacted in a ratio of 1:1 to form the nickel complex. The 4-HBAGE subjected to the copolymerization was one which had been dehydrated with molecular sieve 3A.

Examples 1-5 to 1-12

Polar-group-containing olefin copolymers of Examples 1-5 to 1-12 were prepared by conducting polymerization in the same manner as in Example 1-4, except that the amount of the ligand, concentration of the polar-group-containing monomer, polymerization temperature, and polymerization period were changed. The conditions and results of the polymerization are shown in Table 1, and the results of the property examinations are shown in Table 2.

Examples 1-13 to 1-15

Polymerization was conducted basically in the same manner as in Example 1-4, except that the ethylene replenishment after initiation of the polymerization was omitted. The amount of the ligand, concentration of the polar-group-containing monomer, polymerization temperature, and polymerization period were changed in performing the polymerization. Thus, polar-group-containing olefin copolymers of Examples 1-13 to 1-15 were prepared. The conditions and results of the polymerization are shown in Table 1, and the results of the property examinations are shown in Table 2. In this polymerization method, the partial ethylene pressure at the time of termination of the polymerization is lower than that at the time of the polymerization initiation because ethylene replenishment is omitted. The expression "2.5→1.5" in the column "Partial ethylene pressure" in Table 1 indicates that the partial ethylene pressure at polymerization initiation was 2.5 MPa and the partial ethylene pressure at polymerization termination was 1.5 MPa (the same applies hereinafter).

Example 1-16

Synthesis of SHOP Type Ligand 2-(2,6-Diphenoxyphenyl)(2-phenoxyphenyl)phosphanyl-6-(pentafluorophenyl)phenol (B-114)

Ligand B-114, which is shown below, was obtained in accordance with the method described in JP-A-2013-043871 (Synthesis Example 4).

[Chem. 19]

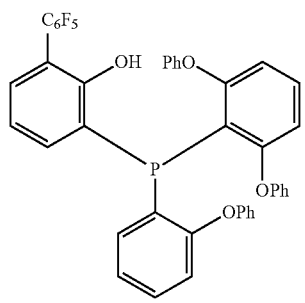

B-114

Formation of Complex

Into a 50-mL eggplant type flask which had undergone sufficient nitrogen displacement was introduced 145 mg (200 μmol) of the 2-(2,6-diphenoxyphenyl)(2-phenoxyphenyl)phosphanyl-6-(pentafluorophenyl)phenol (B-114) shown above. Next, 56 mg (200 μmol) of bis-1,5-cyclooctadienenickel(0) (hereinafter referred to as Ni(COD)2) was introduced into a 50-mL eggplant type flask and dissolved in 20 mL of dry toluene to prepare a 10-mmol/L toluene solution of Ni(COD)2. The whole Ni(COD)2 toluene solution (20 mL) obtained here was introduced into the eggplant type flask containing the B-114, and the mixture was stirred for 30 minutes on a 40° C. water bath, thereby obtaining 20 mL of a 10-mmol/L solution of a product of reaction between the B-114 and the Ni(COD)2.

Copolymerization of Ethylene with 4-Hydroxybutyl Acrylate Glycidyl Ether (4-HBAGE)

Into an autoclave having a capacity of 2.4 L and equipped with stirring blades were introduced 1,000 mL of dry toluene, 36.6 mg (0.10 mmol) of tri-n-octylaluminum (TNOA), and 1.8 mL (10 mmol) of 4-HBAGE. While stirring the contents, the autoclave was heated to 90° C. and nitrogen was supplied to 0.3 MPa. Thereafter, ethylene was fed to a pressure of 2.8 MPa so as to result in a partial ethylene pressure of 2.5 MPa. After the temperature and the pressure had become stable, 2.0 mL (20 μmol) of the B-114/Ni complex solution prepared above was forced into the autoclave with nitrogen to initiate copolymerization. During the reaction, the temperature was kept at 90° C. The monomers were polymerized for 46 minutes. Thereafter, the autoclave was cooled and depressurized to terminate the reaction. The reaction solution was poured into 1 L of acetone to precipitate a polymer. The resultant polymer was recovered through filtration and washing and then dried at 60° C. under vacuum until a constant weight was reached. Thus, the polar-group-containing monomer which had remained in the polar-group-containing copolymer was removed, and the polar-group-containing olefin copolymer was finally recovered in an amount of 32 g.

The conditions and results of the polymerization are shown in Table 1, and the results of the property examinations are shown in Table 2. In Table 1, the polymerization activity indicates the amount (g) of the copolymer yielded per mol of the complex used for the polymerization. In this polymerization method, the partial ethylene pressure at the time of termination of the polymerization is lower than that at the time of the polymerization initiation because ethylene replenishment is omitted.

Incidentally, the polymerization activity was calculated on the assumption that the B-114 and the Ni(COD)2 had reacted in a ratio of 1:1 to form the nickel complex.

The 4-HBAGE subjected to the copolymerization was one which had been dehydrated with molecular sieve 3A.

Comparative Example 1-1

Homopolymerization of Ethylene

The same procedure as in Example 1-4 was conducted, except that neither the polar-group-containing comonomer nor tri-n-octylaluminum (TNOA) was used and the amount of the transition metal complex was changed to 0.2 μmol, and that the polymerization pressure, polymerization temperature, and polymerization period were 3.0 MPa, 100° C., and 30 minutes, respectively. The conditions and results of the polymerization are shown in Table 1, and the results of the property examinations are shown in Table 2.

Comparative Example 1-2

This Comparative Example is a polar-group-containing olefin copolymer (trade name: Bondfast E, manufactured by Sumitomo Chemical Co., Ltd.) which is a copolymer of ethylene with glycidyl methacrylate and was produced by a high-pressure process. The results of the property examinations are shown in Table 2.

Comparative Example 1-3

This Comparative Example is a polar-group-containing olefin copolymer (trade name: Bondfast 2C, manufactured by Sumitomo Chemical Co., Ltd.) which is a copolymer of ethylene with glycidyl methacrylate and was produced by a high-pressure process. The results of the property examinations are shown in Table 2.

TABLE 1

| Run | Kind of ligand | Amount of ligand μmol | TNOA mmol | Kind of polar-group-containing monomer | Amount of polar-group-containing monomer mmol | mL | Parital ethylene pressure MPa | Temperature ° C. | Period min | Amount yielded g | Catalytic efficiency g/mol |
|---|---|---|---|---|---|---|---|---|---|---|---|
| Example 1-1 | I | 150 | — | 1,2-epoxy-9-decene | 200 | 25 | 1.0 | 100 | 120 | 72 | 4.8E+05 |
| Example 1-2 | I | 50 | — | 1,2-epoxy-4-vinyl-cyclohexane | 200 | 21 | 2.0 | 100 | 240 | 85 | 1.7E+06 |
| Example 1-3 | I | 50 | — | 4-hydroxybutyl acrylate glycidylether | 300 | 54 | 1.0 | 90 | 70 | 58 | 1.2E+06 |
| Example 1-4 | B27DM | 24 | 0.1 | 4-hydroxybutyl acrylate glycidylether | 15 | 2.7 | 2.5 | 100 | 80 | 28 | 1.2E+06 |

TABLE 1-continued

| Run | Kind of ligand | Amount of ligand μmol | TNOA mmol | Kind of polar-group-containing monomer | Amount of polar-group-containing monomer mmol | mL | Polymerization conditions Parital ethylene pressure MPa | Temperature ° C. | Period min | Amount yielded g | Catalytic efficiency g/mol |
|---|---|---|---|---|---|---|---|---|---|---|---|
| Example 1-5 | B27DM | 30 | 0.15 | 4-hydroxybutyl acrylate glycidylether | 15 | 2.7 | 2.5 | 105 | 60 | 38 | 1.3E+06 |
| Example 1-6 | B27DM | 30 | 0.1 | 4-hydroxybutyl acrylate glycidylether | 15 | 2.7 | 2.5 | 110 | 61 | 45 | 1.5E+06 |
| Example 1-7 | B27DM | 20 | 0.1 | 4-hydroxybutyl acrylate glycidylether | 15 | 2.7 | 2.5 | 90 | 50 | 41 | 2.0E+06 |
| Example 1-8 | B27DM | 100 | 0.2 | 4-hydroxybutyl acrylate glycidylether | 50 | 9.1 | 2.5 | 90 | 120 | 10 | 9.8E+04 |
| Example 1-9 | B27DM | 380 | 0.4 | 4-hydroxybutyl acrylate glycidylether | 50 | 9.1 | 2.0 | 90 | 120 | 60 | 1.6E+05 |
| Example 1-10 | B27DM | 100 | 0.2 | 4-hydroxybutyl acrylate glycidylether | 50 | 9.1 | 2.0 | 90 | 80 | 34 | 3.4E+05 |
| Example 1-11 | B27DM | 100 | 0.2 | 4-hydroxybutyl acrylate glycidylether | 50 | 9.1 | 2.0 | 90 | 251 | 35 | 3.5E+05 |
| Example 1-12 | B27DM | 100 | 0.2 | 4-hydroxybutyl acrylate glycidylether | 50 | 9.1 | 2.0 | 90 | 304 | 49 | 4.9E+05 |
| Example 1-13 | B27DM | 30 | 0.2 | 4-hydroxybutyl acrylate glycidylether | 5 | 0.91 | 2.5→1.5 | 105 | 50 | 33 | 1.1E+06 |
| Example 1-14 | B27DM | 3 | 0.1 | 4-hydroxybutyl acrylate glycidylether | 0.5 | 0.091 | 2.5→1.5 | 105 | 33 | 37 | 1.2E+07 |
| Example 1-15 | B27DM | 300 | 0.1 | 4-hydroxybutyl acrylate glycidylether | 0.05 | 9.1 | 2.5→1.3 | 110 | 210 | 43.7 | 1.5E+05 |
| Example 1-16 | B114 | 20 | 0.1 | 4-hydroxybutyl acrylate glycidylether | 0.01 | 1.82 | 2.5→1.5 | 90 | 46 | 32.3 | 1.6E+06 |
| Comparative Example 1-1 | B27DM | 0.2 | — | — | — | — | 3.0 | 100 | 30 | 5 | 2.6E+07 |

TABLE 2

| | Kind of polar-group-containing monomer | Weight-average molecular weight Mw * 10⁻⁴ | Molecular-weight distribution parameter Mw/Mn | Melting point °C | δ (G* = 0.1 MPa) ° | Adhesion strength Polyamide gf/10 mm | Adhesion strength EVOH gf/10 mm | Adhesion strength Polyester gf/10 mm | Adhesion strength Fluoro-resin gf/10 mm | Amount of polar-group structural unit mol % | Chemical resistance | Amount of residual aluminum Calculated from amount of alkylaluminum added for polymerization μg_Al/g_PE | Amount of residual aluminum Determined by fluorescent X-ray analysis μg_Al/g_PE |
|---|---|---|---|---|---|---|---|---|---|---|---|---|---|
| Example 1-1 | 1,2-epoxy-9-decene | 4.9 | 2.82 | 122.8 | ND | peeling impossible | ND | ND | ND | 0.71 | good | 0.0 | ND |
| Example 1-2 | 1,2-epoxy-4-vinyl-cyclohexane | 10.0 | 2.04 | 130.9 | 63.3 | 650 | ND | ND | ND | 0.08 | good | 0.0 | ND |
| Example 1-3 | 4-hydroxybutyl acrylate glycidylether | 8.0 | 2.68 | 122.2 | ND | peeling impossible | ND | ND | ND | 0.78 | good | 0.0 | ND |
| Example 1-4 | 4-hydroxybutyl acrylate glycidylether | 7.5 | 2.17 | 121.1 | ND | peeling impossible | ND | ND | ND | 0.95 | good | 97.8 | ND |
| Example 1-5 | 4-hydroxybutyl acrylate glycidylether | 7.0 | 2.09 | 122.3 | ND | peeling impossible | ND | ND | ND | 0.82 | good | 106.8 | ND |
| Example 1-6 | 4-hydroxybutyl acrylate glycidylether | 6.0 | 2.35 | 122.8 | 48.1 | peeling impossible | ND | ND | ND | 0.78 | good | 60.2 | ND |
| Example 1-7 | 4-hydroxybutyl acrylate glycidylether | 13.1 | 2.35 | 122.4 | ND | peeling impossible | ND | ND | ND | 1.04 | good | 66.0 | ND |
| Example 1-8 | 4-hydroxybutyl acrylate glycidylether | 7.6 | 2.40 | 105.1 | 47.4 | 3500 | ND | ND | ND | 3.66 | good | 550.6 | ND |
| Example 1-9 | 4-hydroxybutyl acrylate glycidylether | 11.2 | 2.46 | 119.2 | 48.7 | 950 | ND | ND | ND | 2.22 | good | 180.2 | 171.0 |
| Example 1-10 | 4-hydroxybutyl acrylate glycidylether | 9.1 | 2.46 | 110.0 | 48.2 | 4030 | ND | ND | ND | 3.20 | good | 158.2 | ND |
| Example 1-11 | 4-hydroxybutyl acrylate glycidylether | 7.3 | 2.49 | 104.6 | 49.6 | 4800 | 780 | 1080 | 2530 | 3.80 | good | 152.9 | ND |
| Example 1-12 | 4-hydroxybutyl acrylate glycidylether | 9.2 | 2.24 | 112.4 | 49.2 | 2850 | 400 | 550 | 1700 | 2.46 | good | 110.5 | ND |

TABLE 2-continued

| | Kind of polar-group-containing monomer | Weight-average molecular weight Mw * 10⁻⁴ | Molecular-weight distribution parameter Mw/Mn | Melting point °C. | δ (G* = 0.1 MPa) ° | Adhesion strength Polyamide | Adhesion strength EVOH | Adhesion strength Polyester gf/10 mm | Adhesion strength Fluoro-resin | Amount of polar-group structural unit mol % | Chemical resistance | Amount of residual aluminum Calculated from amount of alkylaluminum added for polymerization μg$_{Al}$/g$_{PE}$ | Amount of residual aluminum Determined by fluorescent X-ray analysis μg$_{Al}$/g$_{PE}$ |
|---|---|---|---|---|---|---|---|---|---|---|---|---|---|
| Example 1-13 | 4-hydroxybutyl acrylate glycidylether | 6.6 | 2.01 | 125.4 | 62.5 | peeling impossible | ND | ND | ND | 0.33 | good | 164.5 | ND |
| Example 1-14 | 4-hydroxybutyl acrylate glycidylether | 6.8 | 1.97 | 130.8 | ND | 850 | ND | ND | ND | 0.03 | good | 72.1 | ND |
| Example 1-15 | 4-hydroxybutyl acrylate glycidylether | 3.02 | 2.18 | 114.3 | ND | 22 | ND | ND | ND | 3.04 | good | 61.7 | ND |
| Example 1-16 | 4-hydroxybutyl acrylate glycidylether | 2.8 | 2.35 | 127.8 | ND | 65 | ND | ND | ND | 0.24 | good | 83.5 | ND |
| Comparative Example 1-1 | — | 10.1 | 2.04 | 131.3 | ND | 0 | ND | ND | ND | 0.00 | good | 0.0 | ND |
| Comparative Example 1-2 | glycidyl methacrylate | 10.6 | 5.17 | 99.2 | 37.3 | 4000 | ND | ND | ND | 2.99 | poor | 0.0 | ND |
| Comparative Example 1-3 | glycidyl methacrylate | 12.0 | 5.92 | 105.6 | 36.2 | 3800 | ND | ND | ND | 1.43 | poor | 0.0 | ND |

Discussion on the Results of the Examples and Comparative Examples

Example 1-1 to Example 1-16 each have an amount of polar-group structural units of 0.001 mol % or larger and have practically sufficient adhesiveness of the polyamide. Furthermore, Example 1-1 to Example 1-14 each have a weight-average molecular weight (Mw) of 33,000 or higher and show excellent adhesiveness to the polyamide. In contrast, Comparative Example 1-1 contains no polar group and does not adhere to the polyamide at all. It was thus demonstrated that a polar-group-containing olefin copolymer has sufficient adhesiveness to highly polar bases so long as the amount of polar-group structural units contained in the copolymer is 0.001 mol % or large.

Examples 1-1 to 1-3, Examples 1-4 to 1-15, and Example 1-16 are polar-group-containing olefin copolymers produced by different production processes. These polar-group-containing olefin copolymers, although produced by different production processes, each show sufficient adhesiveness. This fact showed that for producing a polar-group-containing olefin copolymer having sufficiently high adhesiveness to highly polar materials, any process in which monomers are polymerized in the presence of a specific transition metal catalyst can be used without particular limitations and that processes for producing the polar-group-containing olefin copolymer according to the invention are not limited.

Example 1-11 and Example 1-12 have practically sufficient adhesiveness not only to the polyamide resin but also to the EVOH, polyester, and fluororesin. This fact has made it clear that materials to which the polar-group-containing olefin copolymer of the invention has adhesiveness are not limited to a specific highly polar material, and the copolymer has sufficient adhesiveness to highly polar materials of various kinds.

Example 1-1 to Example 1-16 have high adhesiveness and, despite this, show sufficient chemical resistance. In contrast, Comparative Example 1-2 and Comparative Example 1-3 have insufficient chemical resistance although satisfactory in terms of adhesiveness. The cause of this is presumed to be a difference in molecular structure. Example 1-1 to Example 1-16 have a linear molecular structure since the copolymers were produced in the presence of a transition metal catalyst. In contrast, Comparative Example 1-2 and Comparative Example 1-3 are known to have been produced by a high-pressure process, and these copolymers are thought to have a molecular structure which has too large an amount of short-chain branches and long-chain branches. It is thought that this difference in structure brought about a difference in the swellability of the amorphous portions by chemicals, resulting in the difference in chemical resistance. These results have demonstrated that the polar-group-containing olefin copolymer according to the invention is a polar-group-containing olefin copolymer which not only has high adhesiveness to highly polar materials but also is prominent in chemical resistance.

The predominance and rationality of the configurations of the invention (characterizing features of the invention) and the superiority thereof to prior-art techniques have been rendered clear by the satisfactory results of the Examples given above and by comparisons between the Examples and the Comparative Examples.

Experiment Example 2 Evaluation of Polar-Group-Containing Multinary Olefin Copolymers B (1) Amount of Polar-Group-Containing Structural Units The amount of polar-group-containing structural units was determined using a $^1$H-NMR spectrum. Specifically, the amount thereof was determined by the method described in Experiment Example 1 and hereinabove.

(2) Weight-Average Molecular Weight (Mw) and Molecular-Weight Distribution Parameter (Mw/Mn)

Weight-average molecular weight (Mw) was determined by gel permeation chromatography (GPC). Molecular-weight distribution parameter (Mw/Mn) was determined by further determining the number-average molecular weight (Mn) by gel permeation chromatography (GPC) and calculating the ratio between Mw and Mn, i.e., Mw/Mn. Specifically, the molecular weight and the parameter were determined by the method described in Experiment Example 1 and hereinabove.

(3) Melting Point

Melting point is expressed by the peak temperature in an endothermic curve determined with a differential scanning calorimeter (DSC). The measurement was made through the same steps as in Experiment Example 1.

(4) Adhesion Strength

Adhesion strength was measured by preparing both a pressed plate of a test sample and various base films, stacking and hot-pressing the pressed plate and each of the base films to thereby produce a layered product, and subjecting the layered product to a peel test. The measurement was made through the same steps as in Experiment Example 1.

(5) Tensile Impact Strength

[1] Method for Producing Test Sample for Tensile Impact Strength

Pellets of each of the resin compositions of the Examples and Comparative Examples were placed in a mold for hot pressing which had a thickness of 1 mm. In a hot press having a surface temperature of 230° C., preheating was conducted for 5 minutes and pressurization and depressurization were repeated to thereby melt the resin and remove the gas remaining in the molten resin. Furthermore, the resin was pressed at 4.9 MPa and held for 5 minutes. Thereafter, the resin in the state of being pressed at 4.9 MPa was gradually cooled at a rate of 10° C./min. At the time when the temperature had declined to around room temperature, the molded plate was taken out of the mold. The molded plate obtained was conditioned for 48 hours or longer in an atmosphere having a temperature of 23±2° C. and a humidity of 50±5%. Test pieces having the shape of ASTM D1822 Type-S were punched out of the conditioned pressed plate to obtain a test sample for tensile impact strength.

[2] Conditions for Tensile Impact Strength Test

The test pieces were used to measure the tensile impact strength thereof by reference to JIS K 7160-1996, Method B. Incidentally, the shape of the test pieces is the only point in which the conditions were different from those in JIS K 7160-1996. With respect to the other conditions, etc., the test was performed by a method according to JIS K 7160-1996.

(6) Determination of $\delta(G^*=0.1$ MPa) by Dynamic Viscoelasticity Measurement $\delta(G^*=0.1$ MPa) was determined by a dynamic viscoelasticity measurement through the same steps as in Experiment Example 1.

(7) Amount of Aluminum (Al)

The amount of the aluminum (Al) contained in each polar-group-containing multinary olefin copolymer was determined through the same steps as in Experiment Example 1.

Example 2-1

Synthesis of SHOP Type Ligand (B-27DM)

A SHOP type ligand (B-27DM) was synthesized in the same manner as in Example 1-4.

Formation of Complex

A product of reaction between the B-27DM and Ni(COD)2 was obtained in the same manner as in Example 1-4.

(Copolymerization for Producing Ethylene/4-Hydroxybutyl Acrylate Glycidyl Ether (4-HBAGE)/n-Butyl Acrylate Terpolymer)

Into an autoclave having a capacity of 2.4 L and equipped with stirring blades were introduced 1,000 mL of dry toluene, 36.6 mg (0.1 mmol) of tri-n-octylaluminum (TNOA), 3.6 mL (20 mmol) of 4-HBAGE, and 7.1 mL (50 mmol) of n-butyl acrylate. While stirring the contents, the autoclave was heated to 80° C. and nitrogen was supplied to 0.4 MPa. Thereafter, ethylene was fed to a pressure of 2.8 MPa so as to result in a partial ethylene pressure of 2.4 MPa. After the temperature and the pressure had become stable, 10 mL (100 µmol) of the B-27DM-Ni complex solution prepared above was forced into the autoclave with nitrogen to initiate copolymerization. During the reaction, the temperature was kept at 80° C. and ethylene was continuously fed so as to maintain the pressure. The monomers were polymerized for 180 minutes. Thereafter, the autoclave was cooled and depressurized to terminate the reaction. The reaction solution was poured into 1 L of acetone to precipitate a polymer. The resultant polymer was recovered through filtration and washing and then dried at 60° C. under vacuum until a constant weight was reached. Thus, the polar-group-containing monomer which had remained in the polar-group-containing copolymer was removed, and the polar-group-containing olefin copolymer was finally recovered in an amount of 19.4 g. The conditions and results of the polymerization are shown in Table 3, and the results of the property examinations are shown in Table 4. The polymerization activity was calculated on the assumption that the B-27DM and the Ni(COD)2 had reacted in a ratio of 1:1 to form the nickel complex.

The 4-HBAGE subjected to the copolymerization was one which had been dehydrated with molecular sieve 3A.

Example 2-2, Comparative Example 2-1, and Comparative Example 2-2

Polar-group-containing olefin copolymers of Example 2-2, Comparative Example 2-1, and Comparative Example 2-2 were prepared by conducting polymerization in the same manner as in Example 2-1, except that the amount of the ligand, kinds of the comonomers, monomer concentrations, polymerization temperature, and polymerization period were changed. The conditions and results of the polymerization are shown in Table 3, and the results of the property examinations are shown in Table 4.

Example 2-3

Synthesis of SHOP Type Ligand (B-111)

Ligand B-111, which is shown below, was obtained in accordance with JP-A-2013-043871 (Synthesis Example 1).

[Chem. 20]

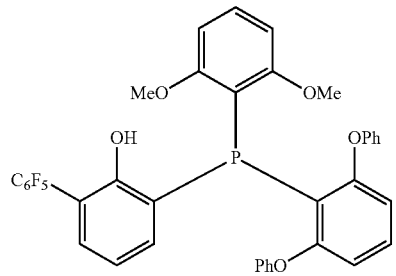

B-111

Formation of Complex

Into a 50-mL eggplant type flask which had undergone sufficient nitrogen displacement was introduced 137 mg (200 µmol) of the B-111 shown below. Next, 56 mg (200 µmol) of bis-1,5-cyclooctadienenickel(0) (hereinafter referred to as Ni(COD)2) was introduced into a 50-mL eggplant type flask and dissolved in 20 mL of dry toluene to prepare a 10-mmol/L toluene solution of Ni(COD)2. The whole Ni(COD)2 toluene solution (20 mL) obtained here was introduced into the eggplant type flask containing the B-111, and the mixture was stirred for 30 minutes on a 40° C. water bath, thereby obtaining 20 mL of a 10-mmol/L solution of a product of reaction between the B-111 and the Ni(COD)2.

(Copolymerization for Producing Ethylene/4-Hydroxybutyl Acrylate Glycidyl Ether (4-HBAGE)/n-Butyl Acrylate Terpolymer)

Into an autoclave having a capacity of 2.4 L and equipped with stirring blades were introduced 1,000 mL of dry toluene, 54.9 mg (0.15 mmol) of tri-n-octylaluminum (TNOA), 3.96 mL (22 mmol) of 4-HBAGE, and 19.9 mL (140 mmol) of n-butyl acrylate. While stirring the contents, the autoclave was heated to 70° C. and nitrogen was supplied to 0.4 MPa. Thereafter, ethylene was fed to a pressure of 2.8 MPa so as to result in a partial ethylene pressure of 2.4 MPa. After the temperature and the pressure had become stable, 18 mL (180 µmol) of the B-111-Ni complex solution prepared above was forced into the autoclave with nitrogen to initiate copolymerization. During the reaction, the temperature was kept at 70° C. and ethylene was continuously fed so as to maintain the pressure. The monomers were polymerized for 120 minutes. Thereafter, the autoclave was cooled and depressurized to terminate the reaction. The reaction solution was poured into 1 L of acetone to precipitate a polymer. The resultant polymer was recovered through filtration and washing and then dried at 60° C. under vacuum until a constant weight was reached. Thus, the polar-group-containing monomer which had remained in the polar-group-containing copolymer was removed, and the polar-group-containing olefin copolymer was finally recovered in an amount of 21.0 g. The conditions and results of the polymerization are shown in Table 3, and the results of the property examinations are shown in Table 4. The polymerization activity was calculated on the assumption that the B-111 and the Ni(COD)2 had reacted in a ratio of 1:1 to form the nickel complex.

The 4-HBAGE subjected to the copolymerization was one which had been dehydrated with molecular sieve 3A.

Example 2-4

A polar-group-containing olefin copolymer of Example 2-4 was prepared by conducting polymerization in the same manner as in Example 2-3, except that the amount of the ligand, kinds of the comonomers, monomer concentrations, polymerization temperature, and polymerization period were changed. The conditions and results of the polymerization are shown in Table 3, and the results of the property examinations are shown in Table 4.

Comparative Example 2-3

This Comparative Example is an olefin copolymer (trade name: Kernel KF370, manufactured by Japan Polyethylene Corp.) which is a copolymer of ethylene, propylene, and hexene and was produced with a metallocene-based catalyst. The results of the property examinations are shown in Table 4.

Comparative Example 2-4

This Comparative Example is a polar-group-containing olefin copolymer (trade name: Bondfast E, manufactured by Sumitomo Chemical Co., Ltd.) which is a copolymer of ethylene with glycidyl methacrylate and was produced by a high-pressure process. The results of the property examinations are shown in Table 4.

Comparative Example 2-5

This Comparative Example is a polar-group-containing olefin copolymer (trade name: Bondfast 2C, manufactured by Sumitomo Chemical Co., Ltd.) which is a copolymer of ethylene with glycidyl methacrylate and was produced by a high-pressure process. The results of the property examinations are shown in Table 4.

TABLE 3

| Run | Kind of ligand | Amount of ligand μmol | TNOA mmol | Comonomer Z1 | | Comonomer Z2 | | Polymerization conditions pressure MPa | Temperature °C. | Period min | Amount yielded g | Activity g/mol MPah |
|---|---|---|---|---|---|---|---|---|---|---|---|---|
| | | | | | mol/L | | mol/L | | | | | |
| Example 2-1 | B27DM | 100 | 0.1 | 4-hydroxybutyl acrylate glycidylether | 0.020 | n-buthyl acrylate | 0.050 | 2.4 | 80 | 180 | 19.4 | 2.7E+04 |
| Example 2-2 | B27DM | 100 | 0.1 | 4-hydroxybutyl acrylate glycidylether | 0.020 | n-buthyl acrylate | 0.050 | 2.4 | 80 | 90 | 11.5 | 3.2E+04 |
| Example 2-3 | B111 | 180 | 0.15 | 4-hydroxybutyl acrylate glycidylether | 0.022 | n-buthyl acrylate | 0.140 | 2.4 | 70 | 120 | 21.0 | 2.4E+04 |
| Example 2-4 | B111 | 30 | 0.2 | 4-hydroxybutyl acrylate glycidylether | 0.006 | n-buthyl acrylate | 0.004 | 2.5 | 80 | 134 | 23.5 | 1.4E+05 |
| Comparative Example 2-1 | B27DM | 360 | 0.4 | 4-hydroxybutyl acrylate glycidylether | 0.050 | — | — | 2.0 | 95 | 110 | 58.2 | 4.4E+04 |
| Comparative Example 2-2 | B27DM | 200 | 0.2 | 4-hydroxybutyl acrylate glycidylether | 0.050 | — | — | 2.0 | 90 | 152 | 39.8 | 3.9E+04 |

TABLE 4

| | Comonomer Z1 | Comonomer Z2 | Weight-average molecular weight Mw * $10^{-4}$ | Molecular-weight distribution parameter Mw/Mn | Amount of polar-group structural units [Z1] mol % | Melting point °C. | 128 − 6.0 [Z1] °C. |
|---|---|---|---|---|---|---|---|
| Example 2-1 | 4-hydroxybutyl acrylate glycidylether | butyl acrylate | 5.6 | 2.33 | 1.80 | 101.3 | 117.2 |
| Example 2-2 | 4-hydroxybutyl acrylate glycidylether | butyl acrylate | 5.5 | 2.63 | 1.83 | 98.6 | 117.0 |
| Example 2-3 | 4-hydroxybutyl acrylate glycidylether | butyl acrylate | 5.3 | 1.96 | 1.46 | 94.8 | 119.2 |
| Example 2-4 | 4-hydroxybutyl acrylate glycidylether | butyl acrylate | 14.5 | 2.10 | 0.21 | 125.7 | 126.7 |
| Comparative Example 2-1 | 4-hydroxybutyl acrylate glycidylether | — | 11.2 | 2.46 | 2.22 | 119.2 | 114.7 |
| Comparative Example 2-2 | 4-hydroxybutyl acrylate glycidylether | — | 8.3 | 2.45 | 3.23 | 112.4 | 108.6 |

TABLE 4-continued

| | | | | | | | |
|---|---|---|---|---|---|---|---|
| Comparative Example 2-3 | — | propylene, 1-hexane | 8.4 | 2.10 | 0.00 | 97.0 | — |
| Comparative Example 2-4 | glycldyl methacrylate | — | 10.6 | 5.17 | 2.99 | 99.2 | — |
| Comparative Example 2-5 | glycldyl methacrylate | — | 12.0 | 5.92 | 1.46 | 105.6 | — |

| | δ (G* = 0.1 MPa) ° | Amount of residual aluminum | | Tensile impact strength kJ/m² | Adhesion strength | |
|---|---|---|---|---|---|---|
| | | Calculated from amount of alkyl-aluminum added for polymerization μg$_{Al}$/g | Determined by fluorescent X-ray analysis μg$_{Al}$/g | | Fluoro-resin gf/10 mm | Poly-amide gf/10 mm |
| Example 2-1 | ND | 139 | ND | 950 | 2292 | ND |
| Example 2-2 | ND | 235 | ND | 1010 | 2700 | ND |
| Example 2-3 | ND | 193 | 184 | 1106 | 2575 | ND |
| Example 2-4 | 56.7 | 230 | ND | 1551 | ND | 2010 |
| Comparative Example 2-1 | 48.7 | 185 | 171 | 1210 | 265 | 1125 |
| Comparative Example 2-2 | 50.0 | 136 | ND | 1068 | 350 | 950 |
| Comparative Example 2-3 | 63.2 | 0 | ND | 2228 | 0 | 0 |
| Comparative Example 2-4 | 37.3 | 0 | ND | 465 | 2000 | 3850 |
| Comparative Example 2-5 | 36.2 | 0 | ND | 240 | 420 | 550 |

Discussion on the Results of the Examples and Comparative Examples

It has become clear that Example 2-1 to Example 2-4, which are polar-group-containing multinary olefin copolymers, show sufficient adhesiveness, whereas Comparative Example 2-3, which is an olefin copolymer having no polar group, shows no adhesiveness at all. This indicates that to contain polar groups is essential for exhibiting adhesiveness.

It has become clear that the polar-group-containing multinary olefin copolymers of Example 2-1 to Example 2-4 have markedly improved adhesiveness as compared with the polar-group-containing binary olefin copolymers of Comparative Example 2-1 and Comparative Example 2-2, which have the same polar groups. This indicates that by rendering a copolymer flexible with any third comonomer, the adhesiveness can be improved regardless of the polar groups and the kind of the third comonomer.

Example 2-1 to Example 2-4 have high adhesiveness and, despite this, show sufficient impact resistance. In contrast, Comparative Example 2-4 and Comparative Example 2-5 have insufficient impact resistance although satisfactory in terms of adhesiveness. The cause of this is presumed to be a difference in molecular structure. Example 2-1 to Example 2-4 have a linear molecular structure since the copolymers were produced in the presence of a transition metal catalyst. In contrast, Comparative Example 2-4 and Comparative Example 2-5 are known to have been produced by a high-pressure process, and these copolymers are thought to have a molecular structure which has too large an amount of short-chain branches and long-chain branches. It is thought that as a result of such structure, the copolymers of the Comparative Examples have reduced impact resistance.

Those results have demonstrated the usefulness of the copolymer of the invention which is the polar-group-containing multinary olefin copolymer and which can have improved adhesiveness and improved impact resistance while attaining a satisfactory balance therebetween.

Experiment Example 3 Evaluation of Olefin-Based Resin Compositions D (1) Amount of Polar-Group-Containing Structural Units in Polar-Group-Containing Olefin Copolymer (A')

The amount of polar-group-containing structural units was determined using a $^1$H-NMR spectrum. Specifically, the amount thereof was determined by the method described in Experiment Example 1 and hereinabove.

(2) Weight-Average Molecular Weight (Mw) and Molecular-Weight Distribution Parameter (Mw/Mn)

Weight-average molecular weight (Mw) was determined by gel permeation chromatography (GPC). Molecular-weight distribution parameter (Mw/Mn) was determined by further determining the number-average molecular weight (Mn) by gel permeation chromatography (GPC) and calculating the ratio between Mw and Mn, i.e., Mw/Mn. Specifically, the molecular weight and the parameter were determined by the method described in Experiment Example 1 and hereinabove.

(3) Melting Point

Melting point is expressed by the peak temperature in an endothermic curve determined with a differential scanning calorimeter (DSC). The measurement was made through the same steps as in Experiment Example 1.

(4) Adhesion Strength

Adhesion strength was measured by preparing both a pressed plate of a test sample and various base films, stacking and hot-pressing the pressed plate and each of the base films to thereby produce a layered product, and subjecting the layered product to a peel test. The measurement was made through the same steps as in Experiment Example 1.

(5) Determination of δ(G*=0.1 MPa) by Dynamic Viscoelasticity Measurement

δ(G*=0.1 MPa) was determined by a dynamic viscoelasticity measurement through the same steps as in Experiment Example 1.

(6) Amount of Aluminum (Al)

The amount of the aluminum (Al) contained in each polar-group-containing olefin copolymer (A') was determined through the same steps as in Experiment Example 1.

(7) Melt Flow Rate (MFR)

MFR was measured in accordance with JIS K7120 (1999) under the conditions of a temperature of 190° C. and a load of 2.16 kg. A detailed explanation was given hereinabove.

(8) Density

Density was determined in accordance with JIS K7112, Method A (1999). A detailed explanation was given hereinabove.

Production Example 3-1 Production of Polar-Group-Containing Olefin Copolymer A'-3-1

Synthesis of SHOP Type Ligand (B-27DM)

A SHOP type ligand (B-27DM) was synthesized in the same manner as in Example 1-4.

Formation of Complex

A product of reaction between the B-27DM and Ni(COD)2 was obtained in the same manner as in Example 1-4.

Copolymerization of Ethylene with 4-Hydroxybutyl Acrylate Glycidyl Ether (4-HBAGE)

Into an autoclave having a capacity of 2.4 L and equipped with stirring blades were introduced 1,000 mL of dry toluene, 54.9 mg (0.15 mmol) of tri-n-octylaluminum (TNOA), and 2.7 mL (15 mmol) of 4-HBAGE. While stirring the contents, the autoclave was heated to 105° C. and nitrogen was supplied to 0.3 MPa. Thereafter, ethylene was fed to a pressure of 2.8 MPa so as to result in a partial ethylene pressure of 2.5 MPa. After the temperature and the pressure had become stable, 3.0 mL (30 μmol) of the B-27DM-Ni complex solution prepared above was forced into the autoclave with nitrogen to initiate copolymerization. During the reaction, the temperature was kept at 105° C. and ethylene was continuously fed so as to maintain the pressure. The monomers were polymerized for 60 minutes. Thereafter, the autoclave was cooled and depressurized to terminate the reaction. The reaction solution was poured into 1 L of acetone to precipitate a polymer. The resultant polymer was recovered through filtration and washing and then dried at 60° C. under vacuum until a constant weight was reached. Thus, the polar-group-containing monomer which had remained in the polar-group-containing copolymer was removed, and the polar-group-containing olefin copolymer was finally recovered in an amount of 38 g. The conditions and results of the polymerization are shown in Table 5, and the results of the property examinations are shown in Table 6. In Table 5, the polymerization activity indicates the amount (g) of the copolymer yielded per mol of the complex used for the polymerization. Incidentally, the polymerization activity was calculated on the assumption that the B-27DM and the Ni(COD)2 had reacted in a ratio of 1:1 to form the nickel complex.

The 4-HBAGE subjected to the copolymerization was one which had been dehydrated with molecular sieve 3A.

Production Examples 3-2 to 3-4 Production of Polar-Group-Containing Olefin Copolymers A'-3-2, A'-3-3, and A'-3-4

Polar-group-containing olefin copolymers of Production Example 3-2 to Production Example 3-4 were prepared by conducting polymerization in the same manner as in Production Example 3-1, except that the amount of the ligand, concentration of the polar-group-containing monomer, polymerization temperature, and polymerization period were changed. The conditions and results of the polymerization are shown in Table 5, and the results of the property examinations are shown in Table 6.

Production Example 3-5 Production of Polar-Group-Containing Olefin Copolymer A'-3-5

Polymerization was conducted basically in the same manner as in Production Example 3-1, except that the ethylene replenishment after initiation of the polymerization was omitted. The amount of the ligand, concentration of the polar-group-containing monomer, polymerization temperature, and polymerization period were changed in performing the polymerization. Thus, a polar-group-containing olefin copolymer of Production Example 3-5 was prepared. The conditions and results of the polymerization are shown in Table 5, and the results of the property examinations are shown in Table 6. In this polymerization method, the partial ethylene pressure at the time of termination of the polymerization is lower than that at the time of the polymerization initiation because ethylene replenishment is omitted.

Production Example 3-6 Production of Polar-group-containing Olefin Copolymer A'-3-6

Synthesis of SHOP Type Ligand 2-(2,6-Diphenoxyphenyl)(2-phenoxyphenyl)phosphanyl-6-(pentafluorophenyl)phenol (B-114)

2-(2,6-Diphenoxyphenyl)(2-phenoxyphenyl)phosphanyl-6-(pentafluorophenyl)phenol (B-114) was obtained in the same manner as in Example 1-16.

Formation of Complex

A solution of a complex of the 2-(2,6-diphenoxyphenyl)(2-phenoxyphenyl)phosphanyl-6-(pentafluorophenyl)phenol (B-114) with bis-1,5-cyclooctadienenickel(0) (Ni(COD)2) was obtained in the same manner as in Example 1-16.

Copolymerization of Ethylene with 4-Hydroxybutyl Acrylate Glycidyl Ether (4-HBAGE)

A copolymer of ethylene with 4-hydroxybutyl acrylate glycidyl ether (4-HBAGE) was obtained in the same manner as in Example 1-16.

The conditions and results of the polymerization are shown in Table 5, and the results of the property examinations are shown in Table 6.

Production Example 3-7 Production of Polar-Group-Containing Olefin Copolymer A'-3-7

Synthesis of Drent Type Ligand (2-Isopropylphenyl)(2'-methoxyphenyl)(2"-sulfonylphenyl)phosphine (I)

Drent type ligand (2-isopropylphenyl)(2'-methoxyphenyl)(2"-sulfonylphenyl)phosphine (I) was obtained in the same manner as in Example 1-1.

Formation of Complex

Into a 30-mL flask which had undergone sufficient nitrogen displacement were introduced 100 μmol of palladium bisdibenzylideneacetone and 100 μmol of the phosphorus-sulfonic acid ligand (I). Dehydrated toluene (10 mL) was added thereto. Thereafter, this mixture was treated with an ultrasonic vibrator for 10 minutes to thereby prepare a catalyst slurry.

Copolymerization of Ethylene with 1,2-Epoxy-9-Decene

A copolymer of ethylene with 1,2-epoxy-9-decene was obtained in the same manner as in Example 1-1.

The conditions and results of the polymerization are shown in Table 5, and the results of the property examinations are shown in Table 6.

Production Example 3-8 Production of Polar-Group-Containing Olefin Copolymer A'-3-8

Copolymerization of Ethylene with 4-Hydroxybutyl Acrylate Glycidyl Ether (4-HBAGE)

The same procedure as in Production Example 3-7 was conducted, except that 54 mL (0.3 mol) of 4-HBAGE was used as a polar-group-containing monomer and the amount of the transition metal complex was changed to 50 μmol and that the polymerization temperature and the polymerization period were changed to 90° C. and 70 minutes, respectively. The conditions and results of the polymerization are shown in Table 5, and the results of the property examinations are shown in Table 6.

Polar-Group-Containing Olefin Copolymer (A'-3-9)

This copolymer is a polar-group-containing olefin copolymer (trade name: Bondfast E, manufactured by Sumitomo Chemical Co., Ltd.) which is a copolymer of ethylene with glycidyl methacrylate and was produced by a high-pressure process. The properties of this polar-group-containing olefin copolymer are shown in Table 6.

TABLE 5

| Run | Kind of ligand | Amount of ligand μmol | TNOA mmol | Kind of polar-group-containing monomer | Amount of polar-group-containing monomer mmol | Polymerization conditions Partial ethylene pressure mL | Polymerization conditions Partial ethylene pressure MPa | Temperature °C. | Period min | Amount yielded g | Catalytic efficiency g/mol |
|---|---|---|---|---|---|---|---|---|---|---|---|
| Production Example 3-1 | B27DM | 30 | 0.15 | 4-hydroxybutyl acrylate glycidylether | 15 | 2.7 | 2.5 | 105 | 60 | 38 | 1.3E+06 |
| Production Example 3-2 | B27DM | 380 | 0.4 | 4-hydroxybutyl acrylate glycidylether | 50 | 9.1 | 2.0 | 90 | 120 | 60 | 1.6E+05 |
| Production Example 3-3 | B27DM | 200 | 0.2 | 4-hydroxybutyl acrylate glycidylether | 15 | 2.7 | 2.0 | 90 | 152 | 40 | 2.0E+05 |
| Production Example 3-4 | B27DM | 120 | 0.2 | 4-hydroxybutyl acrylate glycidylether | 50 | 9.1 | 2.0 | 90 | 120 | 38 | 3.2E+05 |
| Production Example 3-5 | B27DM | 3 | 0.1 | 4-hydroxybutyl acrylate glycidylether | 5 | 0.91 | 2.5→1.5 | 105 | 33 | 37 | 1.2E+07 |
| Production Example 3-6 | B114 | 20 | 0.10 | 4-hydroxybutyl acrylate glycidylether | 10 | 1.8 | 2.5→1.5 | 90 | 46 | 32 | 1.6E+06 |
| Production Example 3-7 | I | 150 | — | 1,2-epoxy-9-decene | 200 | 25 | 1.0 | 100 | 120 | 72 | 4.8E+05 |
| Production Example 3-8 | I | 50 | — | 4-hydroxybutyl acrylate glycidylether | 300 | 54 | 1.0 | 90 | 70 | 58 | 1.2E+06 |

TABLE 6

| Run | Name | Kind of polar-group-containing monomer | Weight-average molecular weight Mw * $10^{-4}$ | Molecular-weight distribution parameter Mw/Mn | Melting point ° C. | δ (G* = 0.1 MPa) ° | Amount of polar-group structural unit mol % | Amount of residual aluminum Calculated from amount of alkylaluminum added for polymerization $\mu g_{Al}/g_{PE}$ | Amount of residual aluminum Determined by fluorescent X-ray analysis $\mu g_{Al}/g_{PE}$ |
|---|---|---|---|---|---|---|---|---|---|
| Production Example 3-1 | A'-3-1 | 4-hydroxybutyl acrylate glycidylether | 7.0 | 2.20 | 122.3 | ND | 0.82 | 106.8 | ND |
| Production Example 3-2 | A'-3-2 | 4-hydroxybutyl acrylate glycidylether | 11.2 | 2.28 | 119.2 | 48.7 | 2.22 | 180.2 | 171 |
| Production Example 3-3 | A'-3-3 | 4-hydroxybutyl acrylate glycidylether | 8.2 | 2.46 | 112.4 | 50.0 | 3.23 | 135.6 | ND |
| Production Example 3-4 | A'-3-4 | 4-hydroxybutyl acrylate glycidylether | 8.8 | 2.45 | 114.9 | ND | 2.68 | 142.0 | ND |
| Production Example 3-5 | A'-3-5 | 4-hydroxybutyl acrylate glycidylether | 6.83 | 2.41 | 130.8 | ND | 0.03 | 72.1 | ND |
| Production Example 3-6 | A'-3-6 | 4-hydroxybutyl acrylate glycidylether | 2.81 | 2.35 | 127.8 | ND | 0.24 | 83.5 | ND |
| Production Example 3-7 | A'-3-7 | 1,2-epoxy-9-decene | 8 | 2.68 | 122.2 | ND | 0.78 | 0.0 | ND |
| Production Example 3-8 | A'-3-8 | 4-hydroxybutyl acrylate glycidylether | 4.9 | 2.80 | 122.8 | ND | 0.71 | 0.0 | ND |
| — | A'-3-9 | glycidyl methacrylate | 10.6 | 5.17 | 99.2 | 37.3 | 2.99 | 0.0 | ND |

Example 3-1

The polar-group-containing olefin copolymer (A'-3-1) was dry-blended in an amount of 0.05 g with 9.95 g of linear low-density polyethylene (trade name: F30FG (referred to as "LLDPE" in the table), manufactured by Japan Polyethylene Corp.). This mixture was introduced into a compact twin-screw kneader (Type: MC15, manufactured by DSM Xplore) and melt-kneaded for 5 minutes. For this kneading, the barrel temperature and the screw rotation speed were set at 180° C. and 100 rpm, respectively. After the 5 minutes, a rod-shaped resin composition was extruded through the resin discharge port. This resin composition was placed on a tray made of stainless steel, and was allowed to cool and solidify at room temperature. The cooled resin composition was pelletized to produce pellets of the resin composition. The resin composition pellets obtained were subjected to the adhesion strength measurement to measure the adhesion strength thereof. The results of the adhesion strength measurement are shown in Table 7.

Examples 3-2 to 3-32

Resin compositions of Examples 3-2 to 3-32 were produced in the same manner as in Example 3-1, except that the kind of the polar-group-containing olefin copolymer and the proportion of the polar-group-containing olefin copolymer to the linear low-density polyethylene were changed. The proportions of the feed resins and the results of the adhesion strength measurement are shown in Table 7 and Table 8.

Example 3-33

The polar-group-containing olefin copolymer (A'-3-7) was dry-blended in an amount of 3.0 g with 7.0 g of linear low-density polyethylene (trade name: F30FG, manufactured by Japan Polyethylene Corp.). This mixture was introduced into a compact twin-screw kneader (Type: MC15, manufactured by DSM Xplore) and melt-kneaded for 5 minutes. For this kneading, the barrel temperature and the screw rotation speed were set at 180° C. and 100 rpm, respectively. After the 5 minutes, a rod-shaped resin composition was extruded through the resin discharge port. This resin composition was placed on a tray made of stainless steel, and was allowed to cool and solidify at room temperature. The cooled resin composition was pelletized to produce pellets of the resin composition. The resin composition pellets obtained were subjected to the adhesion strength measurement to measure the adhesion strength thereof. The results of the adhesion strength measurement are shown in Table 10.

Example 3-34

The polar-group-containing olefin copolymer (A'-3-8) was dry-blended in an amount of 3.0 g with 7.0 g of linear low-density polyethylene (trade name: F30FG manufactured by Japan Polyethylene Corp.). This mixture was introduced into a compact twin-screw kneader (Type: MC15, manufactured by DSM Xplore) and melt-kneaded for 5 minutes. For this kneading, the barrel temperature and the screw rotation speed were set at 180° C. and 100 rpm, respectively. After the 5 minutes, a rod-shaped resin composition was extruded through the resin discharge port. This resin composition was placed on a tray made of stainless steel, and was allowed to cool and solidify at room temperature. The cooled resin composition was pelletized to produce pellets of the resin composition. The resin composition pellets obtained were subjected to the adhesion strength measurement to measure the adhesion strength thereof. The results of the adhesion strength measurement are shown in Table 10.

Example 3-35 to Example 3-39

Resin compositions of Examples 3-35 to 3-39 were produced and examined for adhesion strength in the same manners as in Example 3-34, except that the linear low-density polyethylene used in Example 3-34 was replaced with each of the olefin-based resins shown in Table 9. The manufacturer, trade name, grade, polymerized monomers, and resin properties of each of the olefin-based resins are shown in Table 9, and the results of the adhesion strength measurement are shown in Table 10. Each "LLDPE" in Table 9 indicates linear low-density polyethylene.

Comparative Example 3-1 to Comparative Example 3-10

Resin compositions of Comparative Example 3-1 to Comparative Example 3-10 were produced in the same manner as in Example 3-1, except that the kind of the polar-group-containing olefin copolymer was changed to the polar-group-containing olefin copolymer (A'-3-9) and that the proportion of the polar-group-containing olefin copolymer to the linear low-density polyethylene was changed. The proportions of the feed resins and the results of the adhesion strength measurement are shown in Table 11.

Comparative Example 3-11

Linear low-density polyethylene (trade name: Novatec (F30FG) (referred to as "LLDPE" in the table), manufactured by Japan Polyethylene Corp.) was introduced in an amount of 10 g into a compact twin-screw kneader (Type: MC15, manufactured by DSM Xplore) and melt-kneaded for 5 minutes. For this kneading, the barrel temperature and the screw rotation speed were set at 180° C. and 100 rpm, respectively. After the 5 minutes, a rod-shaped resin composition was extruded through the resin discharge port. This resin composition was placed on a tray made of stainless steel, and was allowed to cool and solidify at room temperature. The cooled resin composition was pelletized to produce pellets of the resin composition. The resin composition pellets obtained were subjected to the adhesion strength measurement to measure the adhesion strength thereof. The results of the adhesion strength measurement are shown in Table 11.

TABLE 7

| | Proportion of each resin in resin composition (wt %) | | | Proportion of each resin in resin composition (parts by weight) | | | Proportion of each resin in resin composition (feed amount (g)) | | | Adhesion strength (gf/10 mm) |
|---|---|---|---|---|---|---|---|---|---|---|
| | A'-3-1 | A'-3-2 | LLDPE | A'-3-1 | A'-3-2 | LLDPE | A'-3-1 | A'-3-2 | LLDPE | Adherend: PA |
| Example 3-1 | 0.5 | | 99.5 | 100 | | 19900 | 0.05 | | 9.95 | 2625 |
| Example 3-2 | 1 | | 99 | 100 | | 9900 | 0.1 | | 9.9 | 4150 |
| Example 3-3 | 5 | | 95 | 100 | | 1900 | 0.5 | | 9.5 | 4050 |
| Example 3-4 | 10 | | 90 | 100 | | 900 | 1 | | 9 | 5000 |
| Example 3-5 | 20 | | 80 | 100 | | 400 | 2 | | 8 | 5000 |
| Example 3-6 | 30 | | 70 | 100 | | 233 | 3 | | 7 | 3100 |
| Example 3-7 | 99 | | 1 | 100 | | 1 | 9.9 | | 0.1 | 4000 |
| Example 3-8 | | 1 | 99 | | 100 | 9900 | | 0.1 | 9.9 | 875 |
| Example 3-9 | | 5 | 95 | | 100 | 1900 | | 0.5 | 9.5 | 1763 |
| Example 3-10 | | 10 | 90 | | 100 | 900 | | 1 | 9 | 1230 |
| Example 3-11 | | 25 | 75 | | 100 | 300 | | 2.5 | 7.5 | 1100 |
| Example 3-12 | | 50 | 50 | | 100 | 100 | | 5 | 5 | 875 |
| Example 3-13 | | 70 | 30 | | 100 | 43 | | 7 | 3 | 1100 |
| Example 3-14 | | 85 | 15 | | 100 | 18 | | 8.5 | 1.5 | 1150 |
| Example 3-15 | | 99 | 1 | | 100 | 1 | | 9.9 | 0.1 | 950 |

TABLE 8

| | Proportion of each resin in resin composition (wt %) | | | | | Proportion of each resin in resin composition (parts by weight) | | | | | Proportion of each resin in resin composition (feed amount (g)) | | | | | Adhesion strength (gf/10 mm) | |
|---|---|---|---|---|---|---|---|---|---|---|---|---|---|---|---|---|---|
| | A'-3-3 | A'-3-4 | A'-3-5 | A'-3-6 | LLDPE | A'-3-3 | A'-3-4 | A'-3-5 | A'-3-6 | LLDPE | A'-3-3 | A'-3-4 | A'-3-5 | A'-3-6 | LLDPE | Adherend: polyamide | Adherend: fluororesin |
| Example 3-16 | 1 | | | | 99 | 100 | | | | 9900 | 0.1 | | | | 9.9 | 1950 | ND |
| Example 3-17 | 5 | | | | 95 | 100 | | | | 1900 | 0.5 | | | | 9.5 | 975 | ND |
| Example 3-18 | 10 | | | | 90 | 100 | | | | 900.0 | 1.0 | | | | 9.0 | 850 | ND |
| Example 3-19 | 20 | | | | 80 | 100 | | | | 400.0 | 2.0 | | | | 8.0 | 800 | ND |
| Example 3-20 | 30 | | | | 70 | 100 | | | | 233.3 | 3.0 | | | | 7.0 | 750 | ND |
| Example 3-21 | 50 | | | | 50 | 100 | | | | 100.0 | 5.0 | | | | 5.0 | 825 | ND |
| Example 3-22 | 70 | | | | 30 | 100 | | | | 42.9 | 7.0 | | | | 3.0 | 800 | ND |
| Example 3-23 | 99 | | | | 1 | 100 | | | | 1.0 | 9.9 | | | | 0.1 | 1125 | ND |

TABLE 8-continued

| | Proportion of each resin in resin composition (wt %) | | | | | Proportion of each resin in resin composition (parts by weight) | | | | | Proportion of each resin in resin composition (feed amount (g)) | | | | | Adhesion strength (gf/10 mm) | |
|---|---|---|---|---|---|---|---|---|---|---|---|---|---|---|---|---|---|
| | A'-3-3 | A'-3-4 | A'-3-5 | A'-3-6 | LLDPE | A'-3-3 | A'-3-4 | A'-3-5 | A'-3-6 | LLDPE | A'-3-3 | A'-3-4 | A'-3-5 | A'-3-6 | LLDPE | Adherend: polyamide | Adherend: fluororesin |
| Example 3-24 | 20 | | | | 80 | 100 | | | | 400.0 | 2.0 | | | | 8.0 | ND | 2275 |
| Example 3-25 | 40 | | | | 60 | 100 | | | | 150.0 | 4.0 | | | | 6.0 | ND | 4171 |
| Example 3-26 | 60 | | | | 40 | 100 | | | | 66.7 | 6.0 | | | | 4.0 | ND | 3900 |
| Example 3-27 | 80 | | | | 20 | 100 | | | | 25.0 | 8.0 | | | | 2.0 | ND | 3317 |
| Example 3-28 | 99 | | | | 1 | 100 | | | | 1.0 | 9.9 | | | | 0.1 | ND | 3200 |
| Example 3-29 | | 30 | | | 70 | | 100 | | | 233.3 | | 3.0 | | | 7.0 | 245 | ND |
| Example 3-30 | | 70 | | | 30 | | 100 | | | 42.9 | | 7.0 | | | 3.0 | 700 | ND |
| Example 3-31 | | 99 | | | 1 | | 100 | | | 1.0 | | 9.9 | | | 0.1 | 850 | ND |
| Example 3-32 | | | 30 | | 70 | | | | | | | | | | | 1788 | ND |

TABLE 9

| Grade | Manufacturer | Trade name | Sort of resin | Comonomer 1 | Comonomer 2 | MFR g/10 min | Density g/cm³ |
|---|---|---|---|---|---|---|---|
| F30FG | Japan Polyethylene Corp. | Novatec | LLDPE | ethylene | 1-butene | 1.0 | 0.921 |
| UH411 | Japan Polyethylene Corp. | Novatec | LLDPE | ethylene | 1-butene | 0.3 | 0.924 |
| SF720GN | Japan Polyethylene Corp. | Novatec | LLDPE | ethylene | 1-hexene | 0.8 | 0.928 |
| F30HG | Japan Polyethylene Corp. | Novatec | LLDPE | ethylene | 1-butene | 2.1 | 0.920 |
| Z50MG | Japan Polyethylene Corp. | Novatec | LLDPE | ethylene | 1-butene | 9.0 | 0.925 |
| US370GN | Japan Polyethylene Corp. | Novatec | LLDPE | ethylene | 1-butene | 16.0 | 0.921 |

TABLE 10

| | Proportion of each resin in resin composition (parts by weight) | | | | | | | | Adhesion strength (gf/10 mm) |
|---|---|---|---|---|---|---|---|---|---|
| | A'-3-7 | A'-3-8 | F30FG | UH411 | SF720GN | F30HG | Z50MG | US270GN | Adherend: polyamide |
| Example 3-33 | 100 | | 233 | | | | | | 4480 |
| Example 3-34 | | 100 | 233 | | | | | | 5020 |
| Example 3-35 | | 100 | | 233 | | | | | 4075 |
| Example 3-36 | | 100 | | | 233 | | | | 4200 |
| Example 3-37 | | 100 | | | | 233 | | | 4830 |
| Example 3-38 | | 100 | | | | | 233 | | 3500 |
| Example 3-39 | | 100 | | | | | | 233 | 3810 |

TABLE 11

| | Proportion of each resin in resin composition (wt %) | | Proportion of each resin in resin composition (parts by weight) | | Proportion of each resin in resin composition (feed amount (g)) | | Adhesion strength (gf/10 mm) | |
|---|---|---|---|---|---|---|---|---|
| | A'-3-9 | LLDPE | A'-3-9 | LLDPE | A'-3-9 | LLDPE | Adherend: PA | EFEP |
| Comparative Example 3-1 | 10 | 90 | 100 | 900 | 1.0 | 9.0 | 225 | ND |
| Comparative Example 3-2 | 20 | 80 | 100 | 400 | 2.0 | 8.0 | 85 | 808 |

TABLE 11-continued

|  | Proportion of each resin in resin composition (wt %) | | Proportion of each resin in resin composition (parts by weight) | | Proportion of each resin in resin composition (feed amount (g)) | | Adhesion strength (gf/10 mm) | |
|---|---|---|---|---|---|---|---|---|
|  |  |  |  |  |  |  | Adherend: | |
|  | A'-3-9 | LLDPE | A'-3-9 | LLDPE | A'-3-9 | LLDPE | Adherend:PA | EFEP |
| Comparative Example 3-3 | 30 | 70 | 100 | 233 | 3.0 | 7.0 | 55 | ND |
| Comparative Example 3-4 | 40 | 60 | 100 | 150 | 4.0 | 6.0 | ND | 867 |
| Comparative Example 3-5 | 50 | 50 | 100 | 100 | 5.0 | 5.0 | 225 | ND |
| Comparative Example 3-6 | 60 | 40 | 100 | 66.7 | 6.0 | 4.0 | ND | 758 |
| Comparative Example 3-7 | 70 | 30 | 100 | 42.9 | 7.0 | 3.0 | 600 | ND |
| Comparative Example 3-8 | 80 | 20 | 100 | 25.0 | 8.0 | 2.0 | ND | 1771 |
| Comparative Example 3-9 | 85 | 15 | 100 | 17.6 | 8.5 | 1.5 | 790 | ND |
| Comparative Example 3-10 | 99 | 1 | 100 | 1.0 | 9.9 | 0.1 | 3850 | 2783 |
| Comparative Example 3-11 | 0 | 100 | 0 | — | 0 | 10 | 0 | 0 |

Discussion on the Results of the Examples and Comparative Examples

Examples 3-1 to 3-7 are resin compositions obtained by compounding 100 parts by weight of the polar-group-containing olefin copolymer (A'-3-1) with linear low-density polyethylene (LLDPE) in respective proportions. A relationship between the proportion of the polar-group-containing olefin copolymer (A'-3-1) and the strength of adhesion to the polyamide is shown in FIG. 4.

Comparative Examples 3-1, 3-2, 3-3, 3-5, 3-7, 3-9, and 3-10 are resin compositions obtained by compounding 100 parts by weight of the polar-group-containing olefin copolymer (A'-3-9), which had been produced by a high-pressure process, with linear low-density polyethylene (LLDPE) in respective proportions. A relationship between the proportion of the polar-group-containing olefin copolymer (A'-3-9) and the strength of adhesion to the polyamide is shown in FIG. 5. The resin compositions into which the polar-group-containing olefin copolymer (A'-3-9) has been incorporated show sufficient adhesiveness in the region where the proportion of the polar-group-containing olefin copolymer (A'-3-9) is large, but the adhesiveness decreases abruptly as the proportion thereof decreases. Meanwhile, the resin compositions into which the polar-group-containing olefin copolymer (A'-3-1) has been incorporated retain high adhesiveness regardless of the proportion of the polar-group-containing olefin copolymer (A'-3-1). These results demonstrated that resin compositions obtained by blending the polar-group-containing olefin copolymer produced in the presence of a transition metal catalyst with an olefin-based resin in proportions within a specific range show sufficient adhesiveness to highly polar materials even when the proportion of the olefin-based resin is increased.

Example 3-1 to Example 3-23 and Example 3-29 to Example 3-32 are resin compositions obtained by compounding 100 parts by weight of each of polar-group-containing olefin copolymers differing in polar-group-content (A'-3-1, A'-3-2, A'-3-3, A'-3-5, and A'-3-6) with LLDPE in various proportions. A relationship between the proportion of the polar-group-containing olefin copolymer (A'-3-2) and the strength of adhesion to the polyamide is shown in FIG. 6, a relationship between the proportion of the polar-group-containing olefin copolymer (A'-3-3) and the strength of adhesion to the polyamide is shown in FIG. 7, and a relationship between the proportion of the polar-group-containing olefin copolymer (A'-3-5) and the strength of adhesion to the polyamide is shown in FIG. 8. These resin compositions show sufficient adhesiveness regardless of the proportion of each polar-group-containing olefin copolymer. This fact has made it clear that the resin composition according to the invention exhibits sufficient adhesiveness even when the amount of polar-group structural units contained in the incorporated polar-group-containing olefin copolymer is any of those values.

Example 3-33 to Example 3-39 are compositions obtained by compounding 100 parts by weight of a polar-group-containing olefin copolymer with 233 parts by weight of any of various olefin-based resins. The olefin-based resin compositions obtained each show sufficient adhesiveness to the polyamide regardless of the MFR and density of the olefin resin and the kinds of the monomers polymerized. This fact shows that olefin-based resins, regardless of the kinds and properties thereof, exhibit sufficient adhesiveness so long as these olefin-based resins have been blended with any of the polar-group-containing olefin copolymers in a proportion within a specific range.

Examples 3-24 to 3-28 are resin compositions obtained by compounding 100 parts by weight of the polar-group-containing olefin copolymer (A'-3-4) with linear low-density polyethylene (LLDPE) in respective proportions. A relationship between the proportion of the polar-group-containing olefin copolymer (A'-3-4) and the strength of adhesion to the fluororesin is shown in FIG. 9. Comparative Examples 3-2, 3-4, 3-6, 3-8, and 3-10 are resin compositions obtained by compounding 100 parts by weight of the polar-group-containing olefin copolymer (A'-3-9), which had been produced by a high-pressure process, with linear low-density polyethylene (LLDPE) in respective proportions. A relationship between the proportion of the polar-group-containing olefin copolymer (A'-3-9) and the strength of adhesion to the fluororesin is shown in FIG. 10. The resin compositions into which the polar-group-containing olefin copolymer (A'-3-9) has been incorporated show sufficient adhesiveness in the region where the proportion of the polar-group-containing olefin copolymer (A'-3-9) is large, but the adhesiveness decreases abruptly as the proportion thereof decreases. Meanwhile, the resin compositions into which the polar-group-containing olefin copolymer (A'-3-4) has been incorporated retain high adhesiveness regardless of the proportion of the polar-group-containing olefin copolymer (A'-3-4). This fact demonstrated that resin compositions obtained by blending the polar-group-containing olefin copolymer produced in the presence of a transition metal catalyst with an olefin-based resin in proportions within a specific range show sufficient adhesiveness to highly polar materials even when the proportion of the olefin-based resin is increased, and that this tendency is not limited to combinations with a specific highly polar base.

The reason why the olefin-based resin compositions obtained by blending a polar-group-containing olefin copolymer having a linear structure with an olefin-based resin retain adhesiveness regardless of the proportion of the polar-group-containing olefin copolymer to the olefin-based resin is not clear. It is, however, thought that the polar-group-containing olefin copolymer contained in each olefin-based resin composition probably needs to have a linear molecular structure. The adhesiveness of an olefin copolymer to highly polar materials of different kinds is evaluated in terms of numerical values measured in a peel test such as that shown in JIS K6854, 1-4 (1999) "Adhesives—Peel Adhesion Strength Test Method". It is, however, thought that such a numerical value measured by this method is the sum of the chemical and physical bonding power exerted at the interface between the different materials and the cohesive power or stress for deformation of each material. The polar-group-containing olefin copolymer produced by a high-pressure radical polymerization process has a highly branched molecular structure which contains short-chain branches and long-chain branches in too large an amount. It is known that olefin-based resins having such a structure are inferior in mechanical property, cohesive power, impact resistance, etc. to olefin-based resins having a linear structure, and it is presumed that polar-group-containing olefin copolymers also have this tendency. It is thought that even when a polar-group-containing olefin copolymer produced by a high-pressure radical polymerization process has sufficient chemical bonds with materials of different kinds, the cohesive power thereof is poorer than that of polar-group-containing olefin copolymers having a linear structure, resulting in a decrease in adhesiveness.

Experiment Example 4 Evaluation of Olefin-Based Resin Compositions D'

(1) Amount of Polar-Group-Containing Structural Units in Polar-Group-Containing Olefin Copolymer (A')

The amount of polar-group-containing structural units was determined using a $^1$H-NMR spectrum. Specifically, the amount thereof was determined by the method described in Experiment Example 1 and hereinabove.

(2) Weight-Average Molecular Weight (Mw) and Molecular-Weight Distribution Parameter (Mw/Mn)

Weight-average molecular weight (Mw) was determined by gel permeation chromatography (GPC). Molecular-weight distribution parameter (Mw/Mn) was determined by further determining the number-average molecular weight (Mn) by gel permeation chromatography (GPC) and calculating the ratio between Mw and Mn, i.e., Mw/Mn. Specifically, the molecular weight and the parameter were determined by the method described in Experiment Example 1 and hereinabove.

(3) Melting Point

Melting point is expressed by the peak temperature in an endothermic curve determined with a differential scanning calorimeter (DSC). The measurement was made through the same steps as in Experiment Example 1.

(4) Adhesion Strength

Adhesion strength was measured by preparing both a pressed plate of a test sample and various base films, stacking and hot-pressing the pressed plate and each of the base films to thereby produce a layered product, and subjecting the layered product to a peel test. The measurement was made through the same steps as in Experiment Example 1.

(5) Determination of δ(G*=0.1 MPa) by Dynamic Viscoelasticity Measurement

δ(G*=0.1 MPa) was determined by a dynamic viscoelasticity measurement through the same steps as in Experiment Example 1.

(6) Amount of Aluminum (Al)

The amount of the aluminum (Al) contained in the polar-group-containing olefin copolymer (A') was determined through the same steps as in Experiment Example 1.

(7) Heat of Fusion ΔH

Heat of fusion ΔH (J/g) was determined using a differential scanning calorimeter (DSC) under the same conditions as in the measurement of melting point. A detailed explanation was given hereinabove.

(8) Melt Flow Rate (MFR)

MFR was measured through the same steps as in Experiment Example 3.

(9) Density

Density was determined through the same steps as in Experiment Example 3.

Production Example 4-1 Production of Polar-Group-Containing Olefin Copolymer A'-4-1

Synthesis of Drent Type Ligand (2-Isopropylphenyl)(2'-methoxyphenyl)(2"-sulfonylphenyl)phosphine (I)

Drent type ligand (2-isopropylphenyl)(2'-methoxyphenyl)(2"-sulfonylphenyl)phosphine (I) was obtained in the same manner as in Example 1-1.

Formation of Complex

Into a 30-mL flask which had undergone sufficient nitrogen displacement were introduced 100 μmol of palladium bisdibenzylideneacetone and 100 μmol of the phosphorus-sulfonic acid ligand (I). Dehydrated toluene (10 mL) was added thereto. Thereafter, this mixture was treated with an ultrasonic vibrator for 10 minutes to thereby prepare a catalyst slurry.

Copolymerization of Ethylene with 4-Vinyl-1,2-Epoxycyclohexane

Copolymerization of ethylene with 4-vinyl-1,2-epoxycyclohexane was conducted in the same manner as in Example 1-2.

The conditions and results of the polymerization are shown in Table 12, and the results of the property examinations are shown in Table 13.

Production Example 4-2 Production of Polar-Group-Containing Olefin Copolymer A'-4-2

Synthesis of SHOP Type Ligand (B-27DM)

A SHOP type ligand (B-27DM) was synthesized in the same manner as in Example 1-4.

Formation of Complex

A product of reaction between the B-27DM and Ni(COD)2 was obtained in the same manner as in Example 1-4.

Copolymerization of Ethylene with 4-Hydroxybutyl Acrylate Glycidyl Ether (4-HBAGE)

Into an autoclave having a capacity of 2.4 L and equipped with stirring blades were introduced 1,000 mL of dry toluene, 54.9 mg (0.15 mmol) of tri-n-octylaluminum (TNOA), and 2.7 mL (15 mmol) of 4-HBAGE. While stirring the contents, the autoclave was heated to 105° C. and nitrogen was supplied to 0.3 MPa. Thereafter, ethylene was fed to a pressure of 2.8 MPa so as to result in a partial ethylene pressure of 2.5 MPa. After the temperature and the pressure had become stable, 3.0 mL (30 μmol) of the B-27DM-Ni complex solution prepared above was forced into the autoclave with nitrogen to initiate copolymerization. During the reaction, the temperature was kept at 105° C. and ethylene was continuously fed so as to maintain the pressure. The monomers were polymerized for 60 minutes. Thereafter, the autoclave was cooled and depressurized to terminate the reaction. The reaction solution was poured into 1 L of acetone to precipitate a polymer. The resultant polymer was recovered through filtration and washing and then dried at 60° C. under vacuum until a constant weight was reached. Thus, the polar-group-containing monomer which had remained in the polar-group-containing copolymer was removed, and the polar-group-containing olefin copolymer was finally recovered in an amount of 38 g. The conditions and results of the polymerization are shown in Table 12, and the results of the property examinations are shown in Table 13. In Table 12, the polymerization activity indicates the amount (g) of the copolymer yielded per mol of the complex used for the polymerization. Incidentally, the polymerization activity was calculated on the assumption that the B-27DM and the Ni(COD)2 had reacted in a ratio of 1:1 to form the nickel complex.

The 4-HBAGE subjected to the copolymerization was one which had been dehydrated with molecular sieve 3A.

Production Example 4-4 to Production Example 4-7 Production of Polar-Group-Containing Olefin Copolymers A'-4-4 to A'-4-7

Polar-group-containing olefin copolymers of Production Example 4-4 to Production Example 4-7 were prepared by conducting polymerization in the same manner as in Production Example 4-2, except that the amount of the ligand, concentration of the polar-group-containing monomer, polymerization temperature, and polymerization period were changed. The conditions and results of the polymerization are shown in Table 12, and the results of the property examinations are shown in Table 13.

Production Example 4-3 and Production Example 4-8 Production of Polar-Group-Containing Olefin Copolymers A'-4-3 and A'-4-8

Polymerization was conducted basically in the same manner as in Production Example 4-2, except that the ethylene replenishment after initiation of the polymerization was omitted. The amount of the ligand, concentration of the polar-group-containing monomer, polymerization temperature, and polymerization period were changed in performing the polymerization. Thus, polar-group-containing olefin copolymers of Production Example 4-3 and Production Example 4-8 were prepared. The conditions and results of the polymerization are shown in Table 12, and the results of the property examinations are shown in Table 13. In this polymerization method, the partial ethylene pressure at the time of termination of the polymerization is lower than that at the time of the polymerization initiation because ethylene replenishment is omitted.

Polar-Group-Containing Olefin Copolymer (A'-4-9)

This copolymer is a polar-group-containing olefin copolymer (trade name: Bondfast E, manufactured by Sumitomo Chemical Co., Ltd.) which is a copolymer of ethylene with glycidyl methacrylate and was produced by a high-pressure process. The results of the property examinations are shown in Table 13.

Polar-Group-Containing Olefin Copolymer (A'-4-10)

This copolymer is a polar-group-containing olefin copolymer (trade name: Bondfast 2C, manufactured by Sumitomo Chemical Co., Ltd.) which is a copolymer of ethylene with glycidyl methacrylate and was produced by a high-pressure process. The results of the property examinations are shown in Table 13.

TABLE 12

| | | | | | Polymerization conditions | | | | | |
|---|---|---|---|---|---|---|---|---|---|---|
| Run | Kind of ligand | Amount of ligand μmol | TNOA mmol | Kind of polar-group-containing monomer | Amount of polar-group-containing monomer mmol | mL | Parital ethylene pressure MPa | Temperature ° C. | Period min | Amount yielded g | Catalytic efficiency g/mol |
| Production Example 4-1 | I | 50 | — | 1,2-epoxy-4-vinylcyclohexane | 200 | 20.9 | 2.0 | 100 | 240 | 85 | 1.7E+06 |
| Production Example 4-2 | B27DM | 30 | 0.15 | 4-hydroxybutyl acrylate glycidylether | 15 | 2.7 | 2.5 | 105 | 60 | 38 | 1.3E+06 |
| Production Example 4-3 | B27DM | 25 | 0.15 | 4-hydroxybutyl acrylate glycidylether | 15 | 2.7 | 2.0→1.0 | 105 | 170 | 33 | 1.3E+06 |
| Production Example 4-4 | B27DM | 20 | 0.10 | 4-hydroxybutyl acrylate glycidylether | 15 | 2.7 | 2.5 | 90 | 50 | 41 | 2.0E+06 |

TABLE 12-continued

| Run | Kind of ligand | Amount of ligand μmol | TNOA mmol | Kind of polar-group-containing monomer | Amount of polar-group-containing monomer mmol | | Parital ethylene pressure MPa | Temperature °C. | Period min | Amount yielded g | Catalytic efficiency g/mol |
|---|---|---|---|---|---|---|---|---|---|---|---|
| | | | | | mmol | mL | | | | | |
| Production Example 4-5 | B27DM | 380 | 0.40 | 4-hydroxybutyl acrylate glycidylether | 50 | 9.1 | 2.0 | 90 | 120 | 60 | 1.6E+05 |
| Production Example 4-6 | B27DM | 100 | 0.20 | 4-hydroxybutyl acrylate glycidylether | 50 | 9.1 | 2.0 | 90 | 304 | 49 | 4.9E+05 |
| Production Example 4-7 | B27DM | 200 | 0.20 | 4-hydroxybutyl acrylate glycidylether | 50 | 9.1 | 2.0 | 90 | 152 | 40 | 2.0E+05 |
| Production Example 4-8 | B27DM | 140 | 0.10 | 4-hydroxybutyl acrylate glycidylether | 50 | 9.1 | 2.0→1.5 | 90 | 130 | 17 | 1.2E+05 |

TABLE 13

| Run | Name | Kind of polar-group-containing monomer | Weight-average molecular weight Mw * $10^{-4}$ | Molecular-weight distribution parameter Mw/Mn | Melting point °C. | δ (G* = 0.1 MPa) ° | Amount of polar-group structural unit mol % | Amount of residual aluminum Calculated from amount of alkylaluminum added for polymerization $\mu g_{Al}/g$ | Amount of residual aluminum Determined by fluorescent X-ray analysis $\mu g_{Al}/g$ |
|---|---|---|---|---|---|---|---|---|---|
| Production Example 4-1 | A'-4-1 | 1,2-epoxy-4-vinylcyclohexane | 10.0 | 2.04 | 130.9 | 63.3 | 0.08 | 0 | ND |
| Production Example 4-2 | A'-4-2 | 4-hydroxybutyl acrylate glycidylether | 7.0 | 2.09 | 122.3 | ND | 0.82 | 107 | ND |
| Production Example 4-3 | A'-4-3 | 4-hydroxybutyl acrylate glycidylether | 5.8 | 2.09 | 120.6 | 60.3 | 0.98 | 121.9 | 130.0 |
| Production Example 4-4 | A'-4-4 | 4-hydroxybutyl acrylate glycidylether | 13.1 | 2.35 | 122.4 | ND | 1.04 | 66.0 | ND |
| Production Example 4-5 | A'-4-5 | 4-hydroxybutyl acrylate glycidylether | 11.2 | 2.46 | 119.2 | 48.7 | 2.22 | 180 | 171 |
| Production Example 4-6 | A'-4-6 | 4-hydroxybutyl acrylate glycidylether | 9.2 | 2.24 | 112.4 | 49.2 | 2.45 | 111 | ND |
| Production Example 4-7 | A'-4-7 | 4-hydroxybutyl acrylate glycidylether | 8.2 | 2.45 | 112.4 | 50 | 3.23 | 135 | ND |
| Production Example 4-8 | A'-4-8 | 4-hydroxybutyl acrylate glycidylether | 3.2 | 2.18 | 96.7 | ND | 5.31 | 157 | ND |
| — | A'-4-9 | glycidyl methacrylate | 10.6 | 5.17 | 99.2 | 37.3 | 2.99 | 0 | ND |
| — | A'-4-10 | glycidyl methacrylate | 12.0 | 5.92 | 105.5 | 36.2 | 1.43 | 0 | ND |

Example 4-1

The polar-group-containing olefin copolymer (A'-4-1) was dry-blended in an amount of 7.0 g with 3.0 g of high-density polyethylene (trade name: HS330P, manufactured by Japan Polyethylene Corp.) as an olefin-based resin. This mixture was introduced into a compact twin-screw kneader (Type: MC15, manufactured by DSM Xplore) and melt-kneaded for 5 minutes. For this kneading, the barrel temperature and the screw rotation speed were set at 180° C. and 100 rpm, respectively. After the 5 minutes, a rod-shaped olefin-based resin composition was extruded through the resin discharge port. This olefin-based resin composition was placed on a tray made of stainless steel, and was allowed to cool and solidify at room temperature. The cooled olefin-based resin composition was pelletized to produce pellets of the olefin-based resin composition, which were subjected to tests for examining various properties. The manufacturer, grade, trade name, sort, polymerized monomers, and resin properties of the polyethylene used are shown in Table 14, and the proportion thereof in the olefin-based resin composition is shown in Table 15. The results of the property evaluation are shown in Table 16.

In Table 14, "HDPE" indicates high-density polyethylene, "LLDPE" indicates linear low-density polyethylene, "PP" indicates polypropylene, and "COC" indicates cycloolefin copolymer.

Example 4-2 to Example 4-12 and Comparative Example 4-1 to Comparative Example 4-4

Resin compositions of Example 4-2 to Example 4-12 and Comparative Example 4-1 to Comparative Example 4-4 were produced in the same manner as in Example 4-1, except that the kind of the polar-group-containing olefin copolymer, the kind of the olefin-based resin, and the proportion were changed. The manufacturer, grade, trade name, sort, polymerized monomers, and resin properties of each olefin-based resin are shown in Table 14, and the proportions of the feed resins are shown in Table 15. The results of the property evaluation are shown in Table 16.

TABLE 14

| Grade | Manufacturer | Trade name | Sort of resin | Comonomer 1 | Comonomer 2 | MFR g/10 min | Density g/cm$^3$ | Melting point ° C. |
|---|---|---|---|---|---|---|---|---|
| 8007F-500 | Polyplastics Co., Ltd | TOPAS | COC | ethylene | norbornene | 2.0 | 0.995 | — |
| HB530RN | Japan Polyethylene Corp. | Novatec | HDPE | ethylene | 1-butene | 0.7 | 0.960 | 135.0 |
| HS330P | Japan Polyethylene Corp. | Novatec | HDPE | ethylene | 1-butene | 0.4 | 0.945 | 134.0 |
| UF943 | Japan Polyethylene Corp. | Novatec | LLDPE | ethylene | 1-butene | 2.3 | 0.933 | 125.0 |
| F30FG | Japan Polyethylene Corp. | Novatec | LLDPE | ethylene | 1-butene | 1.0 | 0.921 | 121.6 |
| NF444N | Japan Polyethylene Corp. | Harmorex | LLDPE | ethylene | 1-hexene | 2.0 | 0.912 | 121.0 |
| UE130G | Japan Polyethylene Corp. | Novatec | LLDPE | ethylene | 1-butene | 1.0 | 0.905 | 116.2 |
| WFX4TA | Japan Polypropylene Corp. | Wintec | PP | propylene | — | 7.0 | 0.896 | 123.7 |
| A-4085S | Mitsui Chemicals Inc. | Tafmer | ethylene/butene copolymer | ethylene | 1-butene | 3.6 | 0.885 | 69.5 |

TABLE 15

| | | Example 4-1 | Example 4-2 | Example 4-3 | Example 4-4 | Example 4-5 | Example 4-6 | Example 4-7 | Example 4-8 | Example 4-9 |
|---|---|---|---|---|---|---|---|---|---|---|
| Proportion of each resin in resin composition (parts by weight) | A'-4-1 | 100 | | | | | | | | |
| | A'-4-2 | | 100 | | | | | | | |
| | A'-4-3 | | | 100 | 100 | 100 | 100 | | | |
| | A'-4-4 | | | | | | | 100 | | |
| | A'-4-5 | | | | | | | | 100 | |
| | A'-4-6 | | | | | | | | | 100 |
| | A'-4-7 | | | | | | | | | |
| | A'-4-8 | | | | | | | | | |
| | A'-4-9 | | | | | | | | | |
| | A'-4-10 | | | | | | | | | |
| | 8007F-500 | | | | 400 | | | | | |
| | HB530RN | | | | | | | | | |
| | HS330P | 43 | 233 | | | | | | | 233 |
| | UF943 | | | | | 300 | | | | |
| | F30FG | | | | | | | | 233 | |
| | NF444N | | | | | | 400 | | | |
| | UE130G | | | | | | | 186 | | |
| | WFX4TA | | | 400 | | | | | | |
| | A-4085S | | | | | | | | | |

| | | Example 4-10 | Example 4-11 | Example 4-12 | Comparative Example 4-1 | Comparative Example 4-2 | Comparative Example 4-3 | Comparative Example 4-4 |
|---|---|---|---|---|---|---|---|---|
| Proportion of each resin in resin composition (parts by weight) | A'-4-1 | | | | | | | |
| | A'-4-2 | | | | | | | |
| | A'-4-3 | | | | | | | |
| | A'-4-4 | | | | 100 | | | |
| | A'-4-5 | | | | | 100 | | |
| | A'-4-6 | | | | | | | |
| | A'-4-7 | 100 | 100 | | | | | |
| | A'-4-8 | | | 100 | | | | |
| | A'-4-9 | | | | | | 100 | |
| | A'-4-10 | | | | | | | 100 |
| | 8007F-500 | | | | | | | |

TABLE 15-continued

|  |  |  |  |  |  |  |
|---|---|---|---|---|---|---|
| HB530RN | 233 |  |  |  | 233 | 233 |
| HS330P |  |  |  |  |  |  |
| UF943 |  |  |  |  |  |  |
| F30FG |  | 300 | 300 |  |  |  |
| NF444N |  |  |  |  |  |  |
| UE130G |  |  |  |  |  |  |
| WFX4TA |  |  |  |  |  |  |
| A-4085S |  |  |  | 233 | 233 |  |

TABLE 16

|  | Proportion of polar-group-containing olefin copolymer wt % | Polar-group-containing olefin copolymer | Olefin-based resin | Density of olefin-based resin g/cm$^3$ | Strength of adhesion to PA gf/10 mm | Strength of adhesion to EFEP gf/10 mm | Melting point of resin composition °C. | Heat of fusion ΔH of resin composition J/g |
|---|---|---|---|---|---|---|---|---|
| Example 4-1 | 70 | A'-4-1 | HS330P | 0.945 | 155 | ND | 132.1 | 209 |
| Example 4-2 | 30 | A'-4-2 | HS330P | 0.945 | 2875 | ND | 131.2 | 202 |
| Example 4-3 | 20 | A'-4-3 | WFX4TA | 0.896 | 111 | ND | 120.6 | 87 |
| Example 4-4 | 20 | A'-4-3 | 8007F-500 | 0.995 | 140 | ND | 120.0 | 37 |
| Example 4-5 | 25 | A'-4-3 | UF943 | 0.933 | 2530 | ND | 124.0 | 158 |
| Example 4-6 | 20 | A'-4-3 | NF444N | 0.912 | 2600 | ND | 120.8 | 161 |
| Example 4-7 | 35 | A'-4-4 | UE130G | 0.905 | 4050 | ND | 120.1 | 105 |
| Example 4-8 | 30 | A'-4-5 | F30FG | 0.921 | 1320 | 208 | 120.6 | 125 |
| Example 4-9 | 30 | A'-4-6 | HS330P | 0.945 | 1750 | ND | 132.5 | 185 |
| Example 4-10 | 30 | A'-4-7 | HB530RN | 0.960 | 400 | ND | 132.3 | 198 |
| Example 4-11 | 25 | A'-4-7 | F30FG | 0.921 | 730 | 172 | 120.4 | 117 |
| Example 4-12 | 20 | A'-4-8 | F30FG | 0.921 | 510 | 154 | 120.5 | 115 |
| Comparative Example 4-1 | 30 | A'-4-4 | A-4085S | 0.885 | 3300 | 1540 | 118.8 | 45 |
| Comparative Example 4-2 | 30 | A'-4-5 | A-4085S | 0.885 | 3250 | ND | 115.5 | 37 |
| Comparative Example 4-3 | 30 | A'-4-9 | HB530RN | 0.960 | 15 | 48 | 133.7 | 186 |
| Comparative Example 4-4 | 30 | A'-4-10 | HB530RN | 0.960 | 43 | 36 | 132.5 | 194 |

Discussion on the Results of the Examples and Comparative Examples

Example 4-1 to Example 4-12 are olefin-based resin compositions obtained by suitably blending 100 parts by weight each of polar-group-containing olefin copolymers (A'-4-1, A'-4-2, A'-4-3, A'-4-4, A'-4-5, A'-4-6, A'-4-7, and A'-4-8) with 1-99,900 parts by weight of any of olefin-based resins having a density of 0.890 g/cm$^3$ or higher, and show sufficient adhesiveness to the polyamide. These resin compositions further have a melting point of 119° C. or above and show satisfactorily high heat resistance. Moreover, Example 4-1 to Example 4-3 and Example 4-5 to Example 4-12, in which olefin-based resins having a melting point of 90° C. or higher had been blended, showed higher heat resistance including a melting point of 119° C. or higher and a heat of fusion ΔH of 80 J/g or larger.

Comparative Example 4-1 and Comparative Example 4-2, in which an olefin-based resin having a density lower than 0.890 g/cm$^3$ is used, have a melting point lower than 119° C. to show poor heat resistance. Furthermore, these resin compositions have a heat of fusion ΔH less than 80 J/g, showing that the heat resistance thereof is poorer.

Comparative Example 4-3 and Comparative Example 4-4 are olefin-based resin compositions obtained by suitably blending 100 parts by weight each of polar-group-containing olefin copolymers likewise produced by a high-pressure radical process (A'-4-9 and A'-4-10) with 1 to 99,900 parts by weight of an olefin-based resin having a density of 0.890 g/cm$^3$ or higher, and showed exceedingly low adhesiveness to the polyamide although satisfactory in terms of heat resistance. This fact showed that the polar-group-containing olefin copolymer of the invention decreases little in adhesiveness when blended with an olefin-based resin having a density of 0.890 g/cm$^3$ or higher, as compared with polar-group-containing olefin copolymers produced by a high-pressure radical polymerization process, and that so long as 100 parts by weight of the polar-group-containing olefin copolymer according to the invention is blended with 1 to 99,900 parts by weight of an olefin-based resin having a density of 0.890 g/cm$^3$ or higher, it is possible to balance adhesiveness with heat resistance.

The reason why the olefin-based resin compositions obtained by blending a polar-group-containing olefin copolymer having a linear structure with an olefin-based resin having a density of 0.890 g/cm$^3$ or higher have undergone only a slight decrease in adhesiveness and have sufficient adhesiveness is not clear. It is, however, thought that the polar-group-containing olefin copolymer contained in each olefin-based resin composition probably needs to have a linear molecular structure. The adhesiveness of an olefin copolymer to highly polar materials of different kinds is evaluated in terms of numerical values measured in a peel test such as that shown in JIS K6854, 1-4 (1999) "Adhesives—Peel Adhesion Strength Test Method". It is, however, thought that such a numerical value measured by this method is the sum of the chemical and physical bonding power exerted at the interface between the different materials and the cohesive power or stress for deformation of each material. The polar-group-containing olefin copolymer produced by a high-pressure radical polymerization process has a highly branched molecular structure which contains short-chain branches and long-chain branches in too large an amount. It is known that olefin-based resins having such a structure are inferior in mechanical property, cohesive power, impact resistance, etc. to olefin-based resins having a linear structure, and it is presumed that polar-group-containing olefin copolymers also have this tendency. It is thought that even when a polar-group-containing olefin copolymer produced by a high-pressure radical polymerization process has sufficient chemical bonds with materials of different kinds, the cohesive power thereof is poorer than that of polar-group-containing olefin copolymers having a linear structure, resulting in a decrease in adhesiveness.

Example 4-8, Example 4-11, and Example 4-12 are olefin-based resin compositions obtained by suitably blending 100 parts by weight each of polar-group-containing olefin copolymers with 1 to 99,900 parts by weight of an olefin-based resin having a density of 0.890 g/cm$^3$ or higher, and show sufficient adhesiveness even to the fluororesin. This fact has made it clear that materials to which the olefin-based resin composition of the invention has adhesiveness are not limited to a specific highly polar material, and the composition has sufficient adhesiveness to highly polar materials of various kinds.

Example 4-1 to Example 4-12 are compositions in which 100 parts by weight each of polar-group-containing olefin copolymers have been compounded with any of olefin-based resins having a density of 0.890 g/cm$^3$ or higher. It was demonstrated that the olefin-based resin compositions obtained can have sufficient heat resistance balanced with high adhesiveness to highly polar resins, regardless of the MFR of the olefin-based resin, the kinds of the polymerized monomers, and the proportion. This fact shows that so long as the olefin-based resin to be incorporated into the polar-group-containing olefin copolymer of the invention has a density of 0.890 g/cm$^3$ or higher, it is possible to balance the heat resistance of the olefin-based resin composition with the adhesiveness thereof.

Experiment Example 5 Evaluation of Olefin-Based Resin Compositions D"

(1) Amount of Polar-Group-Containing Structural Units in Polar-Group-Containing Olefin Copolymer (A')

The amount of polar-group-containing structural units was determined using a $^1$H-NMR spectrum. Specifically, the amount thereof was determined by the method described in Experiment Example 1 and hereinabove.

(2) Weight-Average Molecular Weight (Mw) and Molecular-Weight Distribution Parameter (Mw/Mn)

Weight-average molecular weight (Mw) was determined by gel permeation chromatography (GPC). Molecular-weight distribution parameter (Mw/Mn) was determined by further determining the number-average molecular weight (Mn) by gel permeation chromatography (GPC) and calculating the ratio between Mw and Mn, i.e., Mw/Mn. Specifically, the molecular weight and the parameter were determined by the method described in Experiment Example 1 and hereinabove.

(3) Melting Point

Melting point is expressed by the peak temperature in an endothermic curve determined with a differential scanning calorimeter (DSC). The measurement was made through the same steps as in Experiment Example 1.

(4) Adhesion Strength

Adhesion strength was measured by preparing both a pressed plate of a test sample and various base films, stacking and hot-pressing the pressed plate and each of the base films to thereby produce a layered product, and subjecting the layered product to a peel test. The measurement was made through the same steps as in Experiment Example 1.

(5) Adhesion Strength Ratio

The adhesion strength of each of the resin compositions of the Examples and Comparative Examples and that of the polar-group-containing olefin copolymer contained in the resin composition were measured by the method for measuring adhesion strength, and the adhesion strength of the resin composition was divided by the adhesion strength of the polar-group-containing olefin copolymer contained in the resin composition, the resultant value being taken as adhesion strength ratio.

This value is an index to the effect of improving adhesiveness by blending a polar-group-containing olefin copolymer with an olefin-based resin; in cases when this value is larger than "1", this means that the adhesiveness has been improved by blending the polar-group-containing olefin copolymer with the olefin-based resin.

(6) Determination of $\delta(G^*=0.1$ MPa) by Dynamic Viscoelasticity Measurement $\delta(G^*=0.1$ MPa) was determined by a dynamic viscoelasticity measurement through the same steps as in Experiment Example 1.

(7) Amount of Aluminum (Al)

The amount of the aluminum (Al) contained in the polar-group-containing olefin copolymer (A') was determined through the same steps as in Experiment Example 1.

(8) Melt Flow Rate (MFR)

MFR was measured through the same steps as in Experiment Example 3.

(9) Density

Density was determined through the same steps as in Experiment Example 3.

Production Example 5-1 Production of Polar-Group-Containing Olefin Copolymer A'-5-1

Synthesis of Drent Type Ligand (2-Isopropylphenyl)(2'-methoxyphenyl)(2"-sulfonylphenyl)phosphine (I)

Drent type ligand (2-isopropylphenyl)(2'-methoxyphenyl)(2"-sulfonylphenyl)phosphine (I) was obtained in the same manner as in Example 1-1.

Formation of Complex

Into a 30-mL flask which had undergone sufficient nitrogen displacement were introduced 100 μmol of palladium bisdibenzylideneacetone and 100 μmol of the phosphorus-sulfonic acid ligand (I). Dehydrated toluene (10 mL) was added thereto. Thereafter, this mixture was treated with an ultrasonic vibrator for 10 minutes to thereby prepare a catalyst slurry.

Copolymerization of Ethylene with 4-Vinyl-1,2-Epoxycyclohexane

The atmosphere within an autoclave having a capacity of 2.4 L and equipped with stirring blades was replaced with purified nitrogen. Thereafter, dry toluene (1.0 L) and 20.9 mL (0.2 mol) of 4-vinyl-1,2-epoxycyclohexane were introduced thereinto. While stirring the contents, the autoclave was heated to 100° C. and nitrogen was supplied to 0.3 MPa. Thereafter, ethylene was fed to a pressure of 2.3 MPa so as to result in a partial ethylene pressure of 2 MPa. After completion of the pressure regulation, 50 μmol of the transition metal complex (I—Pd complex) was forced into the autoclave with nitrogen to initiate copolymerization. During the reaction, the temperature was kept at 100° C. and ethylene was continuously fed so as to maintain the pressure. The monomers were thus polymerized for 240 minutes. Thereafter, the autoclave was cooled and depressurized to terminate the reaction. The reaction solution was poured into 1 L of acetone to precipitate a polymer. The resultant polymer was recovered through filtration and washing and then dried at 60° C. under vacuum until a constant weight was reached.

The conditions and results of the polymerization are shown in Table 17, and the results of the property examinations are shown in Table 18. In Table 17, the polymerization activity indicates the amount (g) of the copolymer yielded per mol of the complex used for the polymerization. Incidentally, the polymerization activity was calculated on the assumption that the ligand and the palladium bisdibenzylideneacetone had reacted in a ratio of 1:1 to form the palladium complex.

Production Example 5-2 Production of Polar-Group-Containing Olefin Copolymer A'-5-2

Synthesis of SHOP Type Ligand 2-(2,6-Diphenoxyphenyl)(2-phenoxyphenyl)phosphanyl-6-(pentafluorophenyl)phenol (B-114)

2-(2,6-Diphenoxyphenyl)(2-phenoxyphenyl)phosphanyl-6-(pentafluorophenyl)phenol (B-114) was obtained in the same manner as in Example 1-16.
Formation of Complex
A solution of a complex of the 2-(2,6-diphenoxyphenyl)(2-phenoxyphenyl)phosphanyl-6-(pentafluorophenyl)phenol (B-114) with bis-1,5-cyclooctadienenickel(0) (Ni(COD)2) was obtained in the same manner as in Example 1-16.
Copolymerization of Ethylene with 4-Hydroxybutyl Acrylate Glycidyl Ether (4-HBAGE)
A copolymer of ethylene with 4-hydroxybutyl acrylate glycidyl ether (4-HBAGE) was obtained in the same manner as in Example 1-16.

The conditions and results of the polymerization are shown in Table 17, and the results of the property examinations are shown in Table 18.

Production Example 5-3 Production of Polar-Group-Containing Olefin Copolymer A'-5-3

Synthesis of SHOP Type Ligand B-27DM
A SHOP type ligand (B-27DM) was synthesized in the same manner as in Example 1-4.
Formation of Complex
A product of reaction between the B-27DM and Ni(COD)2 was obtained in the same manner as in Example 1-4.
Copolymerization of Ethylene with 4-Hydroxybutyl Acrylate Glycidyl Ether (4-HBAGE)
Into an autoclave having a capacity of 2.4 L and equipped with stirring blades were introduced 1,000 mL of dry toluene, 36.6 mg (0.10 mmol) of tri-n-octylaluminum (TNOA), and 2.7 mL (15 mmol) of 4-HBAGE. While stirring the contents, the autoclave was heated to 105° C. and nitrogen was supplied to 0.3 MPa. Thereafter, ethylene was fed to a pressure of 2.8 MPa so as to result in a partial ethylene pressure of 2.5 MPa. After the temperature and the pressure had become stable, 2.5 mL (25 μmol) of the B-27DM/Ni complex solution prepared above was forced into the autoclave with nitrogen to initiate copolymerization. During the reaction, the temperature was kept at 105° C. The monomers were polymerized for 170 minutes. Thereafter, the autoclave was cooled and depressurized to terminate the reaction. The reaction solution was poured into 1 L of acetone to precipitate a polymer. The resultant polymer was recovered through filtration and washing and then dried at 60° C. under vacuum until a constant weight was reached. Thus, the polar-group-containing monomer which had remained in the polar-group-containing copolymer was removed, and the polar-group-containing olefin copolymer was finally recovered in an amount of 33 g.

The conditions and results of the polymerization are shown in Table 17, and the results of the property examinations are shown in Table 18. In Table 17, the polymerization activity indicates the amount (g) of the copolymer yielded per mol of the complex used for the polymerization. In this polymerization method, the partial ethylene pressure at the time of termination of the polymerization is lower than that at the time of the polymerization initiation because ethylene replenishment is omitted.

Incidentally, the polymerization activity was calculated on the assumption that the B-27DM and the Ni(COD)2 had reacted in a ratio of 1:1 to form the nickel complex.

The 4-HBAGE subjected to the copolymerization was one which had been dehydrated with molecular sieve 3A.

Production Example 5-4 Production of Polar-Group-Containing Olefin Copolymer A'-5-4

Copolymerization of Ethylene with 4-Hydroxybutyl Acrylate Glycidyl Ether (4-HBAGE)
Into an autoclave having a capacity of 2.4 L and equipped with stirring blades were introduced 1,000 mL of dry toluene, 36.6 mg (0.10 mmol) of tri-n-octylaluminum (TNOA), and 2.7 mL (15 mmol) of 4-HBAGE. While stirring the contents, the autoclave was heated to 50° C. and nitrogen was supplied to 0.3 MPa. Thereafter, ethylene was fed to a pressure of 2.8 MPa so as to result in a partial ethylene pressure of 2.5 MPa. After the temperature and the pressure had become stable, 2.0 mL (20 μmol) of the B-27DM-Ni complex solution prepared above was forced into the autoclave with nitrogen to initiate copolymerization. During the reaction, the temperature was kept at 50° C. and ethylene was continuously fed so as to maintain the pressure. The monomers were polymerized for 50 minutes. Thereafter, the autoclave was cooled and depressurized to terminate the reaction. The reaction solution was poured into 1 L of acetone to precipitate a polymer. The resultant polymer was recovered through filtration and washing and then dried at 60° C. under vacuum until a constant weight was reached. Thus, the polar-group-containing monomer which had remained in the polar-group-containing copolymer was removed, and the polar-group-containing olefin copolymer was finally recovered in an amount of 41 g.

The conditions and results of the polymerization are shown in Table 17, and the results of the property examinations are shown in Table 18. In Table 17, the polymerization activity indicates the amount (g) of the copolymer yielded per mol of the complex used for the polymerization.

Incidentally, the polymerization activity was calculated on the assumption that the B-27DM and the Ni(COD)2 had reacted in a ratio of 1:1 to form the nickel complex.

The 4-HBAGE subjected to the copolymerization was one which had been dehydrated with molecular sieve 3A.

Production Example 5-5 to Production Example 5-7
Production of Polar-Group-Containing Olefin Copolymers A'-5-5 to A'-5-7

Polar-group-containing olefin copolymers of Production Example 5-5 to Production Example 5-7 were prepared by conducting polymerization in the same manner as in Production Example 5-4, except that the amount of the ligand, concentration of the polar-group-containing monomer, polymerization temperature, and polymerization period were changed. The conditions and results of the polymerization are shown in Table 17, and the results of the property examinations are shown in Table 18.

Production Example 5-8 Production of Polar-Group-Containing Olefin Copolymer A'-5-8

A polar-group-containing olefin copolymer of Production Example 5-8 was prepared by conducting polymerization in the same manner as in Production Example 5-3, except that the amount of the ligand, concentration of the polar-group-containing monomer, polymerization temperature, and polymerization period were changed. The conditions and results of the polymerization are shown in Table 17, and the results of the property examinations are shown in Table 18.

Polar-Group-Containing Olefin Copolymer (A'-5-9)

This copolymer is a polar-group-containing olefin copolymer (trade name: Bondfast E, manufactured by Sumitomo Chemical Co., Ltd.) which is a copolymer of ethylene with glycidyl methacrylate and was produced by a high-pressure process. The results of the property examinations are shown in Table 18.

TABLE 17

| Run | Kind of ligand | Amount of ligand µmol | TNOA mmol | Kind of polar-group-containing monomer | Amount of polar-group-containing monomer mmol | | Polymerization conditions | | | Amount yielded g | Catalytic efficiency g/mol |
|---|---|---|---|---|---|---|---|---|---|---|---|
| | | | | | | mL | Parital ethylene pressure MPa | Temperature °C. | Period min | | |
| Production Example 5-1 | I | 50 | — | 1,2-epoxy-4-vinylcyclohexane | 200 | 20.9 | 2.0 | 100 | 240 | 85 | 1.7E+06 |
| Production Example 5-2 | B114 | 20 | 0.10 | 4-hydroxybutyl acrylate glycidylether | 10 | 1.8 | 2.5→1.5 | 90 | 46 | 32 | 1.6E+06 |
| Production Example 5-3 | B27DM | 25 | 0.15 | 4-hydroxybutyl acrylate glycidylether | 15 | 2.7 | 2.0→1.0 | 105 | 170 | 33 | 1.3E+06 |
| Production Example 5-4 | B27DM | 20 | 0.10 | 4-hydroxybutyl acrylate glycidylether | 15 | 2.7 | 2.5 | 90 | 50 | 41 | 2.0E+06 |
| Production Example 5-5 | B27DM | 380 | 0.40 | 4-hydroxybutyl acrylate glycidylether | 50 | 9.1 | 2.0 | 90 | 120 | 60 | 1.6E+05 |
| Production Example 5-6 | B27DM | 200 | 0.20 | 4-hydroxybutyl acrylate glycidylether | 50 | 9.1 | 2.0 | 90 | 152 | 40 | 2.0E+05 |
| Production Example 5-7 | B27DM | 100 | 0.20 | 4-hydroxybutyl acrylate glycidylether | 50 | 9.1 | 2.0 | 90 | 251 | 35 | 3.5E+05 |
| Production Example 5-8 | B27DM | 140 | 0.10 | 4-hydroxybutyl acrylate glycidylether | 50 | 9.1 | 2.0→1.5 | 90 | 130 | 17 | 1.2E+05 |

TABLE 18

| Run | Name | Kind of polar-group-containing monomer | Weight-average molecular weight Mw * $10^{-4}$ | Molecular-weight distribution parameter Mw/Mn | Melting point °C. | δ (G* = 0.1 MPa) ° | Amount of polar-group strucural unit mol % | Amount of residual aluminum | |
|---|---|---|---|---|---|---|---|---|---|
| | | | | | | | | Calculated from amount of alkylaluminum added for polymerization µg$_{Al}$/g | Determined by fluorescent X-ray analysis µg$_{Al}$/g |
| Production Example 5-1 | A'-5-1 | 1,2-epoxy-4-vinylcyclohexane | 10.0 | 2.04 | 130.9 | 63.3 | 0.08 | 0 | ND |
| Production Example 5-2 | A'-5-2 | 4-hydroxybutyl acrylate glycidylether | 2.8 | 2.35 | 127.8 | ND | 0.24 | 83.5 | ND |

TABLE 18-continued

| Run | Name | Kind of polar-group-containing monomer | Weight-average molecular weight Mw * $10^{-4}$ | Molecular-weight distribution parameter Mw/Mn | Melting point °C. | δ (G* = 0.1 MPa) ° | Amount of polar-group strucural unit mol % | Amount of residual aluminum Calculated from amount of alkylaluminum added for polymerization $\mu g_{Al}/g$ | Amount of residual aluminum Determined by fluorescent X-ray analysis $\mu g_{Al}/g$ |
|---|---|---|---|---|---|---|---|---|---|
| Production Example 5-3 | A'-5-3 | 4-hydroxybutyl acrylate glycidylether | 5.75 | 2.09 | 120.6 | 60.3 | 0.98 | 121.9 | 130 |
| Production Example 5-4 | A'-5-4 | 4-hydroxybutyl acrylate glycidylether | 13.1 | 2.35 | 122.4 | ND | 1.04 | 66.0 | ND |
| Production Example 5-5 | A'-5-5 | 4-hydroxybutyl acrylate glycidylether | 11.2 | 2.46 | 119.2 | 48.7 | 2.22 | 180 | 171 |
| Production Example 5-6 | A'-5-6 | 4-hydroxybutyl acrylate glycidylether | 8.2 | 2.45 | 112.4 | 50 | 3.23 | 136 | ND |
| Production Example 5-7 | A'-5-7 | 4-hydroxybutyl acrylate glycidylether | 7.3 | 2.49 | 104.6 | 49.6 | 3.80 | 154 | ND |
| Production Example 5-8 | A'-5-8 | 4-hydroxybutyl acrylate glycidylether | 3.2 | 2.18 | 96.7 | ND | 5.31 | 157 | ND |
| — | A'-5-9 | glycidyl methacrylate | 10.6 | 5.17 | 99.2 | 37.3 | 2.99 | 0 | ND |

Example 5-1

The polar-group-containing olefin copolymer (A'-5-1) was dry-blended in an amount of 7.0 g with 3.0 g of an ethylene/butene copolymer (trade name: Tafmer (A-4085S), manufactured by Mitsui Chemicals, Inc.). This mixture was introduced into a compact twin-screw kneader (Type: MC15, manufactured by DSM Xplore) and melt-kneaded for 5 minutes. For this kneading, the barrel temperature and the screw rotation speed were set at 180° C. and 100 rpm, respectively. After the 5 minutes, a rod-shaped resin composition was extruded through the resin discharge port. This resin composition was placed on a tray made of stainless steel, and was allowed to cool and solidify at room temperature. The cooled resin composition was pelletized to produce pellets of the olefin-based resin composition. The olefin-based resin composition obtained was subjected to tests for examining various properties. The manufacturer, grade, trade name, sort, polymerized monomers, and resin properties of the olefin-based resin used are shown in Table 19, and the proportion thereof in the olefin-based resin composition is shown in Table 20. The results of the property evaluation are shown in table 21.

In Table 19, "LDPE" indicates high-pressure-process low-density polyethylene, "LLDPE" indicates linear low-density polyethylene, "EEA" indicates ethylene/ethyl acrylate copolymer, "EVA" indicates ethylene/vinyl acetate copolymer, and "EPR" indicates ethylene/propylene rubber.

Example 5-2 to Example 5-12 and Comparative Example 5-1 to Comparative Example 5-3

Resin compositions of Example 5-2 to Example 5-12 and Comparative Example 5-1 to Comparative Example 5-3 were produced in the same manner as in Example 5-1, except that the kinds of the polar-group-containing olefin copolymer and olefin-based resin and the proportion of the polar-group-containing olefin copolymer to the olefin-based resin were changed. The manufacturer, grade, trade name, sort, polymerized monomers, and resin properties of each olefin-based resin used are shown in Table 19. The proportion thereof in the olefin-based resin composition is shown in Table 20, and the results of the property evaluation are shown in Table 21.

TABLE 19

| Grade | Manufacturer | Trade name | Sort of resin | Comonomer 1 | Comonomer 2 | MFR g/10 min | Density g/cm³ | Melting point °C. |
|---|---|---|---|---|---|---|---|---|
| UF943 | Japan Polyethylene Corp. | Novatec | LLDPE | ethylene | 1-butene | 2.3 | 0.933 | 125.0 |
| F30FG | Japan Polyethylene Corp. | Novatec | LLDPE | ethylene | 1-butene | 1.0 | 0.921 | 121.6 |
| LF122 | Japan Polyethylene Corp. | Novatec | LDPE | ethylene | — | 0.3 | 0.923 | 110.7 |
| KF370 | Japan Polyethylene Corp. | Kernel | LLDPE | ethylene | 1-hexene | 3.5 | 0.905 | 97.0 |
| A1150 | Japan Polyethylene Corp. | Rexpearl | EEA | ethylene | ethyl acrylate | 0.8 | — | 95.6 |
| LV440 | Japan Polyethylene Corp. | Novatec | EVA | ethylene | vinyl acetate | 2.0 | — | 89.1 |
| A-4085S | Mitsui Chemicals Inc. | Tafmer | ethylene/butene copolymer | ethylene | 1-butene | 3.6 | 0.885 | 69.5 |

TABLE 19-continued

| Grade | Manufacturer | Trade name | Sort of resin | Comonomer 1 | Comonomer 2 | MFR g/10 min | Density g/cm³ | Melting point °C |
|---|---|---|---|---|---|---|---|---|
| KS430 | Japan Polyethylene Corp. | Kernel | LLDPE | ethylene | 1-hexene | 5.0 | 0.870 | 54.6 |
| P-0280 | Mitsui Chemicals Inc. | Tafmer | EPR | ethylene | propylene | 5.4 | 0.870 | 50.3 |
| 8180 | The Dow Chemical Company | ENGAGE | ethylene/octene copolymer | ethylene | 1-octene | 0.5 | 0.863 | 49.6 |

TABLE 20

| | | Example 5-1 | Example 5-2 | Example 5-3 | Example 5-4 | Example 5-5 | Example 5-6 | Example 5-7 | Example 5-8 |
|---|---|---|---|---|---|---|---|---|---|
| Proportion of each resin in resin composition (parts by weight) | A'-5-1 | 100 | | | | | | | |
| | A'-5-2 | | 100 | | | | | | |
| | A'-5-3 | | | 100 | 100 | | | | |
| | A'-5-4 | | | | | 100 | 100 | 100 | 100 |
| | A'-5-5 | | | | | | | | |
| | A'-5-6 | | | | | | | | |
| | A'-5-7 | | | | | | | | |
| | A'-5-8 | | | | | | | | |
| | A'-5-9 | | | | | | | | |
| | UF943 | | | | | | | | |
| | F30FG | | 233 | | | | | | |
| | LF122 | | | | | | | | |
| | KF370 | | | | | | | | |
| | A1150 | | | | | 400 | | | |
| | LV440 | | | | 400 | | | | |
| | A-4085S | 43 | | | | | 400 | | |
| | KS430 | | | | | | | 400 | |
| | P-0280 | | | | | 400 | | | |
| | 8180 | | | | | | | | 400 |

| | | Example 5-9 | Example 5-10 | Example 5-11 | Example 5-12 | Comparative Example 5-1 | Comparative Example 5-2 | Comparative Example 5-3 |
|---|---|---|---|---|---|---|---|---|
| Proportion of each resin in resin composition (parts by weight) | A'-5-1 | | | | | | | |
| | A'-5-2 | | | | | | | |
| | A'-5-3 | | | | | 100 | | |
| | A'-5-4 | | | | | | | |
| | A'-5-5 | 100 | | | | | | |
| | A'-5-6 | | 100 | | | | | |
| | A'-5-7 | | | 100 | | | | |
| | A'-5-8 | | | | 100 | | | |
| | A'-5-9 | | | | | | 100 | 100 |
| | UF943 | | | | | 400 | | |
| | F30FG | | | | 400 | | 233 | |
| | LF122 | | 400 | | | | | 233 |
| | KF370 | | | 150 | | | | |
| | A1150 | | | | | | | |
| | LV440 | | | | | | | |
| | A-4085S | 400 | | | | | | |
| | KS430 | | | | | | | |
| | P-0280 | | | | | | | |
| | 8180 | | | | | | | |

TABLE 21

| | Proportion of polar-group-containing olefin copolymer wt % | Polar-group-containing olefin copolymer | Olefin-based resin | Melting point of olefin-based resin °C | Strength of adhesion to PA | | Strength of adhesion to EFEP | |
|---|---|---|---|---|---|---|---|---|
| | | | | | Adhesion strength of resin composition gf/10 mm | Adhesion strength ratio times | Adhesion strength of resin composition gf/10 mm | Adhesion strength ratio times |
| Example 5-1 | 70 | A'-5-1 | A-4085S | 69.5 | | | 375 | 3.1 |
| Example 5-2 | 30 | A'-5-2 | F30FG | 121.1 | 1670 | 25.7 | | |

TABLE 21-continued

|  | Proportion of polar- | | | | Strength of adhesion to PA | | Strength of adhesion to EFEP | |
| --- | --- | --- | --- | --- | --- | --- | --- | --- |
|  | group-containing olefin copolymer wt % | Polar-group-containing olefin copolymer | Olefin-based resin | Melting point of olefin-based resin ° C. | Adhesion strength of resin composition gf/10 mm | Adhesion strength ratio times | Adhesion strength of resin composition gf/10 mm | Adhesion strength ratio times |
| Example 5-3 | 20 | A'-5-3 | LV440 | 89.1 |  |  | 210 | 3.0 |
| Example 5-4 | 20 | A'-5-3 | A1150 | 95.6 |  |  | 730 | 10.4 |
| Example 5-5 | 20 | A'-5-4 | P-0280 | 50.3 |  |  | 1142 | 114.2 |
| Example 5-6 | 20 | A'-5-4 | A-4085S | 69.5 |  |  | 1675 | 167.5 |
| Example 5-7 | 20 | A'-5-4 | KS430 | 54.6 |  |  | 617 | 61.7 |
| Example 5-8 | 20 | A'-5-4 | 8180 | 49.6 |  |  | 425 | 42.5 |
| Example 5-9 | 20 | A'-5-5 | A-4085S | 69.5 | 3400 | 3.6 |  |  |
| Example 5-10 | 20 | A'-5-6 | LF122 | 110.7 |  |  | 440 | 1.3 |
| Example 5-11 | 40 | A'-5-7 | KF370 | 97.0 |  |  | 2230 | 2.0 |
| Example 5-12 | 20 | A'-5-8 | F30FG | 121.1 | 500 | 2.1 |  |  |
| Comparative Example 5-1 | 20 | A'-5-3 | UF943 | 125.0 |  |  | 65 | 0.93 |
| Comparative Example 5-2 | 30 | A'-5-9 | F30FG | 121.1 | 55 | 0.01 | 73 | 0.04 |
| Comparative Example 5-3 | 30 | A'-5-9 | JF122 | 110.7 | 71 | 0.02 | 53 | 0.03 |

Discussion on the Results of the Examples and Comparative Examples

Example 5-1, Example 5-3 to Example 5-8, Example 5-10, and Example 5-11 are olefin-based resin compositions obtained by suitably blending 100 parts by weight each of polar-group-containing olefin copolymers (A'-5-1, A'-5-3, A'-5-4, A'-5-6, and A'-5-7) with 1-99,900 parts by weight of any of olefin-based resins having a melting point of 124° C. or lower, and show satisfactorily high adhesiveness to the fluororesin. These resin compositions further have an adhesion strength ratio of 1.0 or higher, showing that the effect of improving adhesiveness was sufficient. Moreover, Example 5-1, Example 5-3 to Example 5-8, and Example 5-11, in which olefin-based resins having a melting point of 110° C. or lower have been blended, have an adhesion strength ratio, regarding adhesion to the fluororesin, of 2.0 or higher, showing that the adhesiveness-improving effect was remarkable.

Comparative Example 5-1, for which an olefin-based resin having a melting point higher than 124° C. was used, shows considerably low adhesiveness to the fluororesin and has an adhesion strength ratio less than 1.0. No adhesiveness-improving effect was observed therein.

Comparative Example 5-2 and Comparative Example 5-3 are olefin-based resin compositions likewise obtained by suitably blending 100 parts by weight of a polar-group-containing olefin copolymer (A'-5-9) produced by a high-pressure radical process with 1 to 99,900 parts by weight of either of olefin-based resins having a melting point within a specific range, and showed an exceedingly low strength of adhesion to the fluororesin and a poor adhesion strength ratio. This fact showed that the polar-group-containing olefin copolymer of the invention improves greatly in adhesiveness when blended with an olefin-based resin having a melting point of 124° C. or lower, as compared with polar-group-containing olefin copolymers produced by a high-pressure radical polymerization process, and that so long as 100 parts by weight of the polar-group-containing olefin copolymer according to the invention is blended with 1 to 99,900 parts by weight of an olefin-based resin having a melting point of 124° C. or lower, a high adhesiveness-improving effect is obtained.

The reason why the olefin-based resin compositions obtained by blending a polar-group-containing olefin copolymer having a linear structure with an olefin-based resin having a melting point of 124° C. or lower show improved adhesiveness as compared with the polar-group-containing olefin copolymer by itself is not clear. It is, however, thought that the polar-group-containing olefin copolymer contained in each olefin-based resin composition probably needs to have a linear molecular structure. The adhesiveness of an olefin copolymer to highly polar materials of different kinds is evaluated in terms of numerical values measured in a peel test such as that shown in JIS K6854, 1-4 (1999) "Adhesives—Peel Adhesion Strength Test Method". It is, however, thought that such a numerical value measured by this method is the sum of the chemical and physical bonding power exerted at the interface between the different materials and the cohesive power or stress for deformation of each material. The polar-group-containing olefin copolymer produced by a high-pressure radical polymerization process has a highly branched molecular structure which contains short-chain branches and long-chain branches in too large an amount. It is known that olefin-based resins having such a structure are inferior in mechanical property, cohesive power, impact resistance, etc. to olefin-based resins having a linear structure, and it is presumed that polar-group-containing olefin copolymers also have this tendency. It is thought that even when a polar-group-containing olefin copolymer produced by a high-pressure radical polymerization process has sufficient chemical bonds with materials of different kinds, the cohesive power thereof is poorer than that of polar-group-containing olefin copolymers having a linear structure, resulting in a decrease in adhesiveness.

Example 5-2, Example 5-9, and Example 5-12 are olefin-based resin compositions obtained by blending polar-group-containing olefin copolymers (A'5-2, A'-5-5, and A'-5-8), in a proportion within a specific range, with any of olefin-based resins having a melting point of 124° C. or lower, and show sufficient adhesiveness to the polyamide. These resin compositions have an adhesion strength ratio of 2.0 or higher, showing that the effect of improving adhesiveness was remarkable. This fact showed that the adhesiveness-improving effect in olefin-based resin compositions obtained by blending a polar-group-containing olefin copolymer having a linear structure with an olefin-based resin having a melting point of 124° C. or lower is produced in application to bases which are not limited to specific ones.

Example 5-1 to Example 5-12 are compositions in which each of polar-group-containing olefin copolymers has been compounded with any of olefin-based resins having a melting point of 124° C. or lower. It was demonstrated that a sufficient adhesiveness-improving effect is obtained in the olefin-based resin compositions regardless of the MFR or the olefin-based resin, the kinds of the polymerized monomers, and the proportion.

The predominance and rationality of the configurations of the invention (characterizing features of the invention) and the superiority thereof to prior-art techniques have been rendered clear by the satisfactory results of the Examples given above and by the comparisons between the Examples and the Comparative Examples.

While the invention has been described in detail and with reference to specific embodiments thereof, it will be apparent to one skilled in the art that various changes and modifications can be made therein without departing from the spirit and scope thereof. This application is based on a Japanese patent application filed on Mar. 27, 2013 (Application No. 2013-067402), a Japanese patent application filed on Mar. 27, 2013 (Application No. 2013-067409), a Japanese patent application filed on Jun. 26, 2013 (Application No. 2013-133857), a Japanese patent application filed on Feb. 28, 2014 (Application No. 2014-039324), and a Japanese patent application filed on Feb. 28, 2014 (Application No. 2014-039335), the contents thereof being incorporated herein by reference.

INDUSTRIAL APPLICABILITY

The polar-group-containing olefin copolymer (A) of the invention, the multinary polar olefin copolymer (B) of the invention, and the olefin-based resin composition (D), olefin-based resin composition (D'), and olefin-based resin composition (D") of the invention, which each include the polar-group-containing olefin copolymer and an olefin-based resin, have high adhesiveness to other bases and have made it possible to produce industrially useful layered products. The resin compositions which can be produced by the invention are excellent in terms of not only adhesiveness but also mechanical and thermal property, and are applicable as useful multilayered molded objects. These resin compositions, after laminated to various bases, are utilized extensively in the field of packaging materials and packaging containers, the field of industrial materials such as fibers, pipes, fuel tanks, hollow vessels, and drum cans, the field of construction materials such as water cutoff materials, the electronic field including members for electronic or domestic electrical appliances, the electrical-wire field including electrical wires and cables, etc.

What is claimed is:

1. A method of producing a polar-group-containing olefin copolymer which comprises 99.999 to 80 mol % of structural units derived from at least one of ethylene or α-olefin having 3 to 20 carbon atoms and 20 to 0.001 mol % of structural units derived from at least one polar-group-containing monomer which contains an epoxy group and is represented by the following structural formula (I), the method comprising copolymerizing at least one of ethylene or α-olefin having 3 to 20 carbon atoms and at least one polar-group-containing monomer which contains an epoxy group and is represented by structural formula (I) in the presence of a transition metal catalyst comprising a chelatable ligand and a Group-5 to Group-11 metal to produce a random copolymer having a linear molecular structure,
wherein structural formula (I) is:

in which $R^1$ represents a hydrogen atom and $R^2$, $R^3$, and $R^4$ each independently represents a hydrogen atom, a hydrocarbon group, or an epoxy-group-containing functional group, wherein at least one of $R^2$ to $R^4$ comprises the epoxy-group-containing functional group, wherein the polar-group-containing olefin copolymer has a melting point of 50 to 140° C., the melting point is determined by a differential scanning calorimeter by heating the copolymer to 200° C. at 10° C./minute, maintaining a temperature of 200° C. for 5 minutes, cooling the copolymer to 30° C. at 10° C./minute, maintaining a temperature at 30° C. for 5 minutes, and then heating the copolymer at 10° C./minute to obtain an endothermic curve for this heating, a maximum-peak temperature in the endothermic curve is the melting point; and wherein an amount of aluminum (Al) in the polar-group-containing olefin copolymer, as measured by X-ray fluorescence analysis, is 0 to 171 μg per g of the copolymer.

2. The method according to claim 1, wherein the polar-group-containing olefin copolymer has a weight-average molecular weight (Mw), as determined by gel permeation chromatography (GPC), of 1,000 to 2,000,000.

3. The method according to claim 1, wherein the transition metal catalyst comprises palladium or nickel and a tri-arylphosphine or triarylarsine compound coordinated thereto.

4. The method according to claim 1, further comprising forming an adhesive which comprises the polar-group-containing olefin copolymer.

5. The method according to claim 1, further comprising forming a layered product which comprises the polar-group-containing olefin copolymer and a base layer.

6. The method according to claim 5, wherein the base layer comprises at least one member selected from olefin-based resins, highly polar thermoplastic resins, metals, vapor-deposited films of inorganic oxide, paper, cellophane, woven fabric, or nonwoven fabric.

7. The method according to claim 5, wherein the base layer comprises at least one member selected from polyamide-based resins, fluororesins, polyester-based resins, or ethylene/vinyl alcohol copolymers (EVOH).

8. A method of producing an olefin-based resin composition comprising a polar-group-containing olefin copolymer (A') and an olefin-based resin (C), the method comprising producing a polar-group-containing olefin copolymer which comprises 99.999 to 80 mol % of structural units derived from at least one of ethylene or α-olefin having 3 to 20 carbon atoms and 20 to 0.001 mol % of structural units derived from at least one polar-group-containing monomer which contains an epoxy group and is represented by the following structural formula (I), by copolymerizing at least one of ethylene or α-olefin having 3 to 20 carbon atoms and at least one polar-group-containing monomer which contains an epoxy group and is represented by structural formula (I) in the presence of a transition metal catalyst comprising a chelatable ligand and a Group-5 to Group-11 metal to produce a random copolymer having a linear molecular structure, wherein structural formula (I) is:

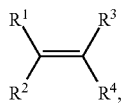

in which $R^1$ represents a hydrogen atom or an alkyl group having 1 to 10 carbon atoms, and $R^2$, $R^3$, and $R^4$ each independently represents a hydrogen atom, a hydrocarbon group, or an epoxy-group-containing functional group, wherein at least one of $R^2$ to $R^4$ comprises the epoxy-group-containing functional group, wherein the polar-group-containing olefin copolymer has a melting point of 50 to 140° C., the melting point is determined by a differential scanning calorimeter by heating the copolymer to 200° C. at 10° C./minute, maintaining a temperature of 200° C. for 5 minutes, cooling the copolymer to 30° C. at 10° C./minute, maintaining a temperature at 30° C. for 5 minutes, and then heating the copolymer at 10° C./minute to obtain an endothermic curve for this heating, a maximum-peak temperature in the endothermic curve is the melting point; and wherein an amount of aluminum (Al) in the polar-group-containing olefin copolymer is 0 to 10,000 μg per g of the copolymer; and combining the polar-group-containing olefin copolymer (A') and an olefin-based resin (C).

9. The method of producing the olefin-based resin composition according to claim 8, wherein the olefin-based resin (C) is at least one of a homopolymer or a copolymer, and the homopolymer or the copolymer is obtained by polymerizing a monomer selected from at least one of ethylene or α-olefin having 3 to 20 carbon atoms.

10. The method of producing the olefin-based resin composition according to claim 8, wherein the olefin-based resin (C) is either an ethylene homopolymer or a copolymer of ethylene with α-olefin having 3 to 20 carbon atoms.

11. The method of producing the olefin-based resin composition according to claim 8, wherein the polar-group-containing olefin copolymer (A') is a copolymer obtained by polymerization in the presence of a transition metal catalyst which comprises palladium or nickel and a triarylphosphine or triarylarsine compound coordinated thereto.

12. The method of producing the olefin-based producing composition according to claim 8, wherein the olefin-based resin (C) has a density, as measured in accordance with JIS K7112, of 0.890 to 1.20 g/cm³.

13. The method of producing the olefin-based resin composition according to claim 8, wherein the olefin-based resin (C) has a melting point of 90 to 170° C., and the melting point is a temperature corresponding to a maximum peak in an endothermic curve determined by differential scanning calorimetry (DSC).

14. The method of producing the olefin-based resin composition according to claim 8, wherein a melting point of olefin-based resin (C), which is a temperature corresponding to a maximum peak in an endothermic curve determined by differential scanning calorimetry (DSC), is 119 to 170° C.

15. The method of producing the olefin-based resin composition according to claim 8, which has a heat of fusion ΔH, as determined by differential scanning calorimetry (DSC), of 80 to 300 J/g.

16. The method of producing the olefin-based resin composition according to claim 8, wherein the olefin-based resin (C) has a melting point of 30 to 124° C., and the melting point is a temperature corresponding to a maximum peak in an endothermic curve determined by differential scanning calorimetry (DSC).

17. The method according to claim 8, further comprising forming an adhesive which comprises the olefin-based resin composition.

18. The method according to claim 8, further comprising forming a layered product which comprises the olefin-based resin composition and a base layer.

19. The method according to claim 18, wherein the base layer comprises at least one member selected from olefin-based resins, highly polar thermoplastic resins, metals, vapor-deposited films of inorganic oxide, paper, cellophane, woven fabric, or nonwoven fabric.

* * * * *